United States Patent [19]

Payne et al.

[11] 4,009,335

[45] Feb. 22, 1977

[54] GRAY SCALE DISPLAY SYSTEM EMPLOYING DIGITAL ENCODING

[75] Inventors: Robert A. Payne, Des Plaines; Gregory E. Slobodzian, Chicago; Stanley A. Zielinski; Ralph M. Ravanesi, both of Villa Park, all of Ill.

[73] Assignee: Stewart-Warner Corporation, Chicago, Ill.

[22] Filed: Aug. 9, 1973

[21] Appl. No.: 387,006

[52] U.S. Cl. .................. 358/240; 315/169 TV; 340/324 M

[51] Int. Cl.[2] .................. H04N 5/66; G09F 9/32

[58] Field of Search ....... 178/7.3 D, 7.5 D, 5.4 EL, 178/5.4 R, DIG. 3, 169 R, 169 TV; 313/108 B, 108 D; 340/146.3 MA, 166 R, 324 M, 324 AD

[56] References Cited

UNITED STATES PATENTS

| | | | |
|---|---|---|---|
| 3,622,695 | 11/1971 | Rugaber | 178/DIG. 3 |
| 3,627,924 | 12/1971 | Fleming et al. | 178/7.3 |
| 3,728,714 | 4/1973 | Kolesar et al. | 340/334 |
| 3,733,435 | 5/1973 | Chodil et al. | 178/7.3 |
| 3,752,910 | 8/1973 | Lewis | 178/7.3 |
| 3,761,617 | 9/1973 | Tsuchiya | 178/7.3 |
| 3,765,011 | 10/1973 | Sawyer et al. | 178/7.3 |
| 3,786,474 | 1/1974 | Miller | 340/324 |
| 3,787,834 | 1/1974 | Elliot | 340/324 |
| 3,793,629 | 2/1974 | Sharpless | 178/7.3 |
| 3,798,632 | 3/1974 | Liddle | 340/324 |
| 3,827,042 | 7/1974 | Mandzsu et al. | 340/324 |
| 3,863,023 | 1/1975 | Schmersal et al. | 178/7.3 |
| 3,886,403 | 5/1975 | Owaki et al. | 315/169 R |

OTHER PUBLICATIONS

Conference, 1972 Sid Symposium, Digest of Tech. Papers, "A Parallel Addressed Multiplexed–Driver Plasma Display"; June 1972, pp. 40–41 inc.; by D. E. Liddle.

Primary Examiner—John C. Martin

[57] ABSTRACT

A large display system capable of displaying a video image receives video signals, quantizes those signals to produce a digital code capable of representing variations in the light content of the image and processes the digital code so to control individual display devices on a large matrix of such devices to have different levels of visibility to thereby reproduce the video image for viewing by a large audience. A data processor is utilized to store the digital representation of the video image in memory so that on line or off line presentations can be made.

30 Claims, 43 Drawing Figures

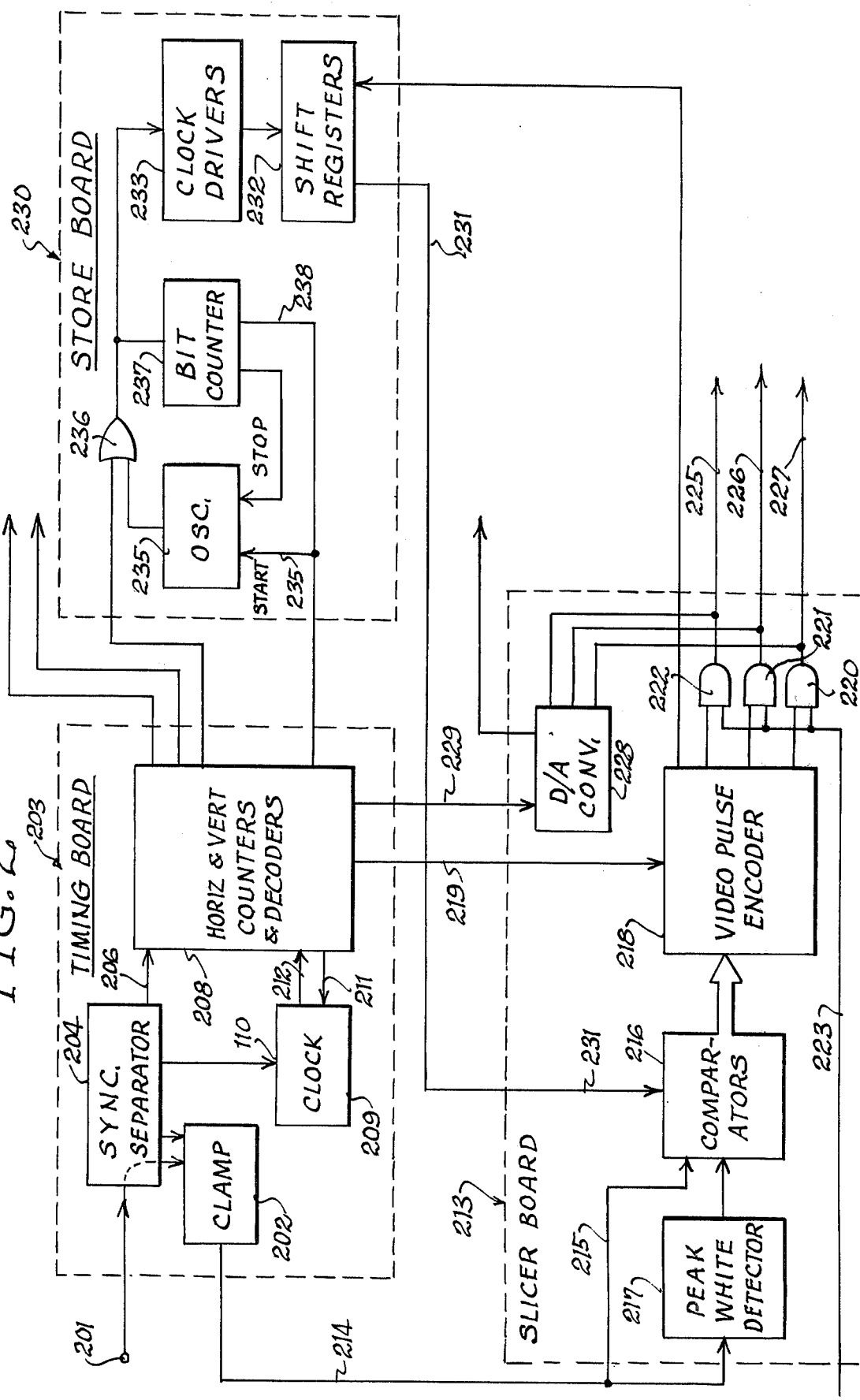

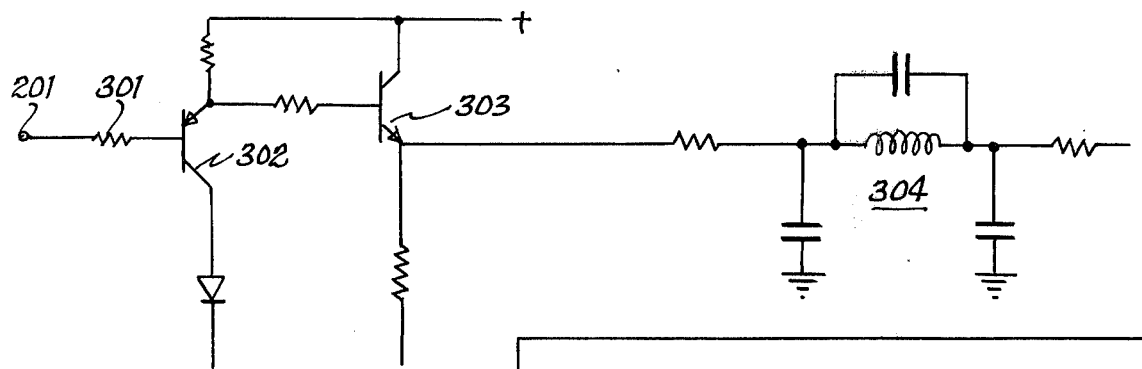
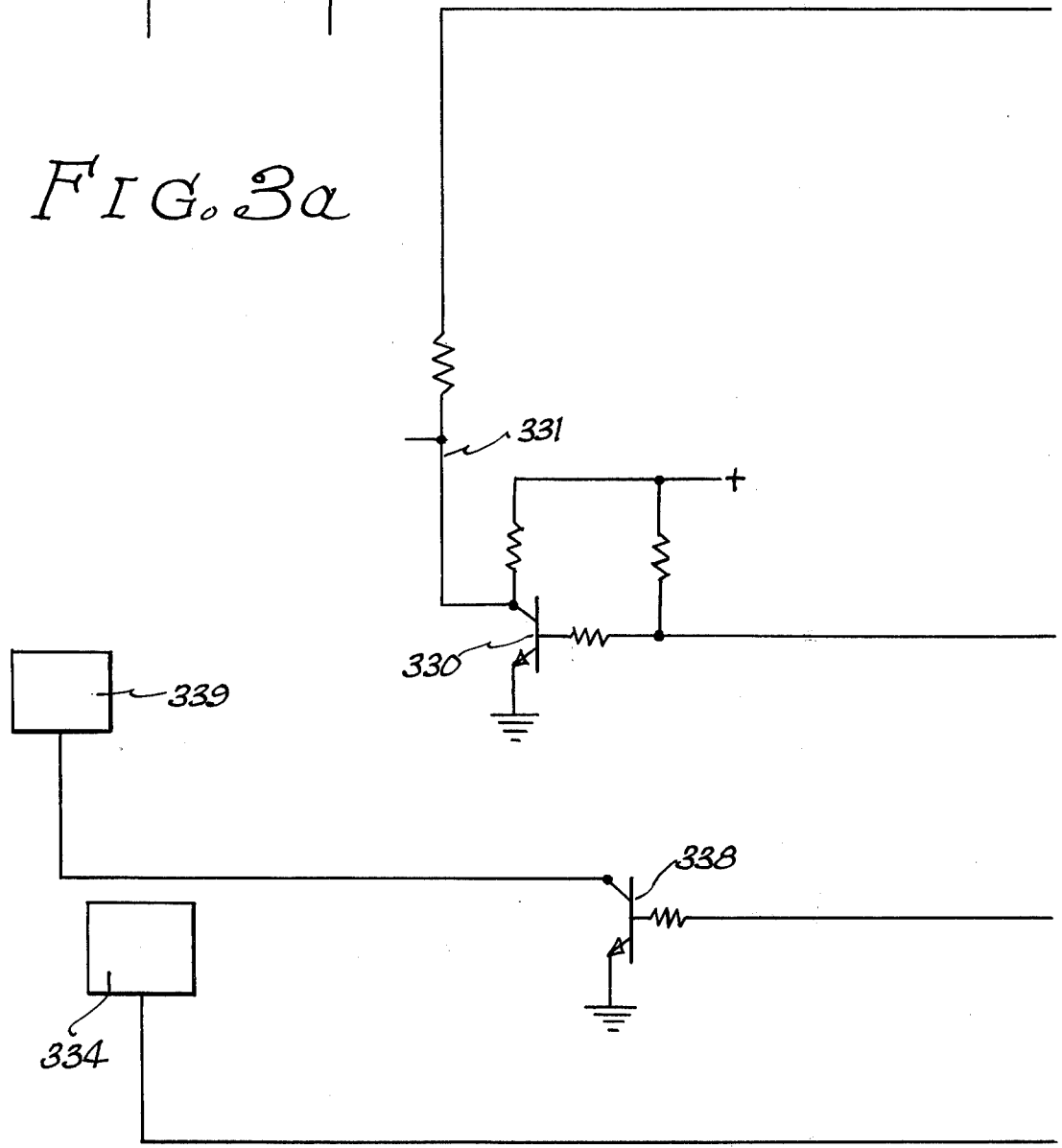
FIG. 3a

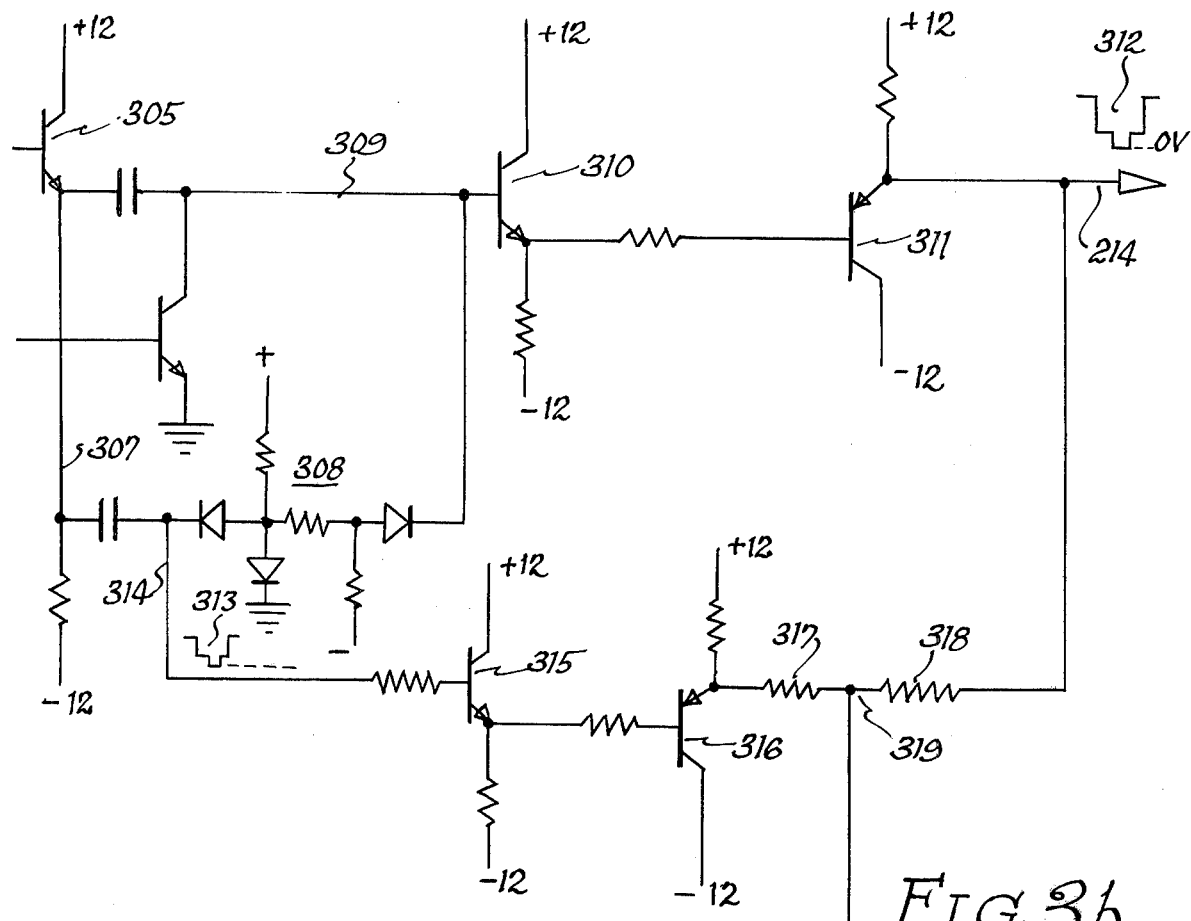
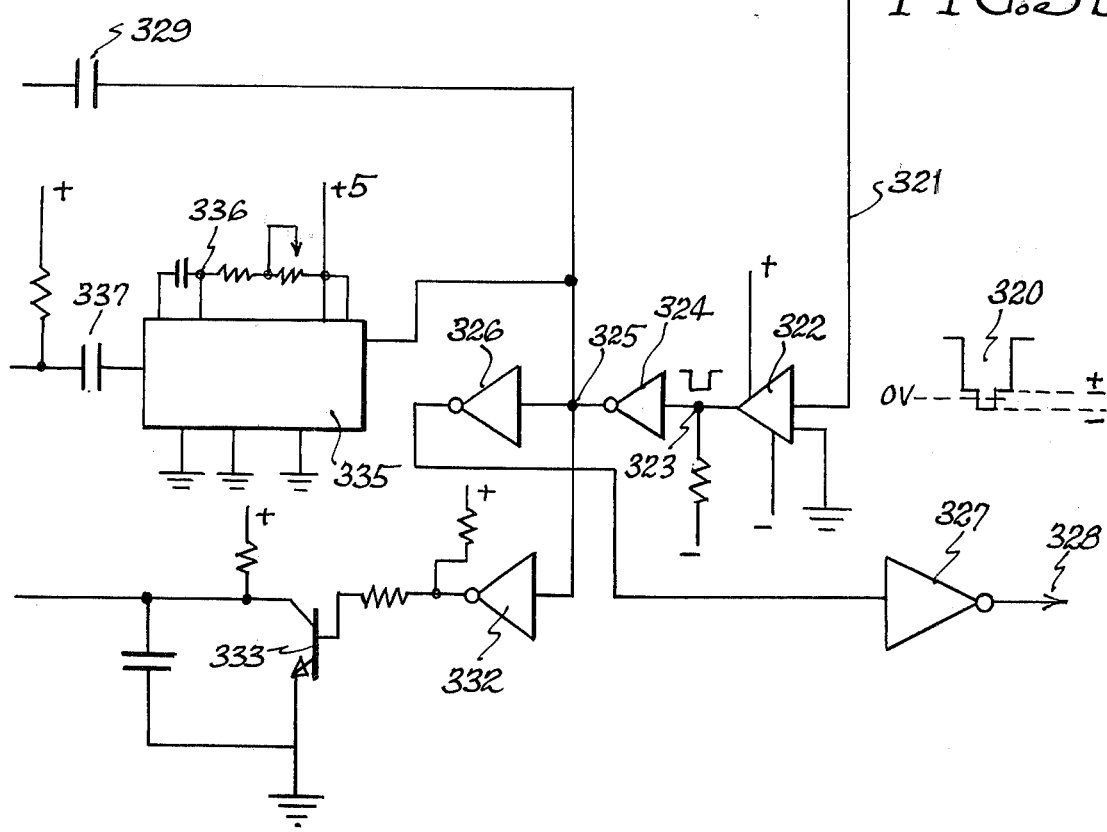
FIG.3b

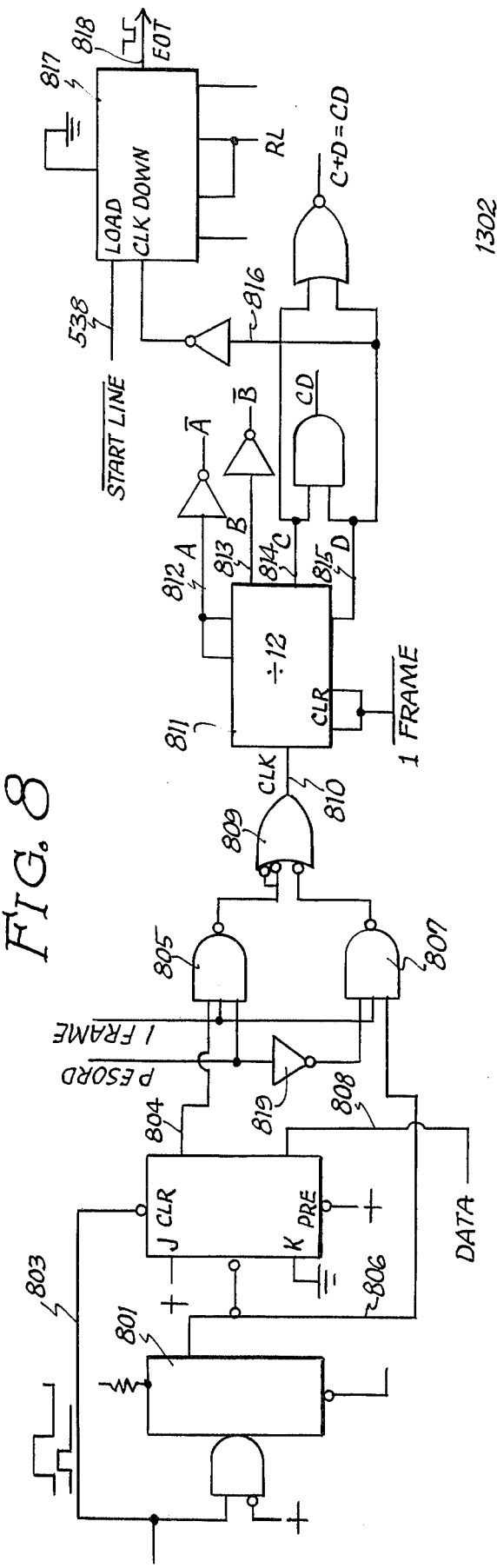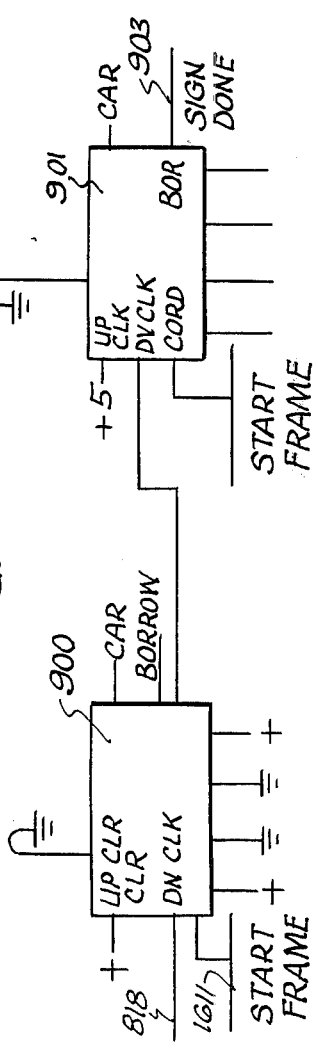
FIG. 8  FIG. 9  FIG. 13

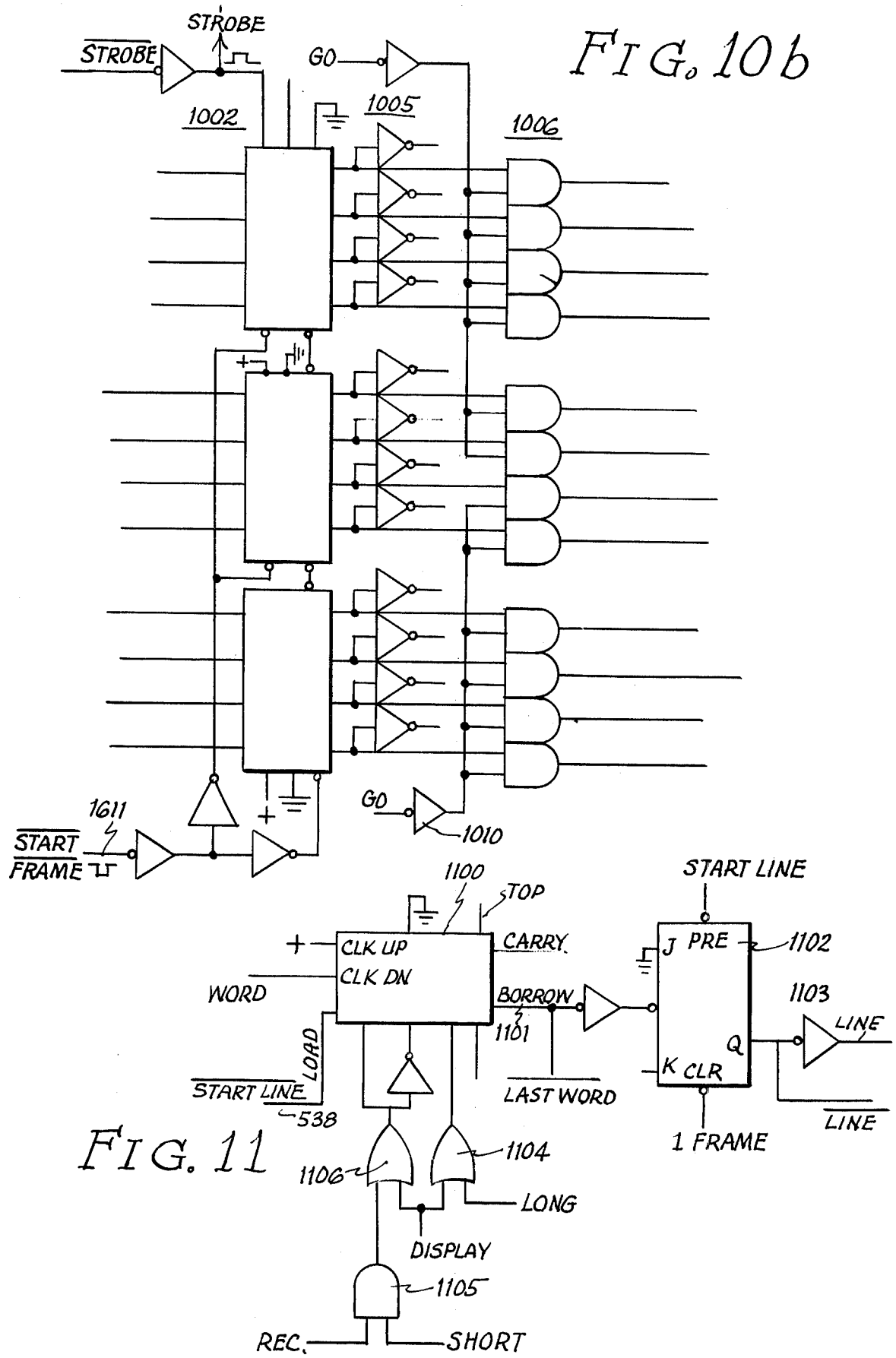

GRAY SCALE DISPLAY SYSTEM EMPLOYING DIGITAL ENCODING

BACKGROUND OF THE INVENTION

This invention relates generally to systems for displaying pictorial representations to large numbers of people. More specifically, it relates to display systems capable of information form any one or more of a number of different sources and presenting the data in the form of alpha numerical information or pictorial representation.

In recent years there has been an ever increasing interest in means for displaying or exhibiting to large audiences information about or pictorial representations of different events. For instance, there has developed a desire for "scoreboards" in athletic stadia to present to the audience information about the game in progress, information about games in progress elsewhere and miscellaneous information about player performance, statistics and the like. The scoreboards having such capability are, of course, well known and in relatively common use around the country. However, it is believed that when such scoreboards are provided with the additional capability of producing moving pictorial representations, their utility is considerably enhanced. Even more than this, the ability of such a scoreboard to present to a large audience an "instant replay" of events in the game in progress, they serve a further purpose which the owners and operators of stadia, athletic teams and advertisers find desirable.

In addition, the presence of a display device having the capabilities indicated above, affords the opportunity to present to large audiences a wide variety of graphic and pictorial material. For instance, it becomes possible to display animated cartoons of either a humorous or advertising nature. It also becomes possible to display pictorial information from the memory of large scale digital data processors.

It is believed that a scoreboard of the type suggested to be truly satisfactory, however, must be able to present pictorial displays in other than mere black and white. Otherwise, the delineation is not completely satisfactory and the image quality is not acceptable to most viewing audiences.

Therefore, this invention provides a display system wherein the image being displayed is not merely a two tone image but one which is presented in that might be termed "shades of gray", that is, there are gradations going from black to white.

Thus, it is an object of this invention to provide a novel large scale display system which produces almost instantaneous display of video signals ("instant replay") which, because it is capable of showing shades of gray, is very acceptable to viewing audiences.

The most common large scale display devices in use today use incandescent lamps arranged in a matrix and connected so that individual lamps can be selectively excited to create the image whether that image be of alpha numerical characters or pictorial representations. This invention contemplates the inclusion of means which not only selectively excites the lamps in such a matrix but also controls their level of excitation so as to provide a range of light or brightness from full off to full on. In this manner, a pictorial representation appears as an image in which persons or other foreground images are clearly delineated from background and some of the subtleties of shadings can be seen.

It is a further object of this invention to provide a large display system capable of displaying video signals available from a camera viewing a live scene or stored in a memory of either the analogue or digital variety.

It is a still further object of this invention to provide a large display system capable of displaying an image with variations of gradations of brightness in order to fully delineate the elements of the image.

Another object of this invention is to provide a novel large display system in images to be displayed using animation techniques which may more easily be prepared.

BRIEF SUMMARY OF THE INVENTION

In order to achieve the foregoing and other objects, an embodiment of the invention includes a video to digital converter which may receive video signals from any number of different sources and which converts the video signals so received into electrical signals representing quantized and digitized digital values of the video and produces the synchronizing signals to permit the digital signals to be stored in the memory of the data processor and/or displayed if desired. Means are provided to control individual display devices in a large matrix of such devices so that each display device is energized by an amount proportional to the light intensity of a quantized segment of the actual scene.

BRIEF DESCRIPTION OF THE DRAWINGS

The invention itself is set forth in the claims appended hereto while an understanding of an embodiment thereof can be had by reference to the detailed description taken in conjunction with the drawings in which:

FIG. 2 is a block diagram illustrating a video to digital converter which may be used with the invention;

FIGS. 3a and 3b illustrate schematically the clamp 202 forming a part of the video to digital converter 115;

FIG. 8 is a block diagram illustration of the circuits constituting the master clock, the word and the line counters in the video interface;

FIG. 9 is a block diagram illustration of the line counter forming a part of the video interface;

FIGS. 10a and 10b are block diagram illustrations of the memory address generator forming a part of the video interface;

FIG. 11 is a block diagram illustration of circuits for generating basic control signals used in the video interface;

FIG. 13 is a block diagram illustration of a circuit which may be used in the video interface to generate a mode control signal;

DETAILED DESCRIPTION

General Arrangement and Operation

Figure 1A:
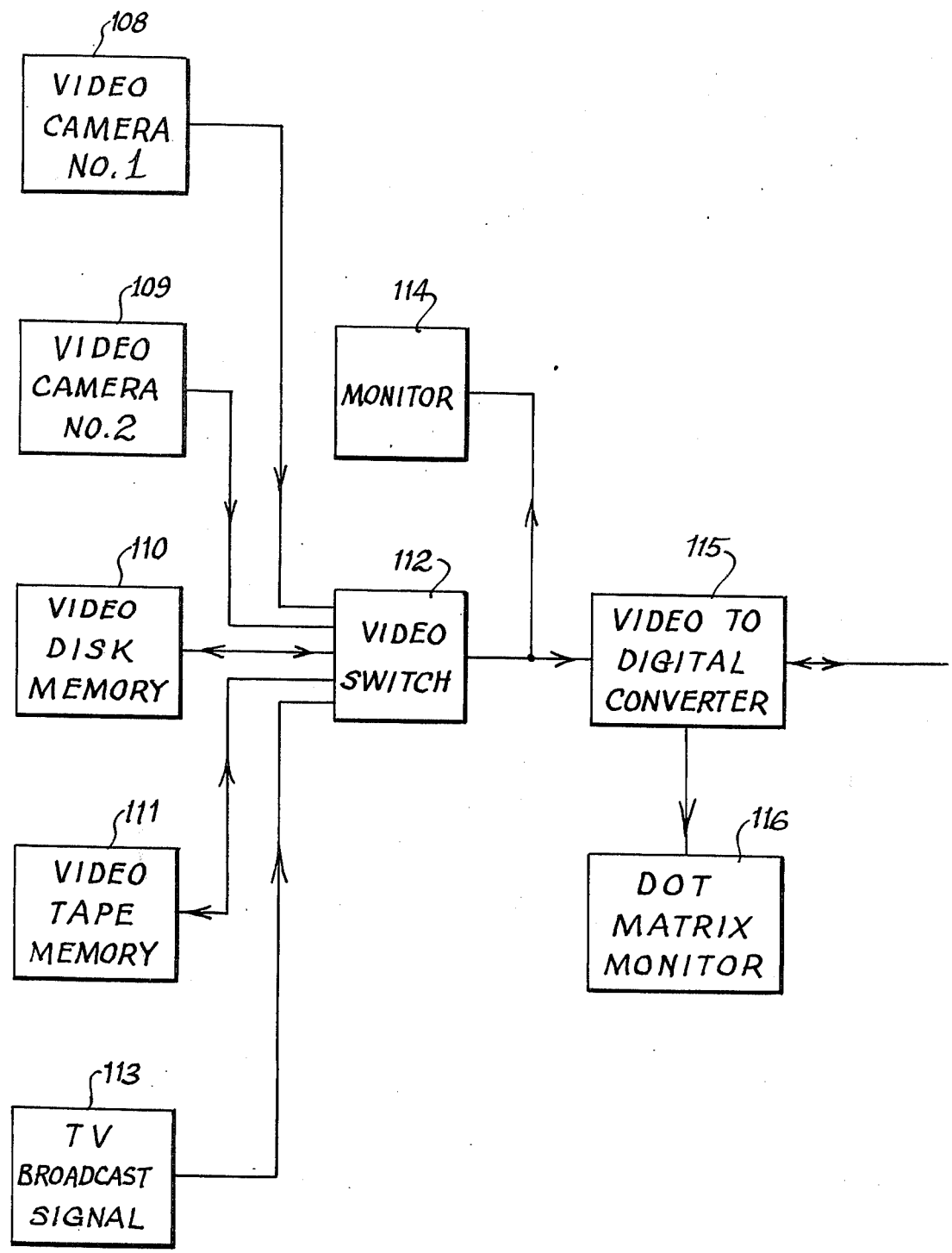
FIGS. 1a and 1b illustrate in block diagram form the general organization of and the flow of data in a system in accordance with the invention.
Figure 1B:
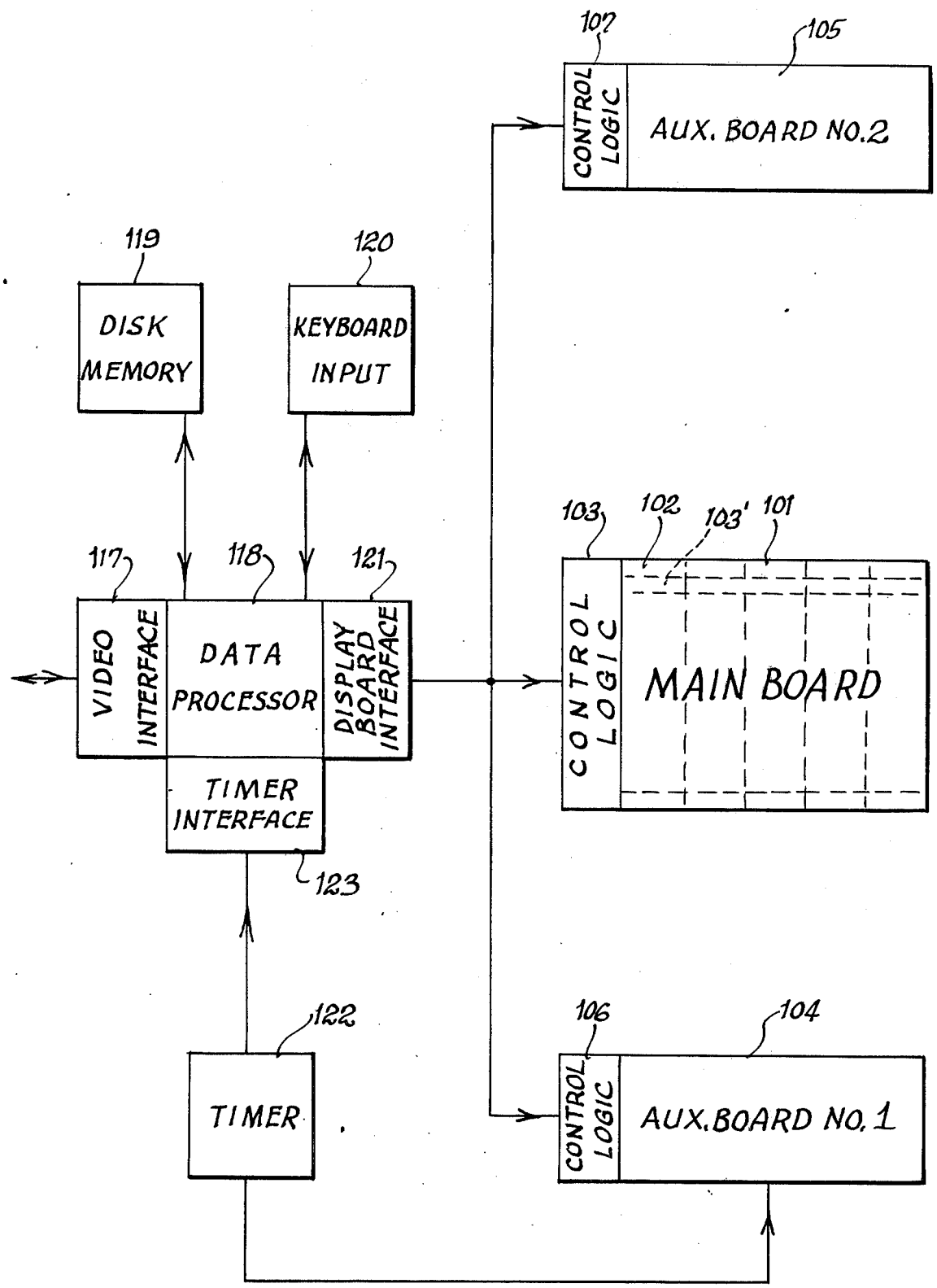

FIGS. 1a and 1b show the general organization of one system in accordance with the invention.

In these figures, a main display board 101 consists of a plurality of light emitting display devices, in this case incandescent lamps. The lamps are arranged in a solid matrix consisting of horizontal rows and vertical columns. In one embodiment, a matrix 180 lamps wide and 90 lamps high has been used. Each lamp is assigned a numerical address so that digital data representing its desired or commanded level of light intensity can be directed to it and through power control means to be described cause it to be maintained off or turned on to the degree desired.

It is important to note that the digital data supplied to each individual lamp power control means determines the amount of power to be supplied during the period of time a particular image segment is to be displayed. It is in this manner that an image can be displayed in half-tones or "shades of gray" so that image delineations or shadings may be seen by an observer. Thus, any lamp in the matrix may be excited or supplied with electrical power at any one of a number of levels ranging from off to full on. In the embodiment illustrated, this number of levels is selected to be zero to eight where zero is the off condition and eight is the full on representing the maximum brightness or peak white in the scene being displayed.

To facilitate the control of and effect desirable economies with respect to the power to be supplied to the board the lamps are arranged in modules, modules 103' and 102' being identified. It has been found convenient in the actual embodiment to provide modules 60 lamps long and 20 lamps high so that the board is five modules long and four and one-half modules high. The modularization of the board also offers the advantage that certain modules can be assigned or used for certain purposes. For instance, a module or group of modules could be used to supply information about a game in progess, games elsewhere or some message while others are devoted to the display of pictorial images.

As stated, each lamp is assigned a numerical address in the memory of a data processor and the data to be used to control the state of that lamp is stored in that memory location. Thus, the memory is essentially an image of the matrix. When the display system is to be black and white, one memory field so dedicated may be used for one bit will be sufficient to determine whether a lamp is to be on or off. If four shades of gray are desired, another memory field is used for two bits are required to furnish the desired information. Three fields are used when eight shades of gray are desired for three bits must be stored.

In the particular embodiment described a 12 bit word is used to define the memory locations of 12 lamps. Because the board has the modular arrangement described it is convenient to assign memory locations so that the first 12 bit word is assigned to the first 12 lamps at the left-hand side of the first horizontal row while the second 12 bit word is assigned to the 12 lamps immediately below those first 12. Succeeding memory locations are assigned to the next 12 lamps and so on until the bottom of the board is reached and the addressing system then assigns the next location to the next 12 lamps in the first row and then vertically downward until the entire board is represented in each processor memory field being used. However, a television field scan proceeds horizontally to complete a line and then vertically. Therefore, the intensity data, when it is stored in the memory or taken therefrom, must be directed to the proper location. As will be seen, this is done by starting the storage of data in the upper left-hand corner but then incrementing each succeeding data word to store it not in the memory location of the lamps below but in that of the next group of 12 lamps in the same row.

Obviously, the particular size of the matrix, of any module, or the allocation of modules to any purpose form no part of the invention and may be varied as desired by a designer. As may be seen, the lamps themselves need not be grouped into modules since each is uniquely defined and may be controlled by data directed by that address.

Connected to the lamps in the board 101 are necessary control and logic elements 103. Generally, the control and logic elements should be provided at the board structure so that only digital controlling data need be transmitted to the board. As may be seen, auxiliary boards such as 104 and 105 may also be provided in a given installation, each provided with its own control logic 106 and 107 respectively. Each auxiliary board may also have a modular construction. In an athletic stadium installation, the auxiliary boards may be located remote from the main board to provide information such as messages, the score of and time remaining in the game in progress.

In accordance with the invention, a video signal can be provided from any number of sources. These may include video cameras 1 and 2, reference numerals 108 and 109, respectively. Camera 108 may be devoted to live action in or around the installation such as the game in progress while camera 109 may be used to photograph film slides or graphics in a control room. A video disc memory 110 or tape memory 111 may be provided to store previously prepared video signals for later display. It is to be noted the arrows indicating the flow of information point in both directions at the output of the video memory 110 and 111 to indicate that video may be inserted into and extracted from those elements. Thus, a video signal from either camera 108 or 109 may be stored in memory 110 or 111 through a switch 112 for display later. This capability could be used, for instance, to permit the recording of video signals during one-half of a football game and the highlights to be displayed during half-time. Another source of video signal could be a television network signal 113 supplied in the conventional manner.

The video switch 112 is provided to select the desired video signal whether it is for storage in memory or for immediate display. A monitor 114 may be provided at the output of the switch in order that an operator may observe the video display as desired.

The output of the switch 112 is supplied to a video to digital converter 115. The video to digital converter receives a video signal which includes a varying amplitude portion representing the variations in light intensity of a horizontal line scan by the camera and the horizontal and vertical sync signal. As is well known in the United States and some other countries, the standard television picture is displayed using an interlaced scanning technique wherein a first field of 262.5 lines is interlaced with a second field of 262.5 lines to form a frame at a frequency so that there are 60 actual fields per second but two fields are required to form one frame giving therefore 30 frames of 525 lines per second.

The video to digital converter receiving such a signal produces as its output digital representations of the analogue video signal, signals, indicating the start of a frame (Top), signals indicating the start of each horizontal line (the left side), signals dividing each horizontal line into segments to which the digital representations are assigned (quantizing). A monitor 116 called a dot matrix monitor is provided to permit an operator to observe the output of the converter 115.

The output of the converter 115 is supplied with an array of digital logic and control elements constituting a video interface 117 for coupling that output to a general purpose data processor 118. The particular data processor forms no part of this invention. Generally speaking, it need only be one that has the ability to process data at the rate which it is supplied and desired as an output and that it be capable of being interfaced with the converter and the display board. In a particular installation, the data processor used was the PDP-8/E system manufactured and sold by the Digital Equipment Corporation of Maynard, Massachusetts. The data processor is used generally to store in its memory the digitized video and control signals and to take those signals from memory in response to a programmed instruction or under the control of an operator in order that they might be displayed.

The memory capability of the data processor 118 may be expanded by the provision of a disc memory 119 while data for processing, storage and/or display can be provided through keyboard 120. Insofar as a stadium scoreboard is concerned, historical statistical information about the game or its players may be stored either in the main or auxiliary memories and updated as necessary through the use of the keyboard. In addition, the keyboard could be used to prepare messages for display on the boards 101, 104 or 105.

A display board interface 121 couples the outputs of the data processor 118 to the control board logics 103, 106 or 107. For athletic events, a time 122 may be provided with its output controlling selected lamps or other types of display devices on one of the boards, 104 for instance. The timer output may also be coupled through an interface 128 through the data processor for display on any of the other boards.

Summarizing, a video signal is converted to a digital form which represents variations in intensity of "shades of gray" and displayed on a large matrix of display devices along with information of a game or messages as desired. A data processor with a memory capability is used to process and store the digital data.

The Video To Digital Converter

FIG. 2 illustrates the general arrangement of and the flow of data in the converter.

A terminal 201 is provided to receive the video signal from the video switch 112. The incoming video signal is supplied to a clamping circuit 202 to establish its base or full black level at zero volts so a constant value at which to effect the digital conversion is provided. As may be seen, the clamp 202 is provided on a timing board 203 where it is part of a group of integrated circuit components. Also provided on the timing is a sync separator circuit 204 which functions to extract the horizontal and vertical sync information from the composite video signal. One output of the sync separator, the vertical sync signal is supplied via 206, the horizontal and vertical counters and decoders (HVCD) 208 while another output, the horizontal sync signal, is supplied to a clock 209. The clock 209 is designed to operate a variable frequency so as to produce a train of pulses used ultimately to divide each horizontal line scan of the analogue video signal into segments whose amplitudes are to be converted to digital values. Therefore, the clock output is supplied via 212 to the HVCD 208. To ensure accuracy of the clock, that is, to ensure that each horizontal line is always equally divided, an output of the HVCD 208 is supplied via 211 as an input to the clock and as will be described hereinafter is effective to control its frequency.

The actual digital conversion is effected by a slicer board 213 which receives as its input via 214 the clamped video signal. The clamped video signal is supplied directly as an input 215 to a comparator 216 and also as an input to a peak white detector 217. The peak white detector produces a signal representing the peak white or maximum brightness in a scene and that signal provides a varying ranging upper limit as one input to the comparator 216. The comparator therefore receives the video signal and produces discrete outputs to represenrt the extent to which the amplitude of that signal varies between black and a peak value of brightness established for that frame.

The output of the comparator is supplied to a video pulse encoder 21B which produces, for each selected pulse output of the clock 209 supplied via 219, a coded representation of the amplitude of the video signal during that selected clock pulse. The outputs of the encoder 219 are further encoded by the gates 220, 221 and 222 into a three bit code. In the embodiment illustrated and described where the comparator, as will be seen, produces light levels of output such a three bit code would represent all eight levels in the following manner:

| Level | Three Bit Code |
|---|---|
| 1 | 000) |
| 2 | 001) |
| 3 | 010) |
| 4 | 011) |
| 5 | 100) |
| 6 | 101) |
| 7 | 110) |
| 8 | 111) |

The left-hand column of the code includes the most significant bits (MSB), the middle column bits identified as bit number 2 (B2) while the right-hand column contains the least significant bits (LSB).

Depending upon the degree of delineation or shades of gray desired, the number of bits used can be varied. Thus, a four level or four shade of gray system could be provided by using MSB and B2 bits of the bit code bracketed as indicated above to provide two digital signals, one for black and white (B/W) and another for gray (GRY) as follows:

| B/W | GRY | |
|---|---|---|
| 0 | 0 | OFF |
| 0 | 1 | GRAY 2 |
| 1 | 0 | GRAY 1 |
| 1 | 1 | BRIGHT |

As may be seen, OFF or black is indicated by the MSB and B2 of levels 1 and 2, GRAY 2 by the MSB and B2 of levels 3 and 4, GRAY 1 by the MSB and B2 of levels 5 and 6 and BRIGHT by MSB and B2 of levels 7 and 8. The MSB is produced at gate 222, B2 at gate 221 and LSB at gate 220. These bits are produced in response to a Record signal supplied via 223 to the gates 220, 221 and 222 from the video interface 117 as will be explained hereinafter. In reponse to the presence of the Record signal, the output of the gates is supplied to the video interface via conductors 224, 225 and 227 and also to a digital to analogue converter 228 which produces an analogue signal of the actual output of the video to digital converter for display on the dot matrix monitor 116. A sync signal for the converter 228 is supplied from the HVCD 108 via 229.

In some case, it has been found that as the video signals are compared in the comparator 216 the amplitude of a portion of the video may be on the border line between adjacent levels and may actually move up and down, probably as the result of noise. The ultimate effect of such as situation may be flicker at the display board, To minimize this a store board 230 is provided to receive the output of the converter and store it for a one field delay so that a delay digital video field is fed back via 231 to the input of the comparator 216 where it is added to the clamped video input to ensure that incoming video is clearly within one level or the other.

The output of the encoder 218 is taken from any desired level and is shifted through shift registers 232 at a frequency selected to provide the desired one field delay. The shifting is effected by clock drivers 233. A free running oscillator 234 is started at the end of a vertical scan indicated by an output supplied via 235 from HVCD 208 and assuming a store clock pulse is available at the gate 236 it supplies pulses to the clock drivers 233 and a bit counter 237. During a vertical blanking period when the field is still in the register, a Register Idle signal is supplied via 238 to the bit counter 237 to provide the necessary additional pulses to the clock drivers 233 to shift the field completely through the register. When this is done, a stop signal is supplied to the oscillator 234.

The video to digital converter therefore receives a video signal, converts it to digital data and produces the necessary synchronizing and control signals. In order to eliminate the effect of noise, the video may be compared with the digital video output. An output for a monitor to permit viewing of the converted video is provided. Other features of and capabilities of the converter will be explained in conjunction with the detailed description of the circuits of a specific embodiment which follows.

The Timing Board

FIGS. 3a and 3b illustrate circuits for effecting the video clamping and sync separation functions.

Video is supplied via terminal 201 and resistor 301 to the base of a transistor 302 connected as an emitter follower. The emitter of transistor 302 is connected to the base of a transistor 303 likewise connected as an emitter follower. The emitter followers 302 and 303 perform the conventional functions of such elements and drive a chroma filter 304 constituted by the capacitors and coil shown. The chroma filter is designed to have component valves which will filter the chroma or color information in the video signal in the event it is a color signal so as to leave only the black and white information.

A transistor 305 receives the output of chroma filter 304 and in conjunction with the transistor 306 provides a video signal at the emitter of transistor 305 wherein the "back porch" is clamped at approximately zero. In this manner, the darkest background of any scene is clamped at zero volts and objects or other portions of the scene brighter than the background are at signal levels higher than zero. The specific means by which transistor 306 is controlled to clamp the video will be described hereinafter.

The clamped video is divided at the emitter of transistor 305. One path 307 leads to a DC restoration circuit 308 while the other path 309 leads to the transistors 301 and 311 connected as emitter followers to provide the clamped video output 214. The DC restoration circuit, of course, produces a DC signal which is proportional to the average brightness of the scene so as to establish a base for the video signal. Thus, the output 214 is a video signal 312, the back porch of which is clamped at approximately zero volts.

In order to separate the horizontal and vertical sync signals and to provide a signal for clamping the video, as described, a composite video signal 313 with its bottom at zero volts is derived via 314 and supplied via transitors 315 and 316 to a resistor adding circuit consisting of the resistors 318 and 317 The signal 313 is recombined with the clamped video signal 312 at the junction 319 to a signal as shown at 320 where the sync portion of the signal extends slightly negative.

The signal produced at junction 319 is supplied via 321 as an input to an operational amplifier 322, the other input of which is grounded. The outputs of the amplifier 322 at the junction 323 therefore are the sync pulses represented by the negative-going signal at that junction. The negative-going sync signals are now supplied as inputs to the amplifier 324 which invert them to produce positive-going sync signals at the junction 325. In order to derive positive-going sync signals for a further control purpose, the output of the junction 325 is inverted by a buffer 326 and its output in turn inverted by another buffer 327 to produce such signals at the output 328.

In order to derive a signal for controlling the operation of the clamping transistor 306, the signal at the junction 325 is coupled through a capacitor 329 which is selected to have a time constant such as to produce a negative-going spike-like pulse at the base of a transistor 330. The transistor 330 being an NPN transistor is normally biased on and is turned off when the negative-going spike is applied to its base and produces in turn a positive-going spike at its collector which is supplied via 331 to the base of the transistor 306 causing it to turn on and in effect connect the emitter of the transistor 305 to ground. The turn on of the transistor 306 therefore clamps the back porch of the video signal to ground as shown at 312.

The vertical sync pulse is derived from the junction 325 by taking the signal available at the junction and inverting it by an amplifier 332, the output of which is connected to the base of a transistor 333. The transistor 333, as may be seen, is of the NPN variety and conducts in response to an output from the amplifier 332 and produces the vertical sync pulse which is therefore available at the terminal 334.

Horizontal pulses are produced by a monostable multivibrator 335 which is connected to conduct on the front edge of the sync pulse produced at the junction 325 and remain in a given state for a period of time determined by the RC network 336 connected between two of its terminals. Its output is coupled by a capacitor 337 to produce a negative-going spike which is supplied to the base of a transistor 338 turning off that transistor to produce a positive-going spike at its collector which is available at the terminal 339.

Thus, the circuits of FIGS. 3a and 3b separate the horizontal and vertical sync pulses from the composite video signal and produce a clamped video signal output to be converted into digital form.

The Clock

Figure 4A:
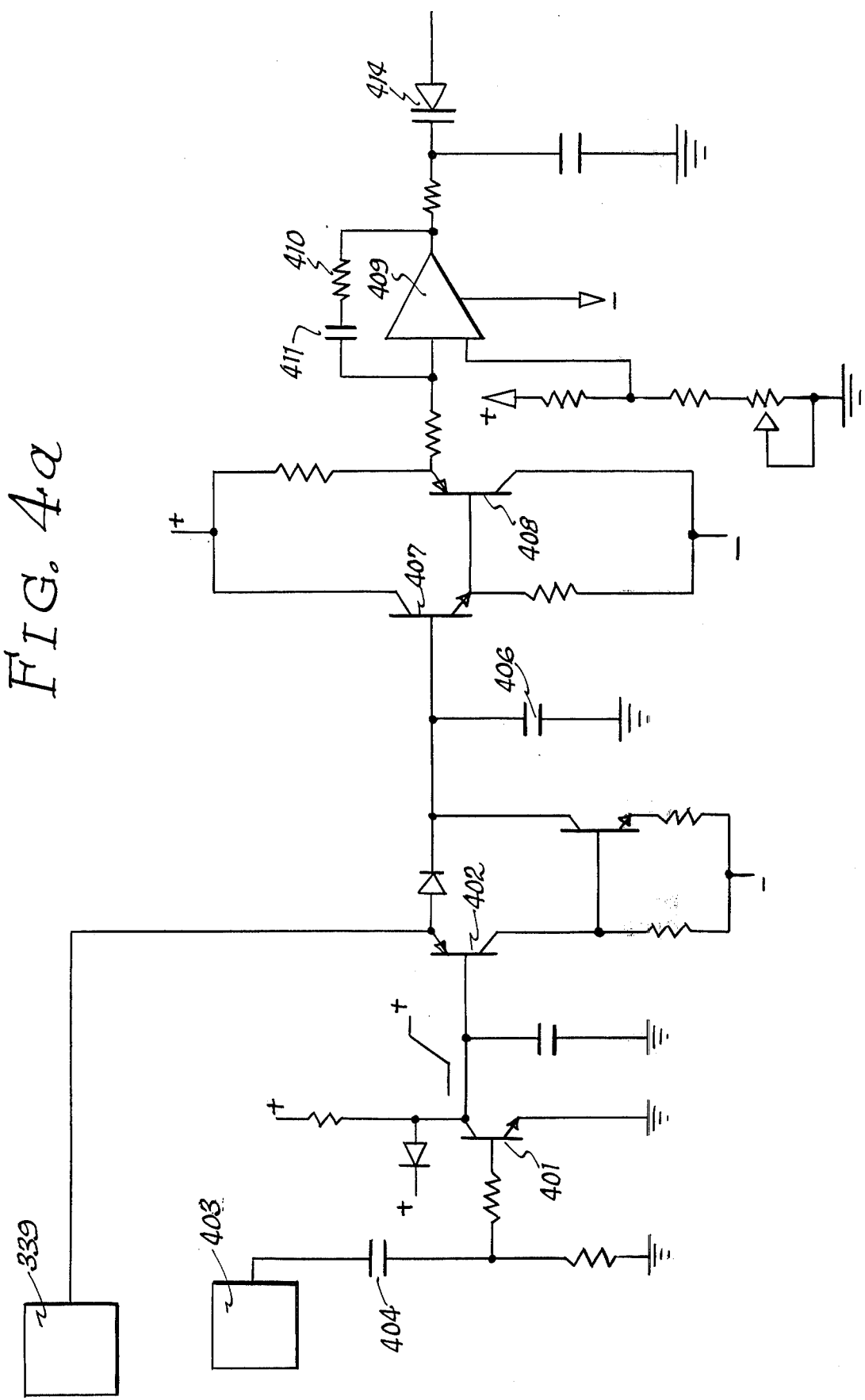
FIGS. 4a and 4b illustrate schematically the clock 209 forming a part of the video to digital converter 115.
Figure 4B:
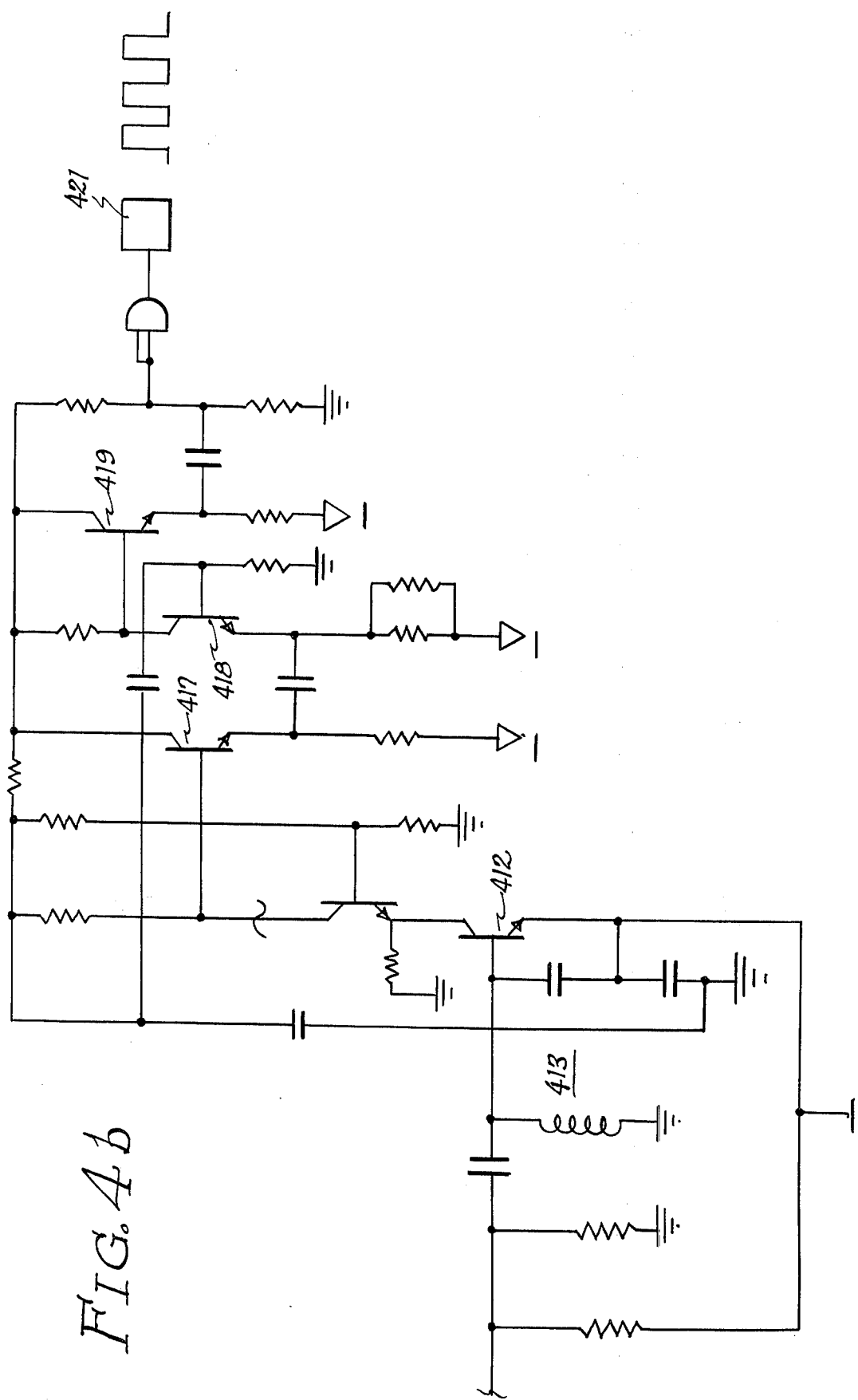

FIGS. 4a and 4b illustrate the circuit for a variable clock, the output of which is used to control the HVCD 208. Generally, it is the purpose of this circuit to provide a number of pulses ensuring equal divisions between the beginning of one video horizontal line and the beginning of the next such line. Thus, to ensure accuracy it is desired to make sure that the clock output maintains the same count from one sync pulse to the next sync pulse. This is accomplished by providing in the circuit of FIGS. 4a and 4b a means whereby the clock rate can be adjusted if the desired constant count is not maintained.

A transistor 401 is normally biased on and its collector is connected to the base of a transistor 402 whereby the transistor 402 is held near ground potential. An output of the HVCD 208 representing the starting pulse of a horizontal line, the derivation of which will be explained hereinafter, is supplied to the terminal 403 and coupled through a capacitor 404 causing the transistor 401 to turn off and its collector voltage to therefore rise. The horizontal sync pulse produced at the terminal 339 is applied to the emitter of the transistor 402 charging the capacitor 406. The component values are such that the discharge of capacitor 406 is very slow resulting in a substantially constant DC level being applied to a DC amplifier consisting of the transistors 407, 408 and the operational amplifier 409. In order to limit the AC response of the DC amplifier a feedback circuit is provided around the amplifier 409 by means of a resistor 410 and capacitor 411. The clock is provided by a transistor 412 connected so as to provide a Colpitts oscillator 413 which includes as one element a variable capacitor 414. The DC amplifier drives or changes the capacitance value of the variable capacitor 414 and in this manner frequency modulates the Colpitts oscillator. The output of the oscillator, a sine wave output, is supplied to a circuit consisting of transistors 417, 418 and 419 so as to produce a series of positive-going clock pulses which are supplied at the terminal 421 as the output 212 to the HVCD 208.

The Horizontal And Vertical Counters And Decoders

Figure 5A:
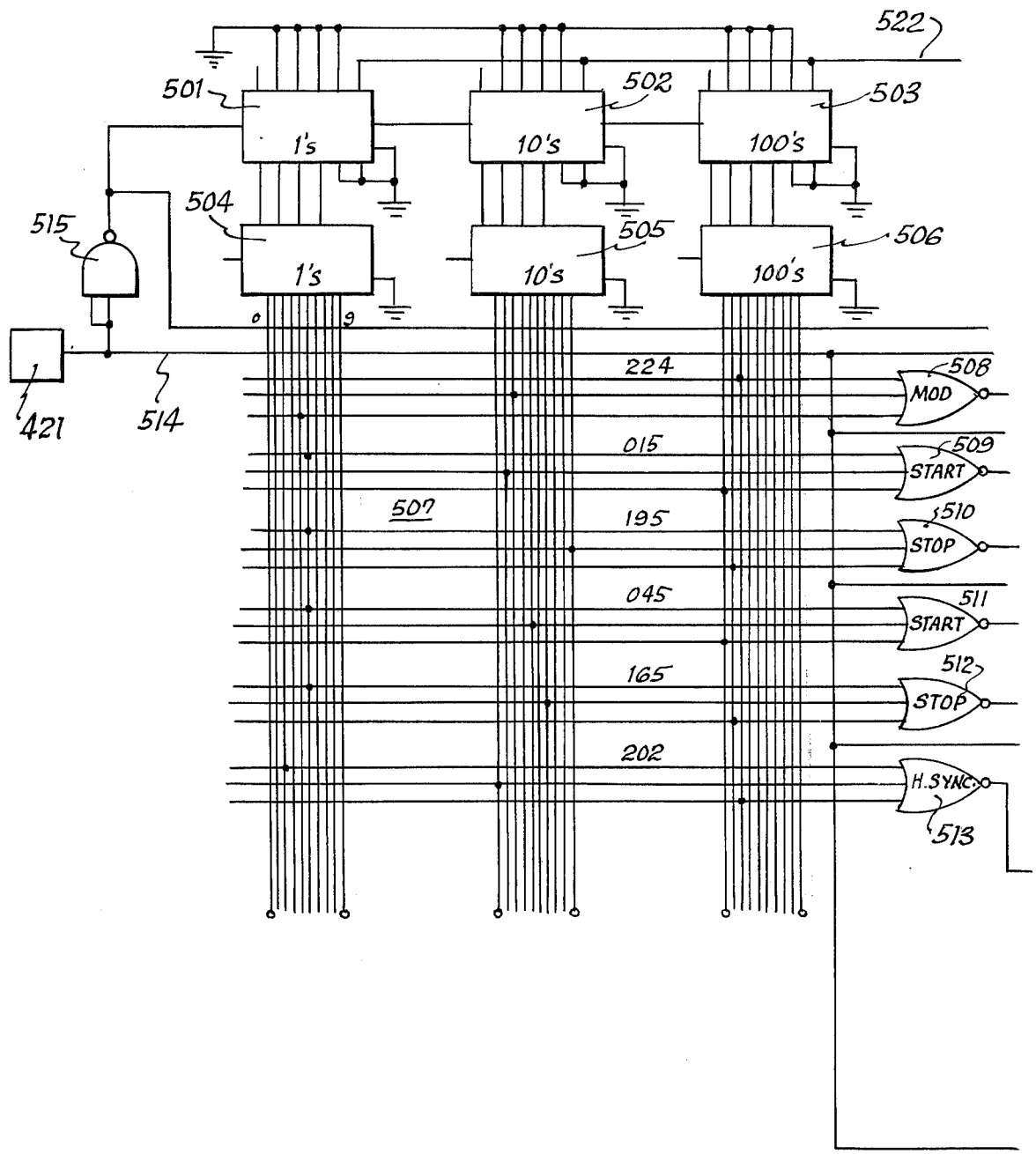
FIGS. 5a, 5b and 5c illustrate diagrammatically and schematically to horizontal and vertical decoders forming a part of the video to digital converter 115.
Figure 5B:
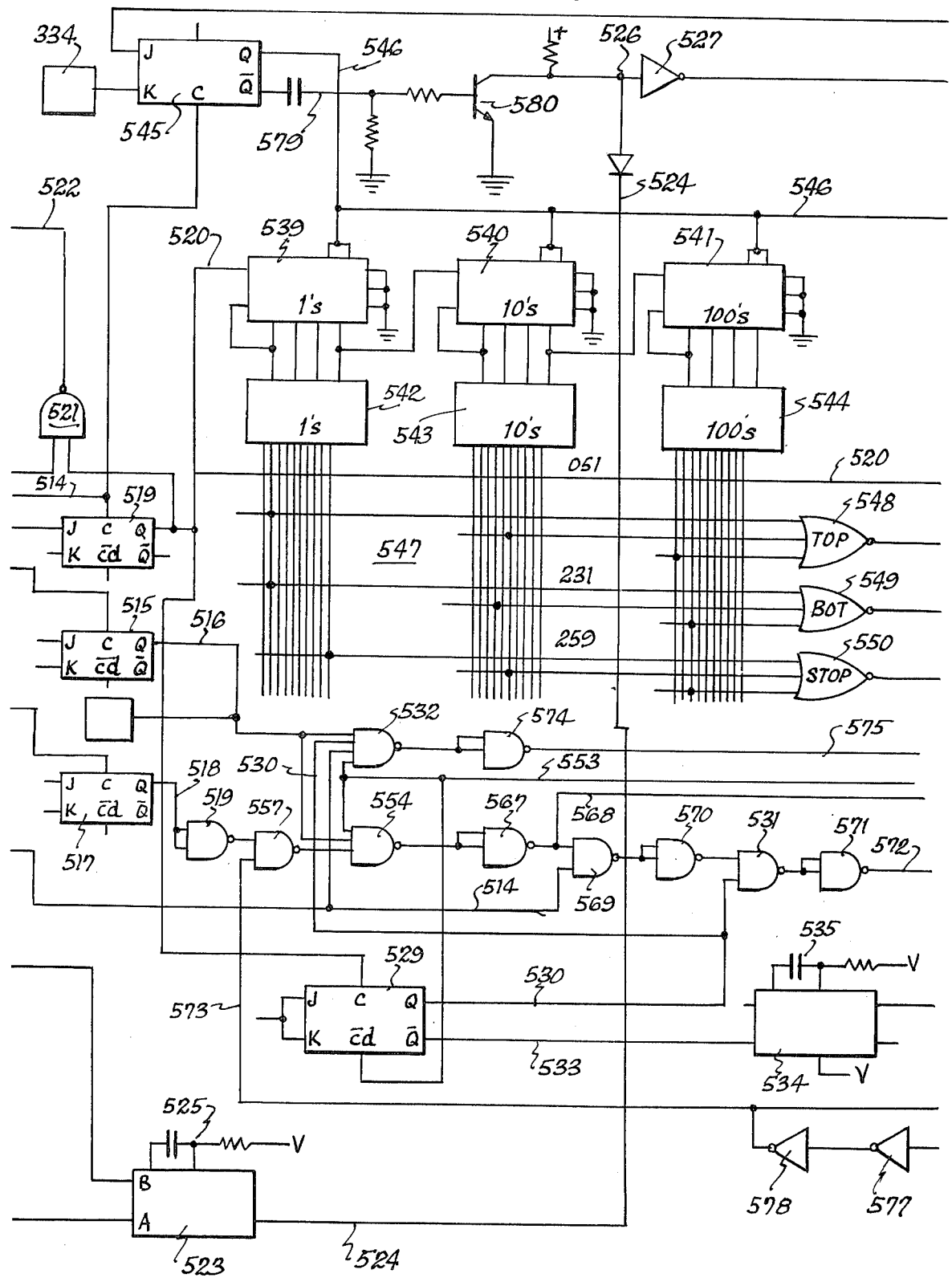
Figure 5C:
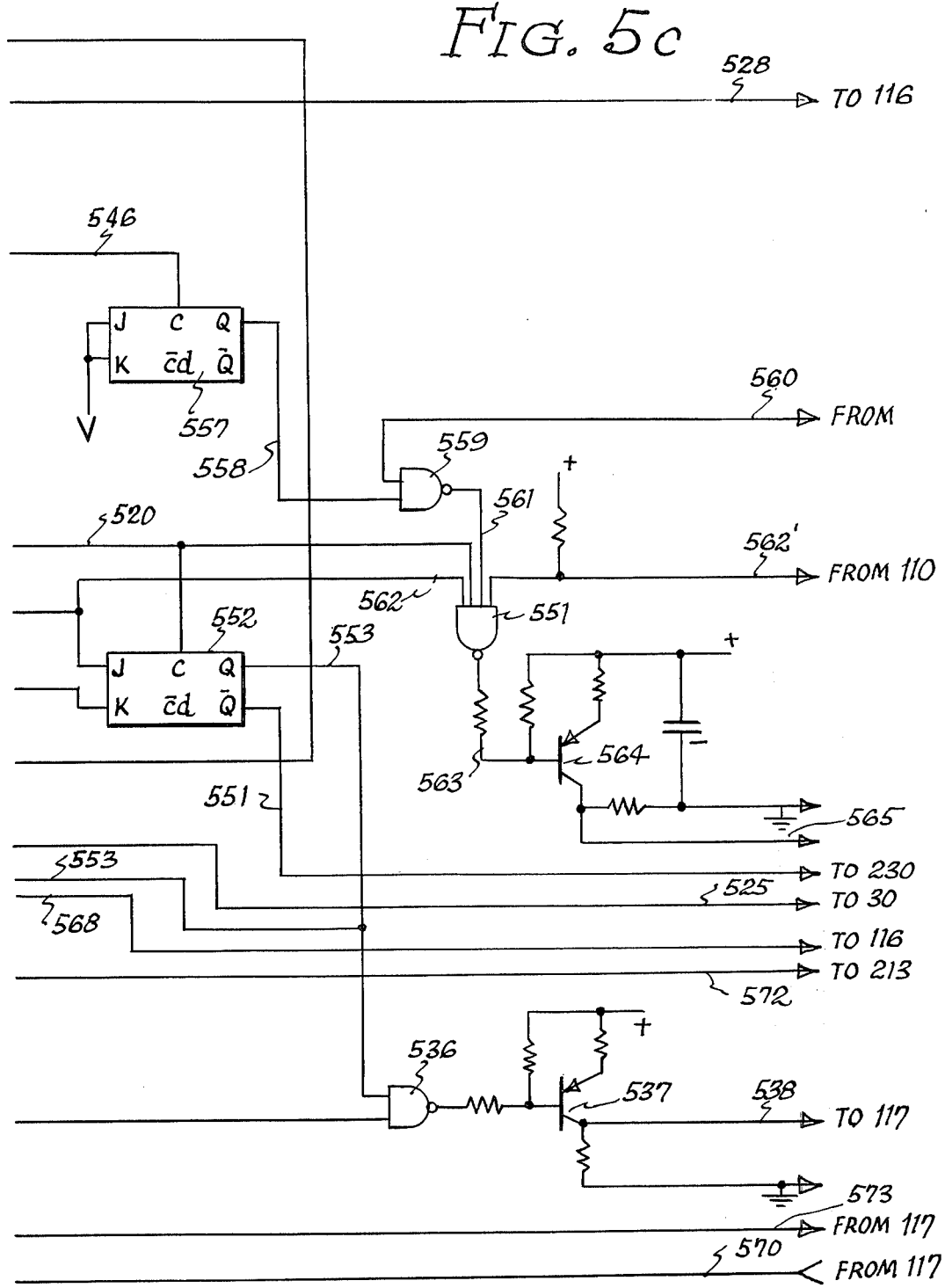

The HVCD 208 shown in block diagram fashion in FIG. 2 is illustrated in detail in FIGS. 5a, 5b and 5c.

Essentially, it is this circuit which develops the electrical signals which correspond to the indicating devices in the display board matrix and which are used to determine the frequency and the time when the video signal is to be sampled and the then sampled portion of that signal to be converted into digital form.

As pointed out previously, the display board matrix consists of 90 rows of display devices and 180 vertical columns and it is desired to provide a digital representation of the analogue value of the portion of the video signal intended to be displayed by each particular device in the matrix. As will be seen, means are provided whereby the size of the matrix can be changed. In the particular embodiment described, the matrix can be 180 by 90 or 120 by 90. As will be obvious, these dimensions can be altered as desired.

In order to accomplish its functions, the HVCD consists of a horizontal counter which divides each horizontal line into a desired number of segments to be sampled. It also includes a vertical counter which counts the number of horizontal lines to thereby provide signals indicating the end of a frame.

It was previously pointed out that the standard television signal in the United States consists of a picture transmitted at the rate of 60 fields per seond. It has been found that when a video picture is displayed on a large matrix board of the type discussed it is not necessary for picture quality to display frames at the 60 frame per second rate. In fact, it may not in all cases be possible to do so because of the time constants and response times of incandescent lamps and necessary switching devices. Therefore, the HVCD in this embodiment of the invention is provided with means to generate valid frame information at 30 frames per second. It should be understood, however, that any desired frame rate may be transmitted and the specific rate described should not be considered limiting.

The horizontal counter is constituted by three series-connected counters 501, 502 and 503 which may be of the binary coded decimal type and wherein the counter 501 counts units, the counter 502 counts tens and the counter 503 counts hundreds. The outputs of the counters 501, 502 and 503 are supplied to binary coded decimal to decimal converters 504, 505 and 506, each of which, as may be seen, has ten output terminals, the terminals providing, in each case, outputs for the decimal numbers 0 through 9 starting from the left-hand side. The outputs of each of the converters are connected into a grid 507. The vertical conductors of the grid are the outputs of the converters 504 to 506 while the horizontal lines are inputs to a series of NOR gates 508, 509, 510, 511, 512 and 513.

The output 212 of the clock 209 at the terminal 421 appears on the conductor 514 and as an input to gate 515 connected to function as an inverter. The inverted clock signal is counted in the serial counters 501, 502 and 503 so that the ones are counted in counter 501, tens in counter 502 and hundreds in counter 503. The count in the serial counters is immediately transferred in parallel to the BCD to decimal converters 504, 505 and 506 and as the count is achieved they appear as signals on the output buses of those converters which buses are connected in the grid 507 as described above.

The first count of interest in the illustrated embodiment is that which will enable the gate 509. This count is established to be 015 and gate buses are interconnected with the converter buses in the grid as shown by the dots indicated in order to derive that count. When that count is achieved, that is, when that number of clock pulses has been received, the gate 509 produces an output which initiates the start of a frame to be converted, specifically it identifies the left-hand side of that frame. It is to be noted that as shown the video to digital conversion is not begun starting at the extreme left-hand side of the frame actually represented by the video signal. This starting point is a matter of choice but it has been found that generally speaking it is desirable to display a central portion of a video frame omitting some of the top, bottom and sides. This practice is, of course, true for most home television receivers a well.

Upon the initiation of the start signal from the gate 509, the count continues until the clock count reaches 195 at which time the gate 510 is enabled to produce a stop signal. The outputs of the gates 509 and 510 constitute the inputs to bistable circuit 515 connected as to provide a START or high output at its terminal 516 when gate 509 is enabled and to produce a STOP or low output at that terminal when the gate 510 is enabled. A change in output of bistable circuit 515 when the clock count is 195, of course, designates the right-hand side of the portion of the frame to converted. As a result of this count a signal has been produced effective to divide each horizontal line of a frame into 180 equal parts (195–015).

The gates 511 and 512 are connected in the grid 507 to provide a short picture, one where each horizontal line to be displayed in divided into 120 parts (165–045) and control a bistable circuit 517 in a similar fashion to produce the desired start and stop signals at the terminal 518.

In addition to generating signals to provide the left and right-hand sides of the picture, the counters and decoders also produce a signal to reset the counters. As described previously with the description of the clock 209, it is desired that it count at a constant frequency from the middle of one sync signal to the middle of the next. This is achieved by the use of the gate 508 which is connected to the grid 507 to be enabled at a count of 224. The output of the gate 508 triggers a monostable circuit 519 which is supplied as one input via its terminal 520 to a NAND gate 521. The gate 521 also receives as an input the inverted clock pulse output of 514 and when enabled provides a signal via a bus 522 to reset the counters 501, 502 and 503 and therefore also decoders 504, 505 and 506 to zero. This indicates that the video for one horizontal line has been received.

As stated previously, a dot matrix monitor 116 is provided to permit inspection of the output of the video to digital converter. Horizontal and vertical sync signals, keyed to the digital output must be supplied to this monitor and the gate 513 and a monostable 523 are provided for that purpose. The gate 513 is connected at the grid to be enabled at a count of 202, that is, after a horizontal line has been divided into 202 segments. The count off 202 is arbitrary and was selected merely to ensure the presence of horizontal sync pulse in the monitor at some point after the conversion of one horizontal line and before another one is converted. When a count of 202 is reached, the output of the monostable changes for a period of time determined by RC circuit 525 and its output is a negative-going horizontal sync pulse on conductor 524. That pulse is combined with a vertical sync pulse at junction 526 and after conversion by an amplifier 527 is available at terminal 528 for the dot matrix monitor 116.

Because it has been found that the large display matrix need not be supplied with 60 frame per second and, as will be seen, operates satisfactorily when displaying 15 frames per second, the HVCD is provided with means to divide the frames in half. Another division by two is effected elsewhere in the system as will be described.

The first division by two is effected in part by a divide by two circuit 529. The input of this circuit is the output 520 of the bistable 519. The circuits are such that the output 520 is high during the count from 0 to 224, the duration of a horizontal line modulus. The divider 529 provides an output at 530 for every other change of state of the output 520 which output when high partially enables gates 531 and 532, the functions of which will be explained hereinafter.

Another output 533 of the divider 529 is supplied as an input to a monostable 534 which upon change of state of 529 produces a horizontal line sync pulse of a time duration determined by the RC timing circuit 535 which is supplied as one input to NAND gate 536. When gated through gate 536, the horizontal sync pulse for every other line is amplified by transistor 537 and is available at terminal 538 to be supplied to the video interface 117.

The modulus count of 224 determined by the gate 508 and monostable 519 in addition to being supplied to the divide by two circuit 529 is also supplied to the vertical decoder to produce the signals designating the top and the bottom of the picture to be displayed. Thus, the output 520 is supplied as an input to the serial counters 539, 540 and 541. The outputs of each of these counters are supplied in parallel to the BCD to decimal converters 542, 543 and 544. In order to maintain synchronism, the counters 539, 540 and 541 receive the vertical sync signal from the terminal 334. That signal is applied to a monostable 545 and the output 546 of the monostable is supplied to control terminals on the counters 539, 540 and 541 so as to reset when the vertical sync signal is over. Thus, at the end of each line a count is registered in the counter 539 which therefore counts ones while the counter 540 counts tens and the counter 541 counts hundreds. The outputs of the counters are transferred to the converters 542, 543 and 544, the outputs of which appear on the buses constituting the grid 547. Connected into the grid 547 are the NOR gates 548, 549 and 550. As may be seen, the NOR gate 548 is connected into the grid 547 so as to produce an output when the count of 051 is reached. This count determines the top of thee picture to be displayed. The NOR gate 549 is connected into the grid 547 so as to produce a count when the count of 231 is reached, this count indicating the bottom of the picture. A stop signal is generated when a count of 259 is determined by the NOR gate 550, the output of which then goes high resetting the bistable 545 causing its output 546 to go low to produce a reset signal. The count of 259 is provided to ensure that a full video field of 262.5 lines has been transmitted before a new conversion begins.

When the NOR gate 548 goes high, its output is supplied as one input to a gate 551 and as an input to a bistable 552. Thus, when a signal designating the top of the picture to be displayed is generated, an output 553 of the bistable 552 goes high and is applied at one input to the gates 532 and 536 and also as an input to a gate 554. The other output 555 of the bistable 552 is supplied as an input to the store board 230 and appears at the terminal 556 which it performs a function to be described in detail hereinafter.

A divide by two circuit 557 is provided in the vertical decoder and receives the vertical sync signal via 546. The output 558 of this circuit because it is a divider goes high at one-half the frequency of the vertical sync signal and, as may be seen, is supplied as one input to a gate 559. The other input to the gate 559 is a signal at 30 cycles per second derived from the slicer board 213 and which is available at the input line 560. The output 561 of the gate 559 is connected as another input to the gate 551 which, also, as has been stated, receives the output 520 of the modulus determining circuit consisting of the gate 508 and monostable 519. A further input to the gate 551 is derived from the output 562 of the gate 548 while a still further input 562 to the gate 551 is derived from the video disc 110 and is generated when the disc indicates that a video signal may be recorded thereon. Thus, the gate 551 is effective to generate a signal when it is desired to record a video signal on a video disc and there is a signal available from the disc storage device to indicate that a signal may be recorded and signals are available from the video converter indicating that signals are available for recording. This signal is produced by the output 563 of the gate 551, is amplified by the transistor amplifier 564 and is produced at the terminal 565.

The means provided to produce the signal necessary to divide each horizontal video line into desired segments for conversion to digital form will now be described.

When it is desired that the large matrix display be constituted by 180 vertical rows, as stated previously, the start of that display is commenced at the left-hand corner of the first horizontal row. The signal indicating this start point is that produced by the gate 509 which, when the count of 015 is reached, causes the output 516 of the bistable 515 to go high. The output 566 of the gate 557 is one of the inputs to the gate 554. The output 566 is normally high but goes low under a circumstance to be described hereinafter. Thus, when the count 015 is reached, the output of the gate 554 goes high and is inverted by 567. The inverted output of 567 is supplied via conductor 568 as one output of the converter to the dot matrix monitor 116 to provide a signal permitting that monitor to display a picture.

Another output of 567 is supplied as an input to a gate 569 which also receives as an input the clock signals via 514. This gate ensures synchronism between the output of the decoder and the output of the clock 209. The output of the gates 569 is inverted by the element 570 and is supplied as one input to the gate 531 which receives as its other input the output 530 of the divide by two circuit 529. Thus, the gate 531 will be enabled on every other horizontal line and its output will be supplied via an inverter 571 to a terminal 572 which constitutes the input clock signal to the slicer board 213. This signal, when available on the slicer board, permits the encoders forming a part of that board to code into digital form the video signal being received.

Thus, the terminal 572 produces the necessary clock signals for every other horizontal line until a stop signal is produced when the count of 195 is reached as determined by the change of state of the gate 510 and the consequent change of state of the bistable 515.

When it is desired to produce a short picture, that is, one having 120 display devices in a horizontal row instead of 180, a signal commanding such an operation is received from the video interface 117 via a conductor 573. This signal is supplied as one input to the gate 557. The other input to the gate 557 is derived from the bistable 517, the output 518 of which changes state is response to outputs of the gates 511 and 512. As stated, the gate 511 is enabled when the count of 045 is reached while the gate 512 is enabled when the count of 165 is reached, the difference between these two being 120. Thus, if a short picture signal is received, the output 566 of the gate 557 inhibits the output of the gate 554 until the count of 045 is reached. When the count of 554 is reached, the gate 554 is enabled and every other clock pulse is available at 572 until the count of 165 is reached as determined by the operation of the gate 512 and bistable 517.

Another signal produced by the HVCD 208 is a signal used to shift a converted field through the shift registers 232 to effect the one field delay for the purpose described. This signal is derived from the gate 532 which has four inputs, the output 216 of the bistable 515, the output 530 of the divide by two circuit 529, the output 553 of the bistable 552 and the clock pulses available at 421 derived via 514. Thus, the outputs of the gate 532 are the clock pulses produced for every other horizontal line which are inverted at 574 and are available at the terminal 575.

When it is desired to record a short line picture, a signal is produced at the terminal 576 buffered at 577 and 578 and is applied to the gate 557 via 573 to enable that gate causing it to enable the gate 554 to produce the requisite number of short line pulses as described previously.

In order to provide the necessary sync signals for the slicer board and its associated dot matrix monitor 116, the vertical sync signal available at 334 and effective to control the operation of the bistable 545 is supplied via its output 579 to the transistor amplifier 580. The vertical sync signal appearing on the collector of the transistor 580 is combined at the junction 526 with the horizontal sync signals produced by the monostable 523 via 524 and after amplification at 527 produces a composite sync signal at the output 528.

The Slicer Board

Figure 6A:
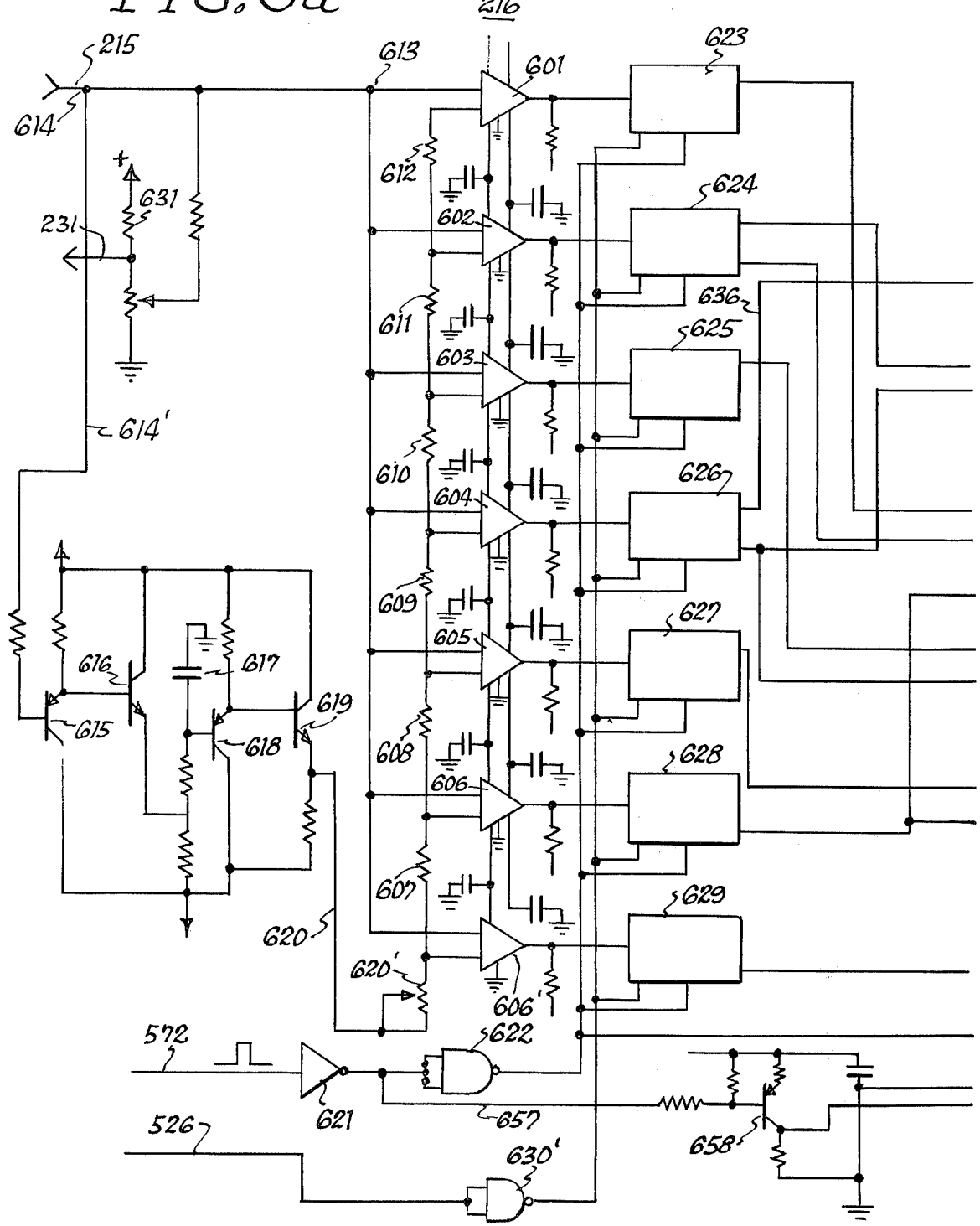
FIGS. 6a and 6b illustrate diagrammatically and schematically the slicer board 213 forming a part of the video to digital converter 115.
Figure 6B:
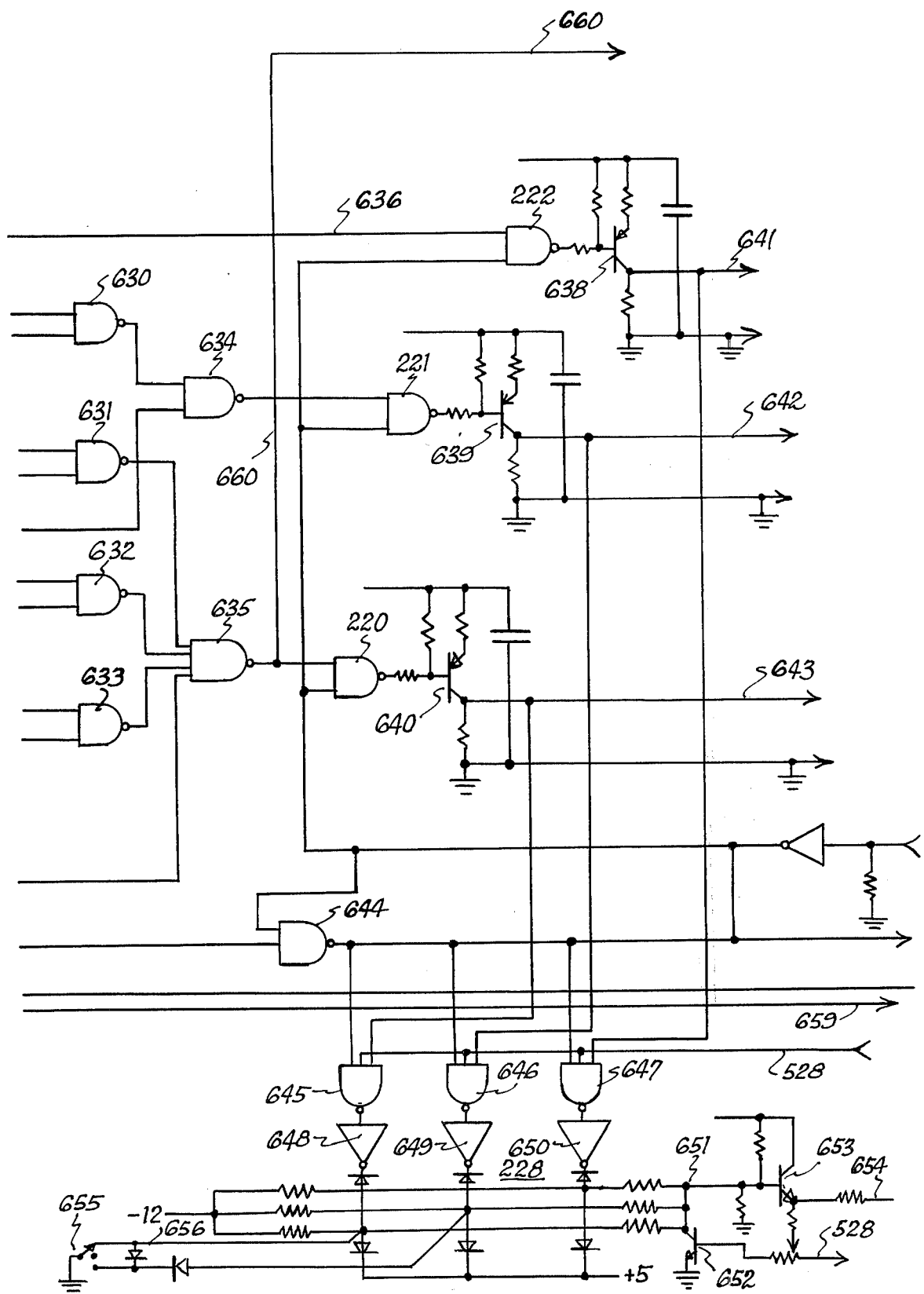

The actual digital signals after conversion are produced by the slicer board, the circuit of which is illustrated in FIGS. 6a and 6b.

In this figure, the comparators 216 which receive the clamped video signal 215 are constituted by an array of differential amplifiers 601 through 606' which compare the clamped video with signals representing the peak white or maximum brightness of the picture divided by a resistor string, consisting of resistors 607 through 612, and supplied as one input to those amplifiers. To achieve this the clamped video 215 is supplied as one input via junction 613 to each of the amplifiers 601 through 606'. The clamped video is divided at the junction 614 and supplied via 614' to the base of a transistor 615. The emitter of the transistor 615 is connected to the base of a transistor 616 of the opposite conductivity type so that when the transistor 615 conducts the transistor 616 will follow. Thus, as the transistor 615 conduits the transistor 616 conducts charging a capacitor 617. The time constant of the circuit including the capacitor 617 is selected so that it will receive and hold the maximum value of one video frame for the full time that such a frame is being transmitted and will thereby control the conduction of a transistor 618. The emitter of the transistor 618 is connected to the base of a transistor 619 of the opposite conductivity type so that a variable negative voltage appears at the emitter of the transistor 619 which is proportional to the peak white or maximum brightness of the frame being transmitted. This voltage is applied via 620 and the resistor string 607 through 612 to the negative input terminals of the differential amplifiers 601 through 606' to adjust the negative bias on each of these amplifiers. The amount of negative bias is determined by the amount of resistance in the string 607 through 612 through which such bias is applied. Thus, the amplifier 606 is biased more negatively than is the amplifier 605 and so on while the amplifier 601 has the least amount of negative bias applied thereto. An adjustable resistor 620' may be provided to determine an overall bias level in order to establish desired operating points for each of the amplifiers 601 through 606'.

Consequently, as the clamped video signal is supplied to the positive terminals of the amplifiers, each amlifier will provide an output signal only to the extent that the video signal supplied thereto exceeds the negative bias. Thus, when the video signal is of relatively low amplitude, only the amplifier 601 or 602 will conduct. As the brightness of the scene or a portion thereof increases, any one of the other amplifiers may conduct with the amplifier 606, conducting when the clamped video signal exceeds the negative bias being applied to that particular amplifier. The circuit just described constitutes the comparators 216 of FIG. 2 and, as may be seen, produces one or more output signals depending upon the amplitude of the varying video signal.

Each video signal received is sampled at a rate determined by the frequency of the clock signal produced at the terminal 572 of the HVCD 208. As described previously, this clock signal may be either 180 or 120 times for each horizontal trace of the video signal. Thus, the clock signal is received at 572 and is buffered at 621 and after inversion at 622 to provide a positive going pulse is supplied as one input to the bistables 623 through 629. Another input to the bistables 623 through 629 are the composite sync signals available at 526. These signals are inverted at 630' and are applied to terminals of the bistables 623 through 629 and are effective to inhibit the operation of those devices during the presence of any sync signal so as to ensure that their outputs reflect solely a response to the varying levels of the video signal being converted.

The positive going clock pulse available at 572 and supplied through 622 functions to provide a clock pulse permitting the bistables 623 through 629 to produce an output or change in state only when a clock pulse is present. In this manner a horizontal video line is sampled at a rate determined by the frequency of the clock pulses. In the case of the long picture this is 180 times per horizontal line and in the case of the short picture this is 120 times per horizontal line.

Thus, each of the bistables will have a change of state depending upon whether its associated differential amplifier conducts. Whether or not any one or more of the differential amplifiers conducts depends upon the amplitude of the clamped video signal as compared to an adjustable negative bias on each such amplifier representing the peak white or maximum brightness of the frame being transmitted. The bistables therefore produce discrete outputs indicative of the variations in the amplitude of the analogue video signal.

In order to encode or provide digital representations of these analogue values, an encoder consisting of a series of NAND gates 630, 631, 632, 633, 634, 635, 220, 221 and 222 are provided.

Previously, it has been indicated that in the system being described a three bit code will permit eight levels of brightness to be derived. The first bit in this code, MSB, is always zero through the first four levels and is produced at the output of the NAND gate 222, the output of which is zero or low if both of its inputs are. As may be seen, one input to this gate is the output 636 of the bistable 626. Therefore, when the video signal is of an amplitude sufficient to cause only the amplifiers 601 through 604 to conduct, the MSB in levels 1 through 4, the output 636 of bistable 626 goes high partially enabling the gate 222. Whether or not the gate 222 changes state under these circumstances depends upon the condition of its other input, the control of which will be described hereinafter.

The NAND gate 634 produces the B2 bit while the NAND gate 635 produces the LSB bit. Each of these gates has the inputs shown in the drawing and truth tables can easily be constructed showing under what circumstances either of these gates change state. The conductive state of these gates, of course, determines whether these bits are zeros or ones, thereby encoding the outputs of the amplifiers 601 through 606' in the manner described above.

A record signal at 637 constitutes the other inputs to the gates 220, 221 and 222 and is produced by the video interface 117 when it is desired to start transferring the output of the video to digital converter to the data processor 118. The transistor amplifiers 638, 639 and 640 amplify and provide the now digitally coded brightness data at the terminals 641, 642 and 643.

The dot matrix monitor 116 receives an analogue video signal of the actual picture converted by the digital to analogue converter 228. A display on the monitor is permitted by the receipt of a record signal 637 which enables a gate 644 to transmit clock pulses from the gate 622. The output of the gate 644 constitutes one input to each of the gates 645, 646 and 647 which also receive repectively MSB, B2 and LSB data from the output transistors 638, 639 and 640 and the composite sync signal from via terminal 528 from the HVCD. The outputs of the gates are buffered at 648, 649 and 650 and the buffered outputs are supplied as inputs to the D to A converter 228 constructed in the well known fashion using a weighted resistor chain whereby a reconstructed video signal appears at the junction 651. The necessary horizontal and vertical sync signals are derived from the HVCD 208 via terminal 528 which is connected to the base of transistor 652 so that the sync signals are combined with the video at 651. An emitter follower transistor 653 receives the reconstituted video and the sync signals and provides an output 654 to the monitor 116.

Depending on how many shades of gray are to be displayed on the large matrix display, the digital to analogue to digital converter may be adjusted so that the display on the monitor 116 shows the picture with a like number. This is accomplished by a three-position switch 655, the movable arm of which is grounded as shown. When the arm is in the uppermost position, a conductor 656 connects the output of the LSB amplifier 648 to ground so that its output is not reconverted while the MSB and B2 bits are. In the middle position, no amplifier outputs are grounded and all bits are reconverted. Under these circumstances, the video monitor will display eight shades of gray. In the bottommost position the switch grounds LSB and B2 and the monitor will display only B/W or black and white data.

In order to ensure that the video interface receives, stores and transmits data in synchronism with its conversion, the clock signal from amplifier 616 is supplied via conductor 657 and transistor amplifier 658 to an output terminal 659.

It has been pointed out previously that in order to eliminate the effect of video signals that may vary up and down from one level to the next one input to the differential amplifiers 601 through 606' is a frame which has been delayed. The delay effected by the store board 230 receives as its output the LSB data from gate 635. This is supplied via a conductor 660 as an input to that board. The delayed frame, the output 231 of that board, is supplied to voltage divider 661 from which it is combined with the clamped video at the junction 662.

The Store Board

Figure 7A:
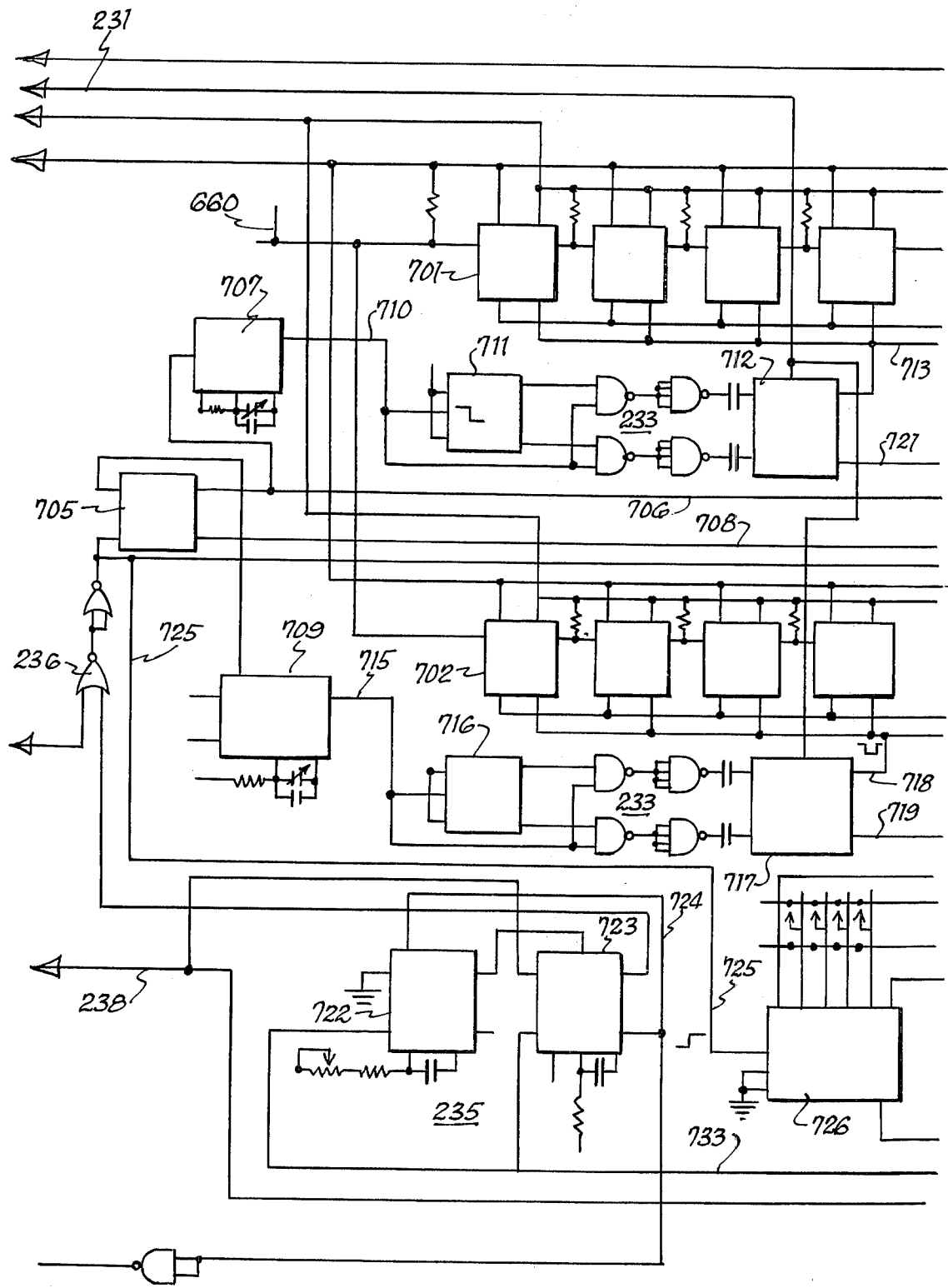
FIGS. 7a and 7b illustrate diagrammatically the store borad 230 forming a part of the video to digital converter 115.
Figure 7B:
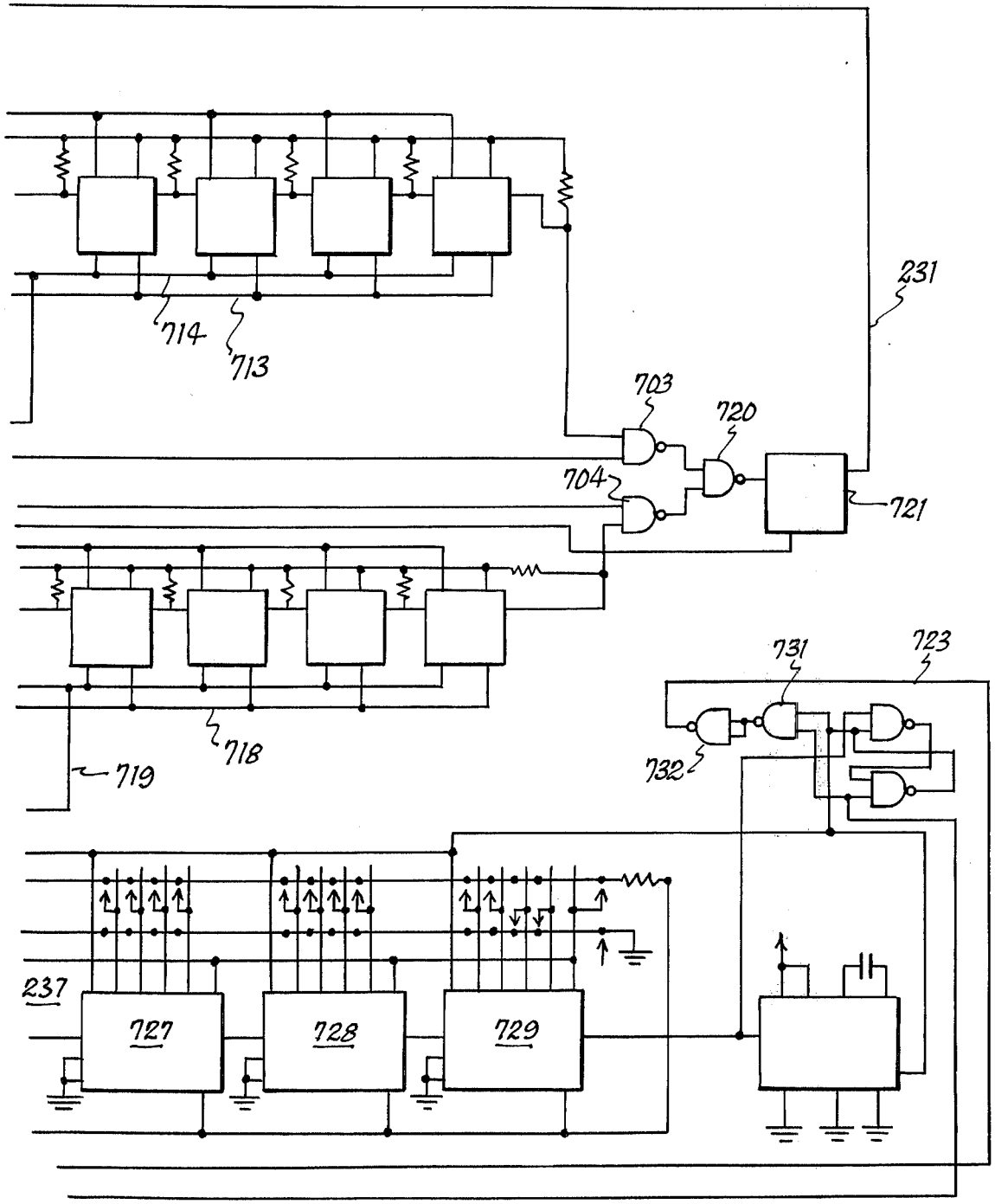

The video field to be delayed one field by the store is supplied as the input 660 to the store shown in FIGS. 7a and 7b.

The delay is achieved by shifting the field data through a shift register 233 at a rate determined by the clock output of HVCD 208. In an actual embodiment, the shift register constitutes a pair of serial registers, an upper register 701 and a lower register 702. The registers are constructed so when one register is having data entered, the other register is shifted. The output of the upper register is to a NAND gate 703 while the lower register outputs to a NAND gate 704.

The signal for shifting the data through the registers is the store clock pulse supplied as an input to the NOR gate 236. The output of this gate is supplied to a flip flop 705 which provides a first output 706 to a monostable 707 and the NAND gate 703. A second output 708 is supplied as an input to a monostable 709 and to the NAND gate 704. The output of the monostable 707 is a positive pulse of fixed duration in response to a received store clock pulse and that output 710 drives a flip-flop 711 which is gated through to the two input terminals of a clock driver 712. The gating is such that in response to one store clock pulse the shift bus 713 will be pulsed to shift the data in the register and in response to the next clock pulse, the data in bus 714 will be pulsed to permit new data to be entered.

At the same time, the output 715 of the monostable 709 is driving the flip-flop 716 which causes the driver 717 associated with the shift register 702 to operate to receive data shift data 180° out of phase with the operation of the register 701. It should be understood that the specific arrangement of the shift register is not critical for a single shift register to achieve the one field delay could be used providing its shift rate were fast enough to handle the data at the rate it is being received.

The outputs of the upper and lower registers from the gates 703 and 704 are combined at a NAND gate 720 and drive a bistable 721 to produce data making up one video frame delayed one frame time at the output 231.

The HVCD 208 is arranged for a display raster of 180 by 90 bits so that the total number of bits in a field to be shifted is 16,200 ((180 × 90). When the bottom of the raster is reached, some bits will still be in the shift register and must be shifted through. To accomplish this, a Register Idle signal is provided in the HVCD at 238. This occurs at the beginning of the vertical blanking period and starts a clock 235. The clock 235 is constituted by an oscillator consisting of a pair of interconnected monostables 722 and 723 producing a pulse output at 724 which is supplied to the NOR gate 236. These pulses continue to operate the clock driver 233 to shift the frame data remaining in the registers 232 through those registers to ensure that all frame data received by the store board is provided as a return to the slicer board 213.

The period of time during which the oscillator must operate to provide its supplementary shift pulses is determined by the bit counter 237. The store clock and oscillator clock pulses are provided as an input 725 to the bit counter which consists of a plurality of serial counters 726, 727, 728 and 729. The counters count the required number of bits to carry the data through the vertical blanking period and generate a stop pulse at gate 731 which is inverted by gate 732 and is supplied via 733 to stop the oscillator 235.

The Video Interface

It should be understood that the embodiment illustrated is by way of exemplification only for the interface is determined by the data processor used, the program used, and may be varied by a designer. The important criteria are that the interface be capable of inserting the digitized video data in a memory device and calling that data from the memory as desired for display.

Generally speaking, it is contemplated that the digital data necessary to display a picture go into the processor memory at locations specifically assigned to individual display devices in the matrix and be recalled from the memory in the sequence desired.

To accomplish this in the embodiment described, where the memory is of the magnetic core type two memory fields are used, one for black and white data (B/W) and one for gray data (GRY), for each video frame.

The output of the video to digital converter for each frame is a Frame pulse at the beginning of each frame, Start Line signals at the beginning of each horizontal line in a frame and the necessary Data Bit Sync or clock pulses for each frame. The Data Bit Sync (DBS) pulses for each line will in this embodiment number 180 or 120 depending on whether a long picture or short picture is to be displayed. The DBS pulses are each associated with the light intensity data ((MSB and B2 bits) used ultimately to control a particular display device in the matrix. Therefore, the video to digital converter also supplies MSB, B2 and LSB data to the interface. As pointed out previously, only the MSB and B2 bits are used in one embodiment to produce B/W and GRY data which are combined to provide OFF, $GRY_1$, $GRY_2$ and BRIGHT states for the display device, a so-called four shades of gray mode of operation. As will be seen, all three output bits may be used to provide an eight shades of gray mode of operation if desired.

It is once again noted that standard television display in the United States is at the rate of 60 fields per second and the video to digital converter produces digital data for display at the rate of 30 frames per second. For practical reasons in the operation of the display matrix it has been found that if it displays frames at the rate of 15 per second a very satisfactory display is achieved. Therefore, one function of the video interface is to divide the frame input rate by two and so it stores frames at the rate of 15 per second. These particular numbers are, of course, not critical and may be varied by a designer.

The particular data processor used in this embodiment is a PDP8/E computer manufactured by the Digital computer, as does many others, uses a 12 bit computer word. Thus, the black and white data, the MSB data, for one horizontal line of a long picture can be contained in 15 computer words (180/12) and the same data for one line of a short picture can be contained in 10 computer words (120/12). The additional data, the B2 data, necessary for four shades of gray therefore requires 15 additional words for the long picture and 12 additional words for the short picture when a four shades of gray system is provided. When a eight shades of gray system is used the same numbers of additional words are required for the additional data, the LSB data.

As described previously, each display device is assigned a specific numerical address (octal) starting with zero in the upper left-hand corner and incrementing by one going down the column headed by the device in the position. Therefore, if there are 90 display devices in a vertical column and the one at the upper left-hand corner is numbered zero, then the device immediately to its right is number 90 (decimal). Since the video digital data is being produced for each sequential horizontal line starting at its left-hand side and proceeding along that line and the memory locations in the data processor are arranged with the first location numbered zero (0000, octal) and the next device immediately below in the same column numbered (0001, octal), it is necessary when the video data has been received and assigned to the memory location 0001 to assign the next data bit to memory location 91 (0132, octal). Therefore, the video interface, after the video data has been received for the first memory address in a horizontal line, adds 90 in order to obtain the next memory address. The interface also divides the data bits by 12 in order to determine when a complete word has been transmitted and counts the number of words (15 or 10) to provide an indication of the receipt and storage of the data for a complete line, long or short.

Essentially, the interface operates in response to initiation by an operator who instructs a program to transfer digitized video data, one frame at a time into or out of the processor memory. One mode of transfer is called the Record Mode where successive video frames are transferred into the memory at the rate of 15 frames per second. Another mode of transfer is the Graphics Mode where a single frame is transferred. This frame after storage may be inspected on the dot matrix monitor and then transferred to the disc memory 119 to be recalled for later use. This mode may be used for storing slides, still pictures or messages. The interface also permits digitized video stored in memory to be displayed on the dot matrix monitor 116.

The transfer of data into and out of the memory of the PDP8/E is accomplished using a Data Break transfer (Data BRK). The "Digital PDP8/E Small Computer Handbook" published in 1971 by Digital Equipment Corporation of Maynard, Massachusetts describes in Chapter 6 its data break system. Generally, such a system takes over a processor memory cycle for the purpose of transferring into and out of the memory and requires a register to receive the word being transferred, a memory address and a program to instruct the processor. Chapter 10 of the above publication provides an explanation as to how devices such as the video to digital converter and the large display matrix with its controls and logic 103 may be interfaced with the PDP8/E using the data break capability.

Video Control

Before proceeding with the description of the video interface it is pointed out that the video to digital converter 115 durng a conversion operation is producing signals necessary to synchronize the operation of the interface and the converter. These signals as used in the interface are designated as the DATA BIT SYNC, FRAME and START LINE signals. The first of these, DATA BIT SYNC are the clock pulses of the converter and determine the time or sampling interval during which a horizontal video line is sampled. The latter two signals provide the information indicated by their designations. These three signals are used in conjunction with signals generated by the data processor to control the data transmission when a digitized video image is transferred from the video system to core memory or vice versa.

The Video Clock

A first element of the video interface is a clock shown in FIG. 8. In this figure a monostable multivibrator 801 receives the DATA BIT SYNC signal from the converter while its output terminal is applied to the clock terminal of a J-K flip flop 802. A conductor 803 connects DATA BIT SYNC to the flip flop 802 so that 802 is reset by the trailing edge of the pulse. The flip flop 802 upon being clocked by multivibrator 801 generates Record Mode clock pulses and DATA STB pulses. The Record Mode pulses are supplied via a conductor 804 as one input to a NAND gate 805. Display mode clock pulses are derived from terminal 6 of multivibrator 801 and supplied via a conductor 806 as one input to a NAND gate 807. The DATA STB (data strobe) pulses are derived via a $\overline{Q}$ terminal of flip flop 802 on the conductor 808 and are used in Display Mode to strobe data through B/W and GRY data gates to the converter 115.

Either the gate 805 or the gate 807 is enabled to produce either Record Clock or Display Clock pulses when the 1 FRAME signal is present depending upon the video transfer mode selected. As will be explained subsequently, either of these pulse trains provide clock signals to step serial data into or out of serial/parallel data registers used as buffers for data entering or exiting the data processor.

The outputs of the gates 805 or 807, therefore, constitute inputs to the NOR gate 809 which produces clock pulses (CLK) at its output 810.

The CLK pulses are used to control the data transmission of one frame through the video interface to or from the data processor. Thus, in either the Record Mode or the Display Mode each clock pulse is supplied to counter 811 which in the illustrated embodiment is set to divide by 12 — the number of data bits in a processor word and equivalent to 12 lamps on the display board. Various counts are taken from various stages of the counter 811 via conductors 812, 813, 814 and 815 and are designated as A, B, C and D. As may be seen, they are inverted and combined to produce $\overline{A}$, $\overline{B}$, CD and $\overline{CD}$ signals to provide basic timing signals to control word, line and frame transmissions to the core memory.

In any transmission mode, the processors single cycle data break facility is used to transfer video data words. Two such breaks are in succession for each word. The first break (BRK 1) transfers the black and white data while the second break (BRK 2) transfers the gray data.

In a long video frame (180 lamps in a horizontal row) the video clock receives 180 DATA BIT SYNC pulses for each line while in a short frame (120 lamps in a row) 120 such pulses are received. Consequently, the divide by counter 12 811 divides each line into either fifteen or ten 12 bit computer words. To this end every 12 clock pulse count taken from conductor 815 is supplied via a conductor 816 to a down counter 817. The counter 817 is present to count 14 (LONG) or nine short (SHORT) words and when it reaches zero to generate an end of line (EOT) pulse.

Thus the video clock receiving the DATA BIT SYNC pulses from the converter 115 and has generated the basic timing and synchronizing signals for use throughout the video interface.

SIGN DONE

Another signal in the nature of time signal is produced a binary counter consisting of two stages 900 and 901. This counter is used to provide a SIGN DONE signal ech time a number of lines equal to the number of horizontal rows in a display board have been counted by the counter 817. EOT derived from 818 is supplied as the input to the down clock (DN CLK) terminal of the first stage counter 900 and its output at the borrow terminal constitutes the input to the second stage 901. Upon counting 90 in the illustrated embodiment a SIGN DONE signal is produced at 902. At the beginning of the data transmission a START FRAME is supplied via terminals 904 and 905 to the load terminals of each counter to insert the number 90. The SIGN DONE signal generates an interrupt to the processor and new 10T commands or software commands are required to begin transmission of the next video frame.

The Memory Address Generator

As stated previously, the digitized video is stored in the processor memory as specified locations corresponding to the location of the lamps on the display board. That is to say, twelve lamps in the first row starting in the upper left-hand corner have corresponding memory locations in one memory field for the B/W data and corresponding memory locations in another memory field for the GRY data. The twelve lamps immediately below those twelve in the next row are assigned the next memory location. However, since a television scan is from left to right along one horizontal line until it is complete it is necessary when storing data in the processor to store the first word in the first memory location and to store the next word not in the next location but rather in a memory location, the address of which is incremented from the first by a number equal to the number of horizontal lines. In the embodiment described where the display board is 90 × 180 (or 90 × 120) lamps the address increment is therefore ninety for each succeeding word until a horizontal line is complete.

Figure 10A:
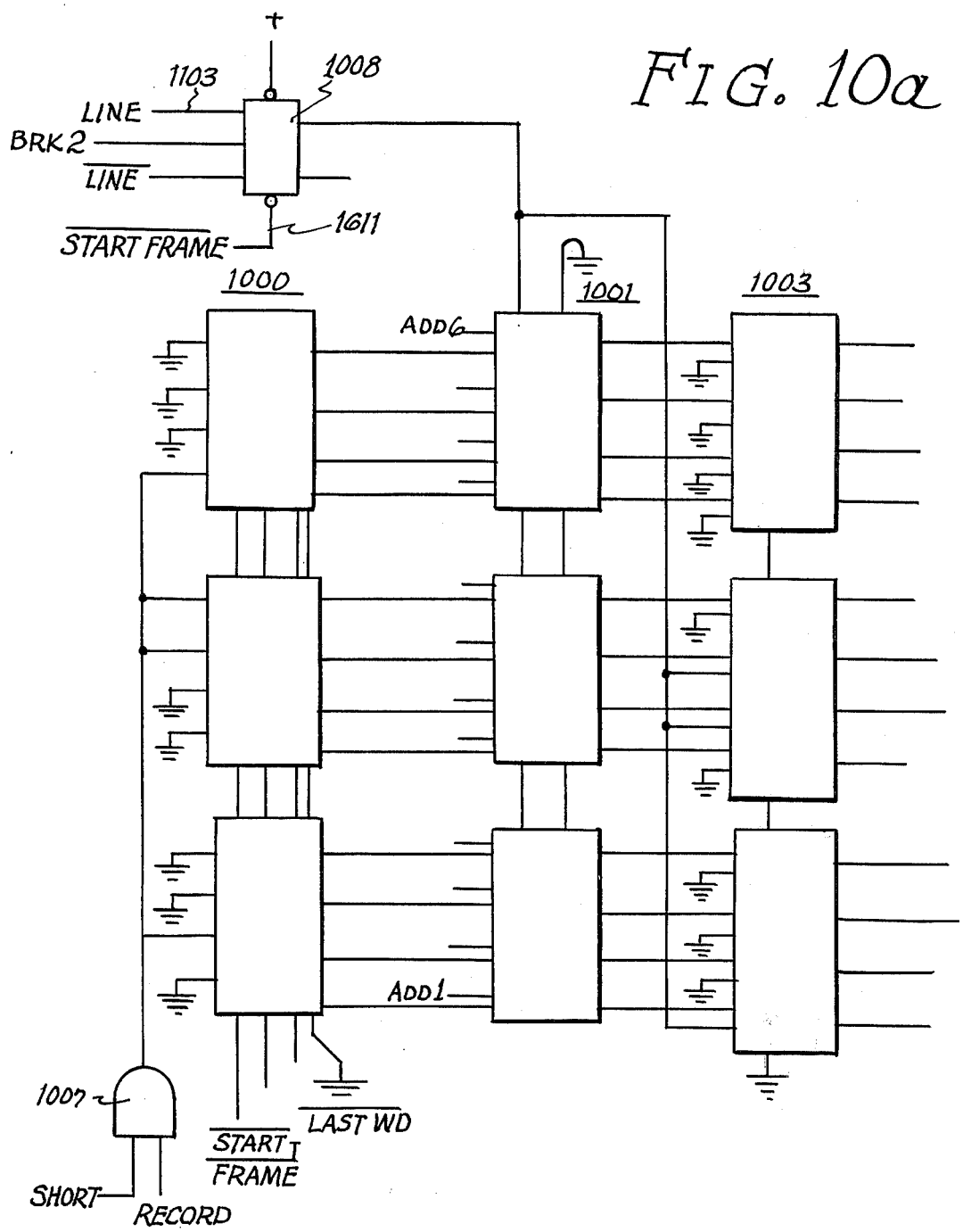
Figure 12:
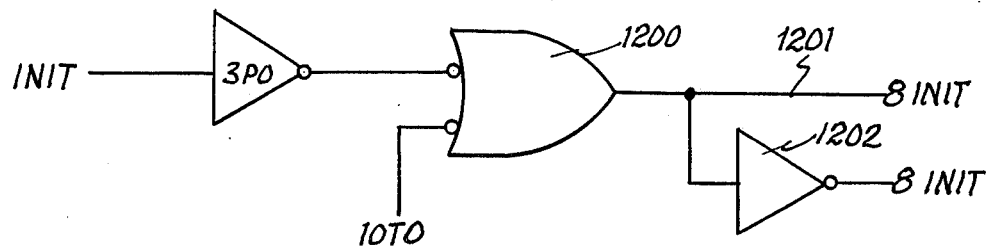
FIG. 12 is a block diagram illustration of a circuit for generating other control circuits used in the video interface.

The necessary memory addreses may be generated by the circuit shown in FIG. 10.

In this figure an up/down counter 1000 has its output terminals connected to associated input terminals of a multiplexer 1001. Another set of inputs to the multiplexer 1001 are constituted by a series of conductors designated ADD $\phi$ through ADD 11 which in turn are derived as outputs of a parallel entry shift register 1002. Connected between the multiplexer 1001 and the shift register 1002 is an adder 1003.

Two sets of outputs are derived from the shift register 1002. As may be seen, one set of outputs, the ADD $\phi$ through ADD 11 signals are and inverted at 1005 supplied as one set of inputs to the multiplexer 1001 while the other set are provided as inputs to the set of output NAND gates 1006. It is the outputs of the gates 1006 which provide the memory addresses for storing data words in the processor memory (REC) or the memory address locations of data to be taken from the memory for display (DIS).

In the operation of the $\overline{\text{memory address}}$ circuit during a video transmission the $\overline{\text{START FRAME}}$ pulse derived from a start/stop frame flip flop 1601 is supplied and loads the first address in the counter 1000. If the display is to be long than an octal 0000 is loaded into the counter as this is the address corresponding to the first 12 lamps starting from the left in the first row. If the display is to be short then he first address loaded is the octal representation of the address for the 12 lamps starting with lamp number 60 in the first row. This condition is achieved by anding the SHORT and RECORD signals at a gate 1007 the output of which connected to the appropriate stages in the counter inserts the proper number.

At the same time $\overline{\text{START FRAME}}$ is supplied to the clear (CLR) terminals of the shift register 1002 to that register, and as may be seen also clears a J-K flip flop 1008. Clearing the flip flop 1008 connects the multiplexer 1007 to the up/down counter 1001 and applies a zero input on the add lines of the adder 1003. At this point the initial core location (0000 or 0702 octal) is stored in the memory address circuit ready to be strobed to be strobed to the processor memory address bus. During the first data break (BRK 1) which is caused to appear upon the occurrence of the appropriate timing signal from the processor, indicating that data can be received, a GO signal strobes the address from the shift register 1002 to the memory address bus by enabling the gates 1006.

The START LINE pulse generated by the converter 115 after START FRAME and at the beginning of each line generates the LINE envelope signal at the flip flop. This signal conditions the J-K inputs of the flip flop 1008 so the trailing edge of the second data break signal (BRK 2) in the first pair of breaks changes the state of that flip flop. Upon this change of state the flip flop 1008 now connects the input of the shift register 1002 to the multiplexer 1001 and adds a predetermined number to the adder 1003. If the display board is 90 lamps high this number is an octal 90.

The $\overline{\text{STROBE}}$ pulse generated as the output of gate by the word bit count 11 in the second mode or by count 2 in the display mode clocks the shift register 1002 to enter the data present on its parallel inputs. Its previous output, 0000 (octal) after BRK 2 for a long frame and 90 (stated octally) previously entered on the adder 1003 are added to obtain the next address be strobed by GO during the next pair of data break. Each successive STROBE during a video line enters the new current address before the next pair of data breaks. At the end of the line (15th word for a lone line or 10th word for a short line) the LAST WORD pulse drops the LINE envelope at 1103 to reverse the condition of J-K inputs to the flip flop 1008. As a result the trailing edge of the BRK 2 pulse triggers that flip flop to its 0 state. The LAST WORD pulse also increments the up/down counter 1000 by 1. Since the adder 1003 is only adding 0 the contents of the counter 1001 are stored in the shift register 1002 and become the current address for the first word in the next video line. When the next LINE signal is generated 90 is again added to each new address and the cycle described above is repeated. The address generation process is repeated for each of the 90 lines in a video frame. At the beginning of the next video frame START FRAME again sets the current address to its initial value depending on whether it is a long or a short frame and the entire process repeated once again.

The remaining circuits illustrated with the exception of the serial/parallel registers used to transfer data into and out of the processor utilize the basic timing and control signals to generate further timing and control signals and will be described in conjunction with a description of how the interface operates to transfer data.

In the Record Mode the operator first determines whether a LONG or SHORT display is to be transmitted and operates a switch to generate either a LONG or SHORT signal.

A first use of these signals is in a line word counter shown in FIG. 11 used to generate LINE and $\overline{\text{LINE}}$ envelopes. This circuit includes a word counter 1100 the output of which produces a LAST WORD signal at 1101 which is supplied to a J-K flip flop 1102 and used elsewhere. The Q terminal of that flip flop produces LINE and $\overline{\text{LINE}}$ signals at the output of an inverter 1108. The counter is counted down by a $\overline{\text{WORD}}$ signal generated by the circuit of FIG. 7 and is loaded by the START LINE signal generated by the converter 115. A series of control gates determine whether the count is to be for a LONG or SHORT frame.

Thus if the frame is to be LONG that signal is applied to an OR gate 1104 the output of which is supplied to the counter 1100 to condition that counter to count 14 in the RECORD mode. Note at the same time the counter 817 is conditioned to count 14 also. If the frame is to be SHORT that signal is nanded with RECORD (REC) by gate 1105 and the output that gate supplied as input to an OR gate 1106 to condition the counter 1101 to count 9. If the transmission is for DISPLAY (DISPLY) rather than RECORD a signal so indicating is supplied as inputs to the gates 1104 and 1106 and condition the counter 1100 to count 13. SHORT is also nanded with RECORD at gate 1007 to condition the up/down counter 1000 so that the START FRAME pulse generated elsewhere loads the short frame starting address.

At this time a signal is generated by the processor program designated as 10T 0 and functions as a general reset signal through the interface to place it in the DISPLAY mode. This signal supplied an OR gate generates a BINIT at 1201 and a $\overline{\text{BINIT}}$ at the output of an inverter 1202. BINIT when generated places the interface in the Display Mode.

This latter function is performed by the circuit shown in FIG. 13 where BINIT is supplied to the clear terminal of a flip flop 1300 causing its terminal 1301 to go low removing a high RECORD signal which was previously there.

The program then generates an 10T 1 which is supplied as one input to an OR gate 1302 which resets the flip flop 1300 to produce the RECORD signal at terminal 1301. The RECORD signal is supplied as the other input to the gate 1007 to condition the up/down counter 1000 as described if SHORT is present.

Figure 14A:
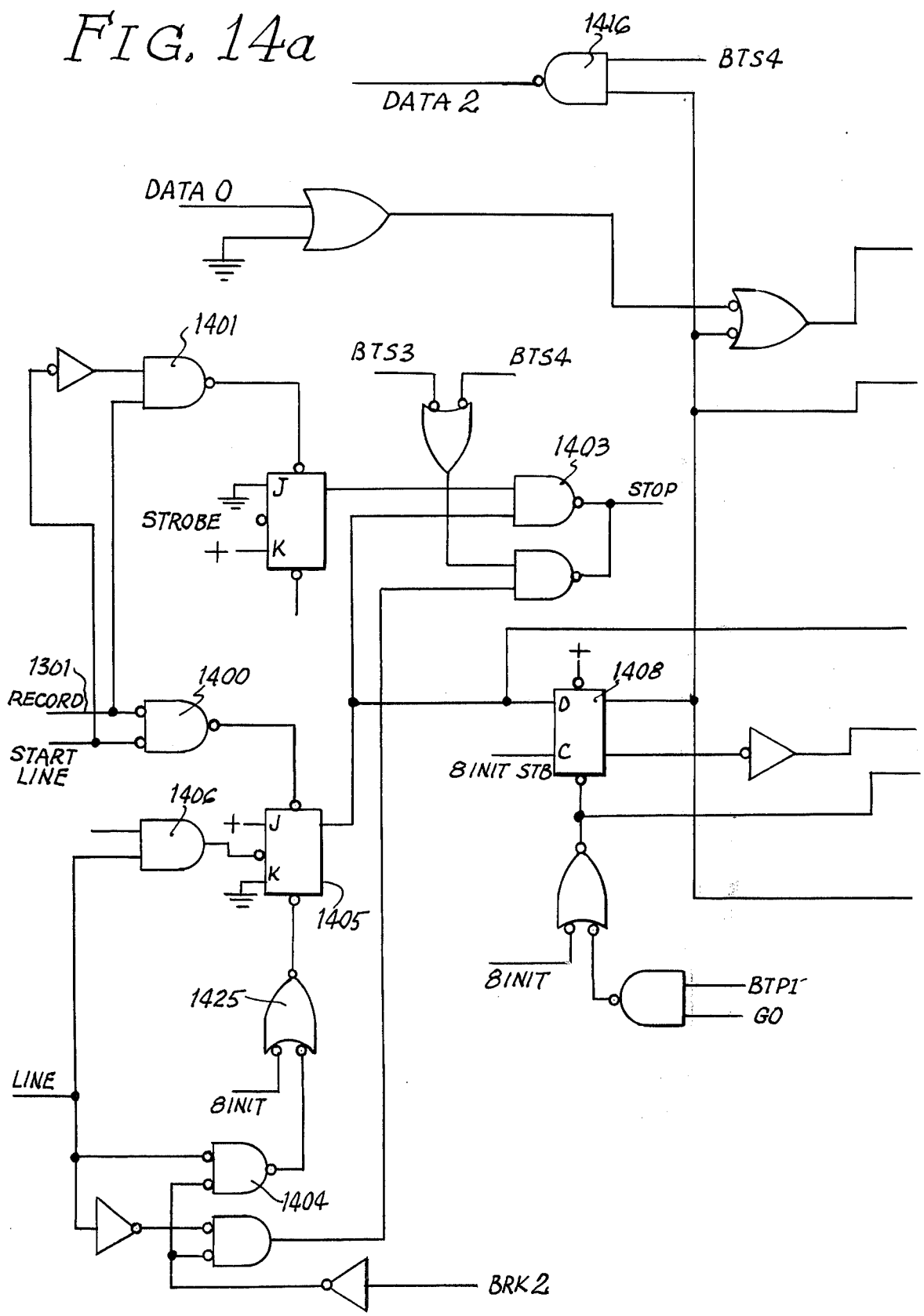
FIG. 14 is a block diagram of circuits which may be used in the video interface to generate certain basic control signal synchronized with the timing signals generated by a data processor.
Figure 14B:
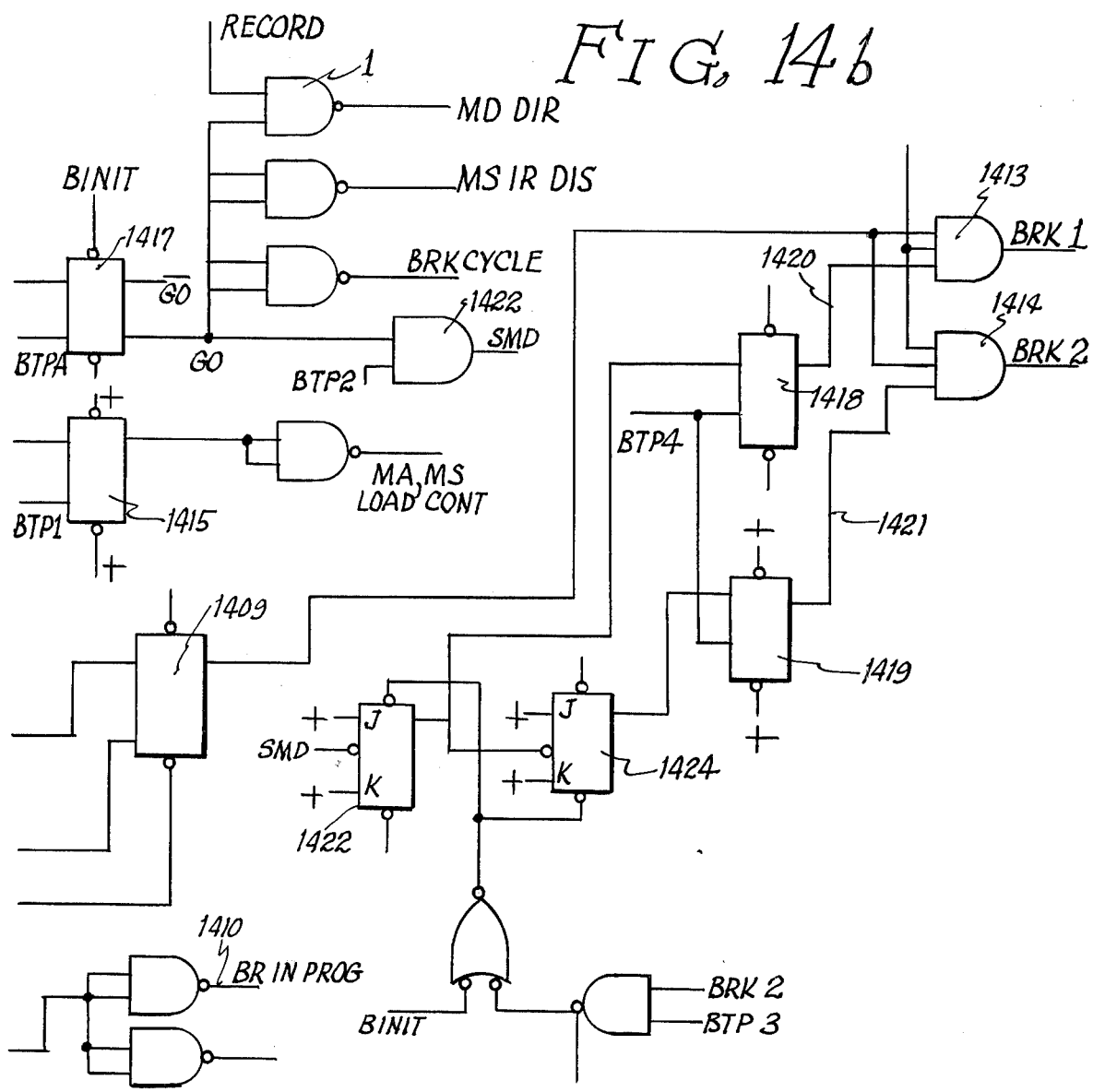

RECORD is also anded with a $\overline{\text{START LINE}}$ at a gate 1400 is a memory control and data break circuit shown in FIG. 14 to enable that gate. This signal is also used in the serial/parallel registers to be described subsequently to partially enable data dump gates used to control those registers.

Figure 15:
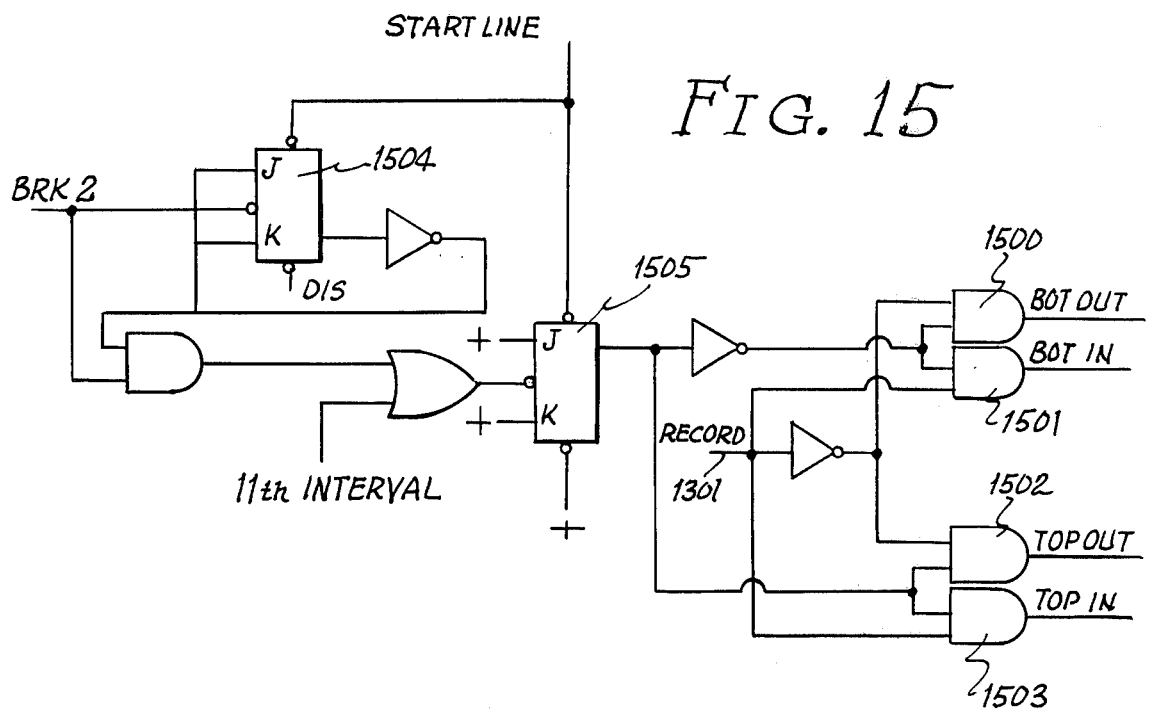
FIG. 15 is a block diagram illustration of circuits which may be used to control the serial to parallel register of FIG. 18.

Data transfers through the serial/parallel registers are controlled in part by a direction control circuit shown in FIG. 15. This circuit includes a series of AND gates 1500, 1501, 1502 and 1503 generating BOT OUT, BOT IN, TOP OUT and TOP IN signals respectively. When RECORD is generated these gates are partially enabled.

Figure 16:
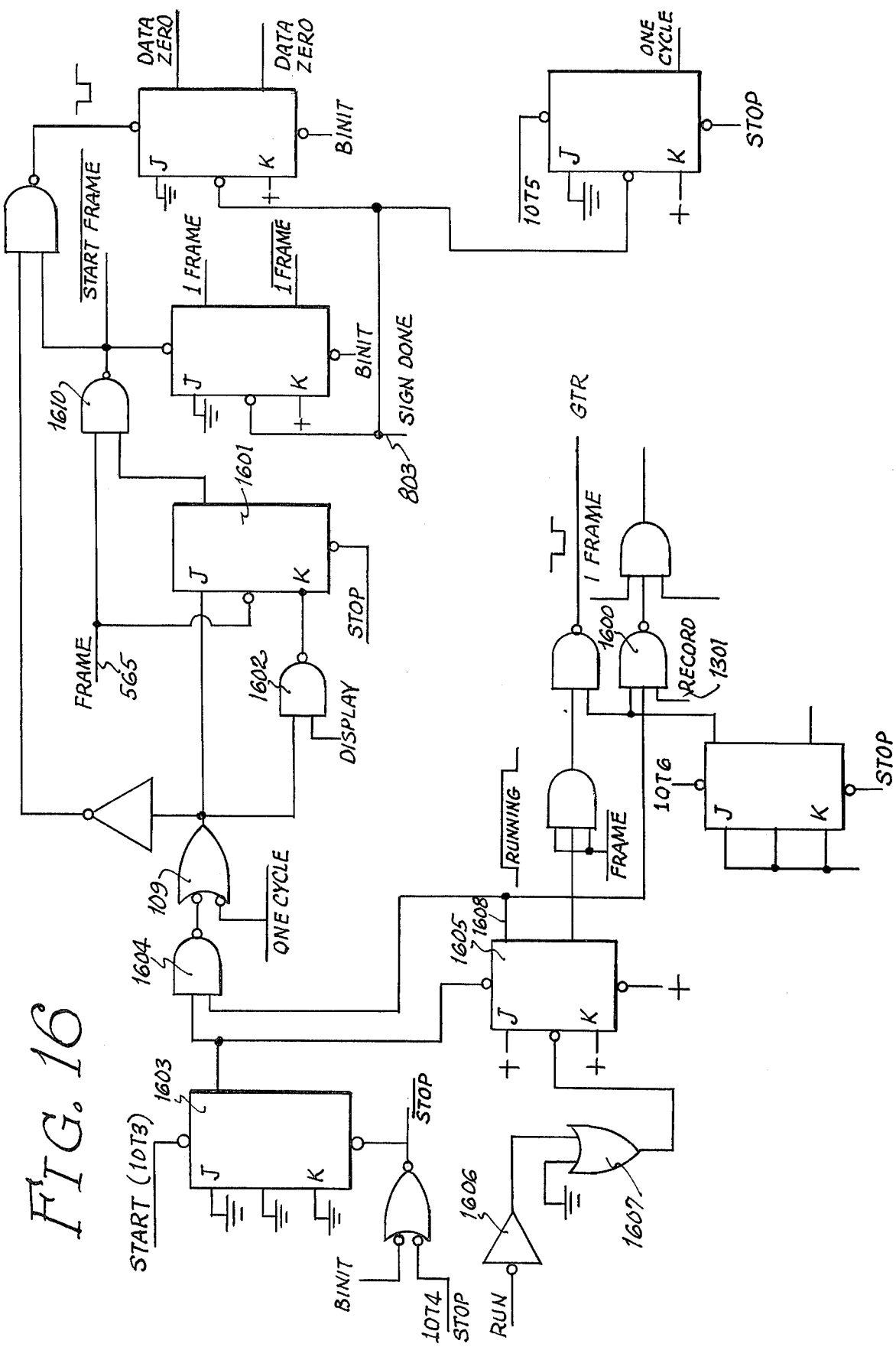
FIG. 16 is a block diagram illustration of circuits which may be used to generate certain control signals in the video interface.

RECORD is also transmitted to a control circuit shown in FIG. 16 where it is supplied to a gate 1600. At the same time it is used to produce a RECORD, signal and to cause a DISPLY signal to go low that is produce DISPLY.

Figure 17:
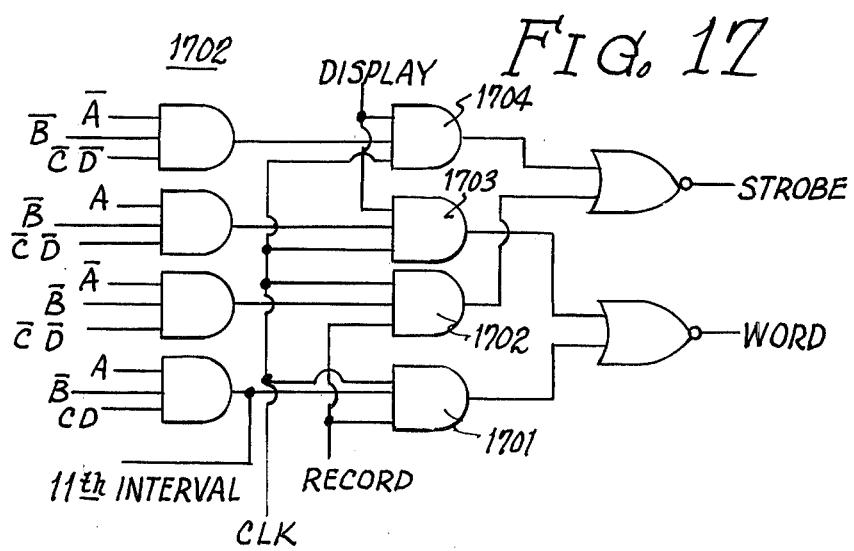
FIG. 17 is a block diagram illustration of gating circuits which may be used in conjunction with the word counter of FIG. 8 to generate signals for strobing data at specified times.

RECORD also partially enables a Record Mode clock gate 805 in the clock circuit of FIG. 8 and also partially enables WORD and STROBE gates 1700 and 1701 shown in FIG. 17. That signal also disables the display mode clock gate 807 as it is inverted at 819 and so inverted is one of the inputs to gate 807.

DISPLY when present is supplied to the display mode WORD and STROBE gates of FIG. 17 to disable those gates.

Included in the circuit of FIG. 16 is frame control J-K flip flop 1601. When DISPLY is present the K terminal of that flip flop is conditioned through the gate so that it operates in the toggle mode. This flip flop complements in the Record Mode so that every other frame received from the converter 115 is accepted for transfer to the core memory.

The circuit of FIG. 15 includes a BRK 2 top bottom data control J-K flip flop 1504 and DISPLY is supplied to that flip flop to disable it.

The video interface is now set up for Record Mode transmission. However, transfer of data will not occur until further signals have been issued by the data processor.

The next signal to issue is the 10T 3 (START). This signal presets a start J-K flip flop 1603 to the start condition. The Q output of that flip flop going high partially enables a start gate 1604 and clears a run flip flop 1605.

The next signal of significance is the generation of an 10T 7 or RUN which is buffered at 1606 and supplied via a gate 1607 to the run flip flop 1605 to clock that flip flop and generate a RUNNING signal at 1608. RUNNING is nanded at gate 1604 with START and the output of that gate is supplied via NOR gate 1609 to condition the J terminal of the frame control flip flop 1601.

The video interface is now ready to begin Record Mode operation when a FRAME pulse is received from the converter 115. The system will record continuously every other frame until a STOP command (IOT 4) is received. FRAME pulses are received at the beginning of each video frame. Each FRAME pulse indicates to the video interface that the video scan is ready to start a scanning sequence at the left-hand corner of the top line of a video image. In the Record Mode every FRAME is applied to the J-K frame control flip flop 1601 to toggle that flip flop and every other FRAME is therefore nanded at 1610 with the output of frame control flip flop 1601 to generate a START FRAME signal at 1611. The frame control flip flop 1601 therefore in conjunction with gate 1610 functions in the Record Mode as a divide by two circuit.

A first use of the START FRAME signal is to load the starting memory address in up/down down counter 1000. It also clears the flip flop 1008 to the add 0 state. It is supplied to line counter 900, 901 to load that counter so as to count 90 lines in a frame.

As may be seen in FIG. 16 START FRAME is applied to pre-set terminal of a start/stop flip flop 1612 to the preset that flip flop to 1 FRAME state.

1 FRAME clears the divider counter 811 to zero, enables the record clock gate 805 and clears the line envelope flip flop 1102.

START LINE pulses are now received from the converter 115 — several microseconds after the FRAME pulse. This pulse loads the line word counter 1100 — count 14 for a LONG frame or count 9 for a SHORT frame. They are also load the end of line counter 817 in the same fashion. START LINE also pre-sets the line envelope flip flop 1102 to generate the line signal level (LINE) 1103.

In FIG. 15 START LINE presets the top/bottom data control flip flop 1505 to enable the TOP IN 1503 and disable the BOT IN gate 1501. At this time the BOT OUT and TOP OUT gates have been disabled by RECORD as the result of the inversion by 1506.

In FIG. 14 START LINE is nanded with RECORD at 1401 to preset a Record Mode 1st memory stop flip flop 1402 and partially enable a 1st memory stop gate 1403.

LINE supplied at 1103 conditions the data inputs of flip-flop 1001 so that it will add the appropriate number of lines after the first pair of data break cycles—this flip flop changes state on the trailing edge of the first BRK 2 pulse.

In FIG. 14 LINE supplied through a gate 1404 disables a clear input gate 1405 to a memory break and control flip flop 1405 until the end of a video line is reached. It is also supplied as one input to a bit time pulse 2 (BTP 2) gate 1406. The first BTP 2 pulse transmitted from the processor after LINE sets the flip flop 1405. Therefore, LINE and BTP 2 together, the output of 1405 at 1407, is supplied to a priority flip flop 1408 and to a break flip flop 1409 so that the data break circuit is ready to enter a break cycle. The output at 1407 is nanded at gate 1403 to send a memory STOP signal to the processor.

The Serial Parallel Registers

Figure 18A:
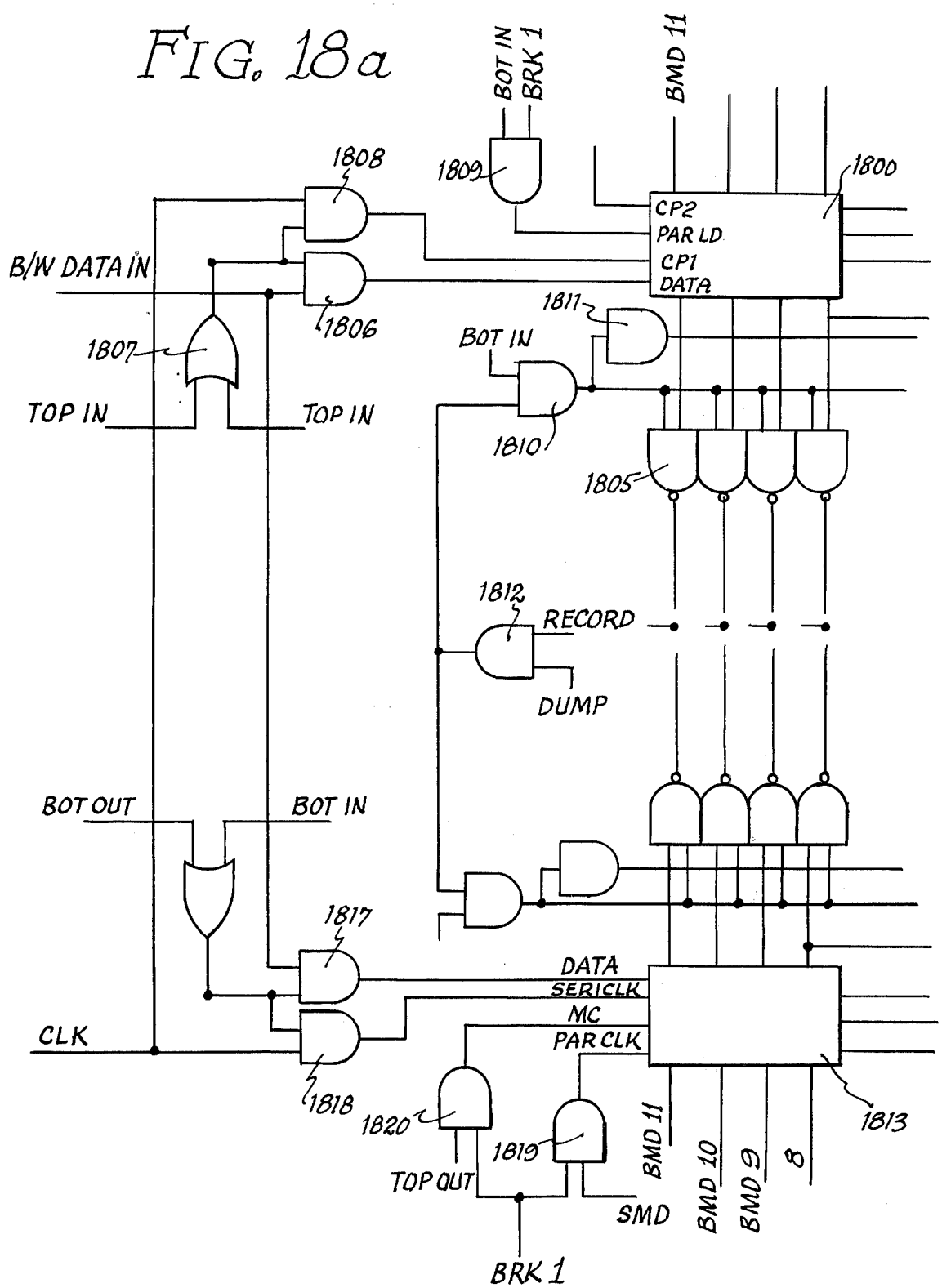
FIGS. 18a and 18b are block diagram illustrations of registers for receiving the output of the video converter in serial form and transmitting it in parallel form to the data processor.
Figure 18B:
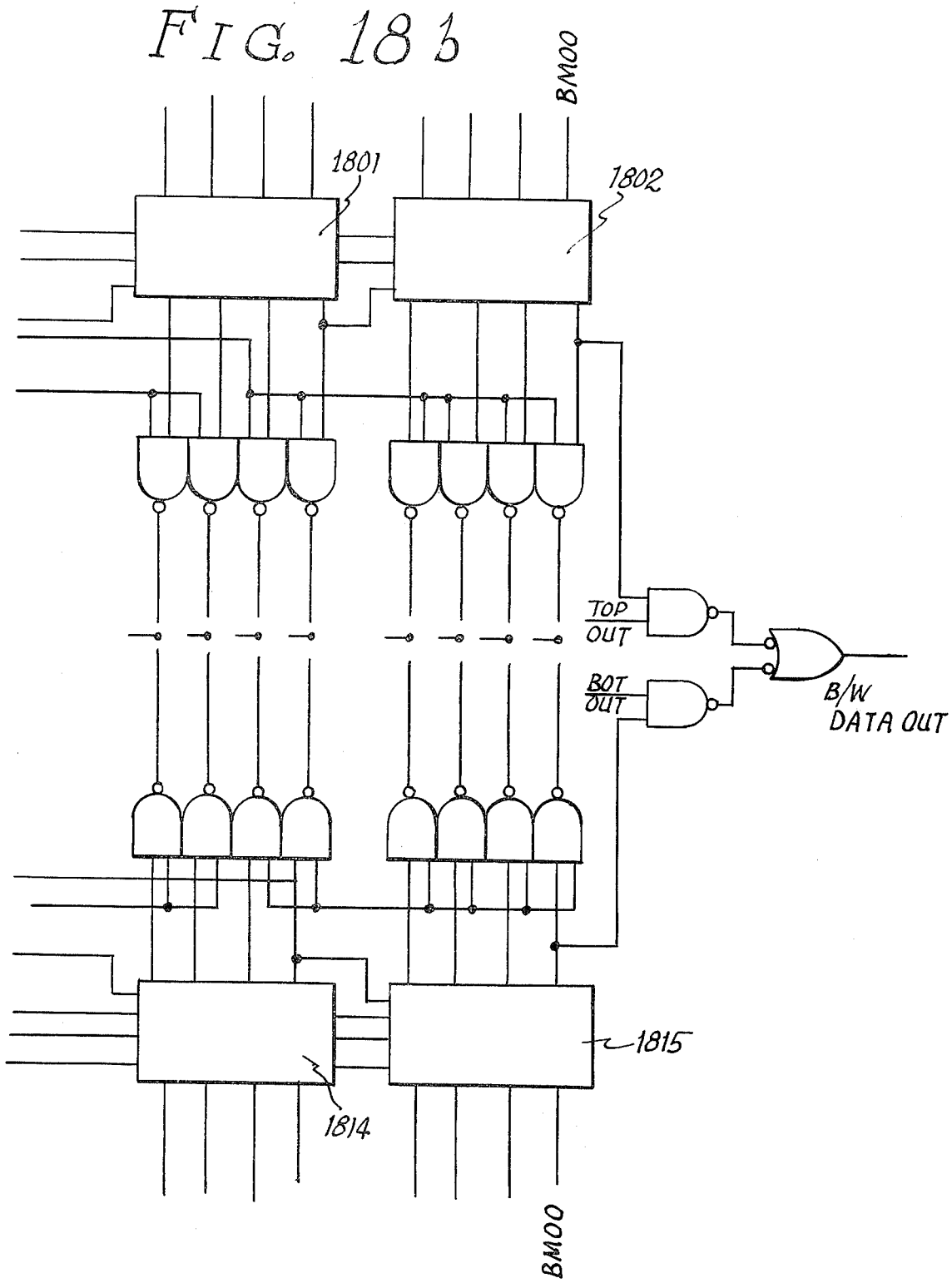

FIG. 18 illustrates a means whereby the digitized video data may be transferred into or out of a processor memory. The means shown are serial/parallel registers which, when the system is in the record (REC) mode, serially receive the black and white gray data, form it into 12 bit computer words and transfer those words in parallel for storage in the memory. The converse operations take place when the system is in the display (DIS) mode.

It will be recalled in the system thus far described four shades of gray may be recorded or displayed and that the MSB and B2 bits produced by the video to digital converter are used for that purpose. It will further be recalled that two fields of the computer memory having memory locations corresponding to specific display devices in the large scale display board are used, one field holding the black and white or MSB data and the other field holding the gray or B2 data.

The serial/parallel registers each consist of three 4 bit registers, only one of which will be described for they are identical. Registers 1800, 1801, and 1802 are conventional shift registers each provided with a data input terminal 1803 and a terminal 1804 by which shift pulses may be supplied. The registers shown in the upper part of the drawing are the TOP registers while those in the bottom part of the drawing are the BOTTOM registers.

As stated, each register receives its data serially and transfers it in parallel to the processor data busses. The transfer is accomplished by means of the gates 1805, each one of which, as may be seen, has one input terminal connected to a single stage in an associated register.

Associated with each serial/parallel register are logic elements controlling the transfer of data into and out of the register in accordance with the control signals, the generation of which have been previously described.

Referring to the top black and white data register, it may be seen that the black and white data is supplied as an input to an AND gate 1806. Another input to the AND gate 1806 is the TOP IN signal from FIG. 15 through an OR gate 1807. The incoming data is shifted through the registers 1800, 1801 and 1802 by the signals applied to its terminal 1804. These signals are present when the output of an AND gate 1808 is high because a TOP OUT or TOP IN signal is available at gate 1807. Under such circumstances, the gate 1808 will pass the CLK pulses from 810 and they in turn will shift the black and white data through the registers.

Also provided is a gate 1809 which receives as one of its inputs the BOT OUT signal produced by the gate 1500 and the BRK 1 signal. The output of the gate 1308 is supplied to an MC terminal (Memory Clear) of the first register 1800, and when the output of that gate is high the contents of the registers 1800, 1801 and 1802 may be transferred in parallel to the gates 1805.

As stated, one of the inputs to each of the gates 1805 is the contents of a single-stage in associated registers 1300, 1301 and 1302. The other input to each of the gates 1805 are signals from gates 1810 and 1811 which receive as their inputs in turn the output from a gate 1812. Gate 1810 receives as one input the BOT IN signal from the gate 1501 while the other input to that gate from gate 1812 are DUMP 1 and the RECORD signals. Thus, the black and white data for one 12 bit processor word is transferred to the series parallel registers 1801, 1802 and 1803, and when another 12 bit word representing the black and white data is being transferred to the lower register, that is, when the BOT IN signal is present, the word in the top register is transferred into the processor memory. This cycle is continued until the complete black and white data for one frame has been stored in the memory. As described earlier, in the record mode data is stored at the rate of 15 frames per second.

As may be seen, the bottom black and white serial to parallel register consists of three separate shift registers 1813, 1814 and 1815. And gate 1816 receives a black and white data word and supplies that word to the registers 1813, 1814 and 1815 when the BOT IN signal is generated. An OR gate 1817 receives as its inputs the BOT IN and the BOT OUT signals and its output is supplied as one input to an AND gate 1818, the other input of which are the CLK signals. The output of the gate 1818, therefore, is the CLK pulses which shift the data through the regisrers 1812, 1913 and 1814.

Thus, a first black and white data word is supplied to the upper registers and transferred to the processor in-memory data busses while a second black and white data word is being stored in the bottom registers. It should be understood that the arrangement shown is by way of exemplification only, for if a data processor other than the one indicated are being used it may not be necessary to provide top and bottom registers for the speed at which the processor could receive data may be different. Likewise, storage registers other than those of the type shown may be used to buffer or store the data words until they may be transferred into the processor.

When the video interface has been conditioned as described in the portion of the specification immediately preceding the above description of the serial/parallel registers it is ready to receive DATA and DATA BIT SYNC pulses from the converter, store the first word received in the top registers, one for B/W and one for GRY, and generate the first pair of data breaks after the word is stored.

The DATA BIT SYNC pulses supplied to the clock circuit of FIG. 8 generate RECORD MODE clock pulses which are available at 810 becuase gate 805 was previously enabled by RECORD and 1 FRAME. These pulses CLK advance the divide by 12 counter 811 from the outputs shown are described.

Referring to FIG. 17 it may be seen that the output of the counters are decoded at 1702 to produce STROBE, 11th INTERVAL and WORD pulses. It is to be noted that pulses are synced with the CLK pulses by the use of the gates 1700, 1702, 1703 and 1704 which are enabled by the CLK pulses.

STROBE is generated on 11th Record Clock pulse of each word. When generated it enters the current memory address in parallel entry shift register 1002 where it is stored to be strobed by GO to the Memory Address Bus during the data break cycle. STROBE also triggers the Record Mode 1st Memory flip flop 1402 to disable the 1st stop gate 1403 and remove the STOP signal being sent to the processor. This occurs only at the first STROBE pulse in each video line.

11th INTERVAL goes high and then drops on the trailing edge of the 12th clock pulse. It is used to trigger the top/bottom data control flip flop 1504, shifting the decoded output from TOP IN to BOT IN. This enables the serial clock and data gates for the serial/parallel registers and the second 12 bit word is stepped into the bottom register while the first word is transferred from the top register to memory.

WORD is generated on the 12th Record Clock pulse of each word and counts the word counter 1100 down 1 count. Note also that the counter 817 is also counted down one pulse. WORD also is nanded with RUN, a signal from the processor to generate a memory start (MEM START) signal.

At this point one word has been stored in the top B/W serial/parallel register and one word has also been stored in the GRY serial/parallel register. The interface circuits are now ready to check priority and enter the data break time cycle when the processor timing generator sends specified computer time pulses to the interface.

The first of these pulses is designated B INT STROBE and it is supplied to the priority flip flop 1408 to clock that flip flop. That flip flop when clocked generates a break in progress signal (BR IN PROG) at 1410 which is returned to the processor to indicate that a break is in progress and synchronize the break with the processor time cycle. An output 1412 of fip flop 1408 is inverted at 1413 to clock the break flip flop 1409 the output of which in turn partially enables the BRK 1 as BRK 2 gates 1413 and 1414, respectively. Output 1411 is also supplied a load control disable flip flop 1415 to condition its data input.

When a BTS 4 signal is generated by the processor it is nanded with the output 1411 of the flip flop 1408 at gate 1416 to produce a DATA 1 signal which is returned to the processor to indicate the priority assigned to the video system. If the video system is the highest priority requesting a break a DATA 0 from the processor conditions a GO/No GO flip flop 1417 to enter the break cycle at TP4 time. AT that time a BTP 4 pulse from the processor clocks a GO/NO Go flip flop 1417 to generate the GO signal and start the break cycle. BTP 4 is also supplied to a pair of break enable flip flops 1418 and 1419. AT this time a 1 is entered at terminal 1420 to partially enable the BRK 1 gate 1413 while a 0 is entered at terminal 1421 to disable BRK 1 gate 1414.

GO when generated enables the gate 1413 to generate the BRK 1 signal. It is also supplied to an inverter 1010 to strobe the contents of the parallel entry shift register 1005 to the processor memory address bus. The same is also supplied to a gate 1422 to partially enable that gate to later produce a strobe memory data signal (SMD). With the RECORD signal it produces a signal at a gate 1423 which is sent to the processor to enable transfer of data into the core memor (MD DIR).

BRK 1 when generated is supplied to the processor to select the core memory field for storage of B/W data word. It is also supplied to an and gate to partially enable it to produce DUMP 1 signal later. BRK 1 is used in FIG. 18 to partially enable gates 1809, 1819 and 1820. It should be noted at this time BOT OUT the other input to gate 1809 and TOP OUT the other inputs to the gates 1809 and 1820 are both low because the system is in the RECORD mode, therefore, no parallel entry can be made to series/parallel shift registers.

When the first pulse in the processor timing cycle (BTP 1) is generated the load control flip flop 1415 is clocked. The next time interval (BTS 2) when present is nanded with BRK 1 to generate the DUMP 1 pulse.

DUMP 1 when generated is nanded with RECORD at gate 812 to strobe the contents of the series/parallel register just loaded with B/W data to the processor Memory Data Bus. On the next BRK 1 cycle DUMP 1 will strobe the bottom black and white register so that the registers operate alternately to load and transfer data.

The next signal from the processor BTP 2 enables the gate 1422 to generate the SMD pulse. SMD is applied to the toggle or clock terminal a J-K flip flop 1423. The Q terminal of flip flop 1424 is connected as input terminal of flip flop 1419. Upon the generation of SMD flip flops 1423 and 1424 are toggled. This reverses the conditions on the flip flops 1418 and 1419 so that the next BTP 4 pulse from the processor gate 1413 for BRK 1 will be disabled while gate 1414 BRK 2 will be partially enabled. When BTP 4 is generated GO/NO flip flop 1417 is clocked to terminate BRK 1 and enter data 1 in flip flop 1419 and data O in flip flop 1420.

The first data break cycle is completed when BTP 1 is generated by the processor and clocks flip flop 1415 and is nanded with $\overline{GO}$ to reset the priority and break flip flop 1408 and terminate BK IN PROG at 1410.

At this time BRK 1 is complete and a black and white data word has been transferred to the processor. As long as LINE remains high the video interface will request another priority check to enter BRK 2 and when GO is again generated BRK 2 will commence.

The timing signals generated by the processor are as before. However, when BRK 2 is present instead of DUMP 1 being generated to strobe the contents of the B/W register of FIG. 18 a DUMP 2 signal is generated which is used to strobe the contents of a GRY register (not shown but identical to the B/W register) into computer memory.

Thus at the completion of BRK 1 and BRK 2 one B/W data word and one GRY data word have been stored in the processor memory. This process continues and on the next data break cycle another B/W data word and another GRY data word are stored in the processor memory.

DATA BIT SYNC generated clock pulses continue to advance to the divide by 12 counter 811. 11th clock pulse of the new word will generate STROBE to store the new current address in the memory address circuit output shift register 1002. The 12th clock pulse will generate word to send the MEM START signal to the processor starting the timing generator. The timing pulses will again initiate a priority check and a new break cycle. The top and bottom serial/parallel registers, selected alternately by 11th INTERVAL (see FIG. 15) alternate modes as long as video data continues to be received from the converter 115. Pairs of break cycles are repeated for each of the words in the video line.

At the end of a line the trailing edge of the 12th clock pulse counts the counter 817 down one count and generates the EOT pulse at 818. The trailing edge of that last pulse also indicates that the last word has been counted by the counter 1100 and the LAST WORD signal is generated. This signal clocks the LINE envelope flip flop to terminate the LINE envelope signal. LAST WORD also increments the memory address binary counter 1000 to advance the current address for the first word in the next line by one from the circuit address of the first word in the line being completed.

LINE and BRK 2 when present together indicate the termination of the LINE envelope signal. Under these circumstances BRK 2 applied via a gate 1404 and the gate 1425 is effective to clear the memory and break control flip flop 1405, thereby preventing a new break request sequence from starting.

A reversal of the LINE envelope signals at the data inputs of the add flip flop 1008 permits the trailing edge of the last BRK 2 signal to toggle that flip flop to the add zero state for the first break in the next line. Consequently, the first current address placed on the computer Memory Address Bus will be the address stored in the memory address binary counter 1003.

EOT when generated is supplied as the input to the video line counter of FIG. 9 and causes that counter to count down one count. The cycle described, therefore, beginning with START LINE and ending with EOT, is repeated for each of the lines in a video frame. At the end of the last line of that frame the transfer of the frame from the video system to the processor memory is ended.

When the last EOT has been generated the video line counter of FIG. 9 generates the SIGN DONE signal at 903. SIGN DONE when generated toggles the start/-stop frame flip flop 1612 to terminate the 1 FRAME. In turn $\overline{1\ FRAME}$ clears the LINE envelope flip flop 1102. Subsequently the program issues a pulse which is effective to stop the video transmission sequence. The sequence can be continued to transmit a series of video frames, it being understood that the system is also provided with a capability to transfer the data words stored in the processor memory to an additional memory whereby an entire sequence of video frames may be stored for subsequent display.

When it is desired to cause the system to operate in the Display Mode the transmissions are essentially the same. The data flow is from the processor memory in parallel form to the video interface serial/parallel registers (FIG. 18) and then to the converter 115 in serial form for display on the dot matrix monitor. A black and white data word is transferred from the processor first by BRK 1 and then a gray data word is transferred by BRK 2. Each pair of black and white and gray data words are transferred at the same time to the converter by each group of 12 serial display clock pulses.

In the Display Mode $\overline{\text{RECORD}}$ goes low and DISPLAY goes high. When this happens $\overline{\text{RECORD}}$ partially enables TOP OUT and BOT OUT gates 1502 and 1500, respectively, and displays the TOP IN and BOT IN gates 1503 and 1501, respectively. TOP OUT or BOT OUT are nanded with BRK 1 signals at gates 1809 and 1820 to select the parallel entry mode to the registers of FIG. 18 and to thereby permit the entry of data from the Memory Data Bus into those registers at SMD time. $\overline{\text{RECORD}}$ also partially enables the display serial clock 807, which clock is fully enabled when 1 FRAME and DATA BIT SYNC are present. The same signal also displays gates not shown which permit data to enter the interface from the converter and is transmitted to the converter to enable the video image being transmitted to appear on the dot matrix monitor.

$\overline{\text{RECORD}}$ also disenables the Record Mode START LINE gate 1400 DISPLY is used in the circuit of FIG. 17 to partially enable the Display Mode STROBE (first clock pulse) WORD (second clock pulse) gates. This signal is also applied through a gate 1602 to the K input of the frame control flip flop 1601 to prevent toggle mode operation. Every FRAME pulse thereafter generates the START FRAME signal so that the Display Mode transmission rate is 60 frames per second whereas, as described, the Record Mode transmission rate is 30 frames per second.

DISPLY and $\overline{\text{RECORD}}$ are used in the circuit of FIG. 11 to condition the LINE word binary counter 1100 to mode count 13 at the beginning of each video line. The loading is completed by the presence of the START LINE signal. Count 13 is used because the first pair of words are transferred from core before the first DATA BIT SYNC pulse is received. Then, when the serial transfer of data to the converter starts the first WORD pulse starts transfer of the second pair of words from the memory. Since words are obtained before transmission, the 14the WORD pulse starts transfer of the 15th and last pair of words in the video line and the 12th clock of the 14th pair of words generates the last WORD signal to set up the new current address for the first WORD of the next line.

The transmission continues in this mode until it is complete so that after the specified number of video lines constituting a frame have been transmitted the SIGN DONE signal is generated at 903 and the transmission may continue under control of the software program in the same manner as in Record Mode.

Large Board Display

Figure 19:
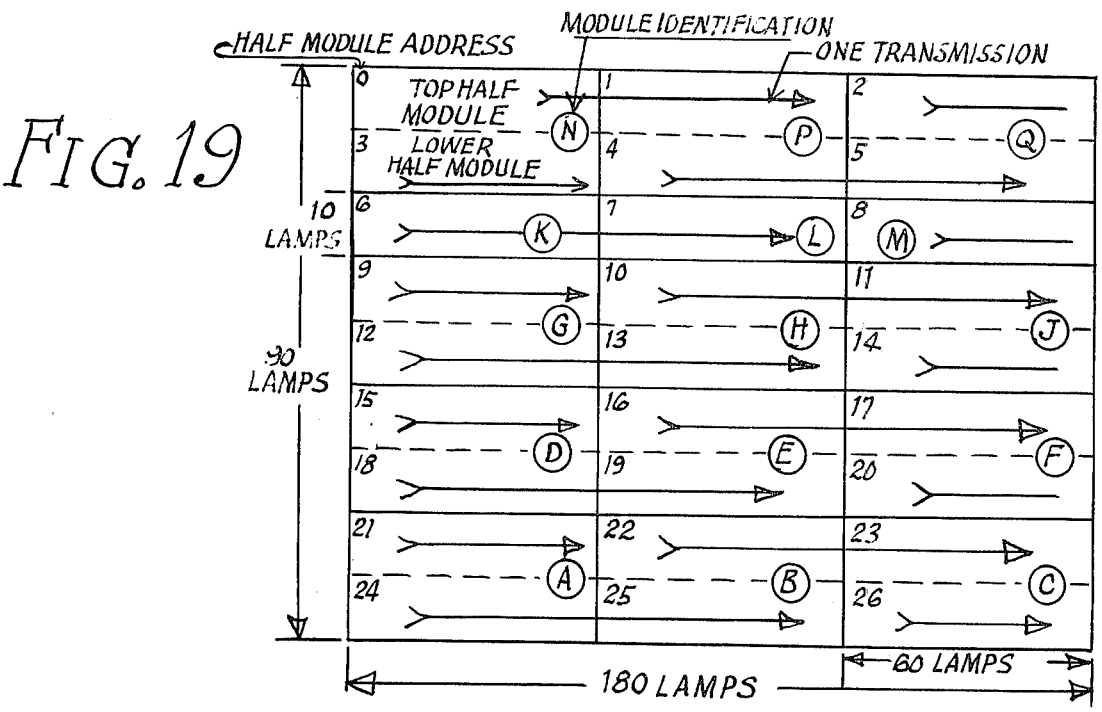
FIG. 19 is a schematic representation of a display board with which the invention may be used.

As stated previously, a large display board on which the now converted or quantized video data which has been stored either in the processor core memory or in an auxiliary memory may be displayed is constituted by a board which is 90 lamps high and 180 lamps long. The general organization of such a board is shown in FIG. 19. Because there are a substantial number of lamps involved, 16,200, it is desirable to supply the electrical power required using a three-phase system and to distribute the lamp loads substantially equally over the three phases. Likewise, for ease of manufacture, assembly and service it is convenient to divide the board into a number of modules and to further divide the modules. Thus, in the illustrated embodiment of the invention the board includes 15 modules designated as A through Q with I and O omitted. Each module, with the exception of modules K, L and M, is 20 lamps high and 60 lamps wide. Modules K, L and M, as may be seen, are only 10 lamps high.

The particular number of lamps, the height, the width and number of modules and dimensions of the modules all may be selected by a designer to suit his particular purposes.

It has been found desirable when lighting the board to display an image to light it from the top down. Thus, as indicated by the arrow shown in FIG. 19, data necessary to light the lamps is supplied beginning in the upper left-hand corner and moves to the right to the end of the board. The next group of data begins at the left side of the board and again moves to the right, this process being completed until the board is completely lit. As will be appreciated, the data is supplied with a rate that does not permit an observer to detect lighting of individual lamps. An observer, therefore, sees a display on the board practically instantaneously, and in the case of a display of video images the impression is not that different from that appearing on a television screen.

Figure 20:
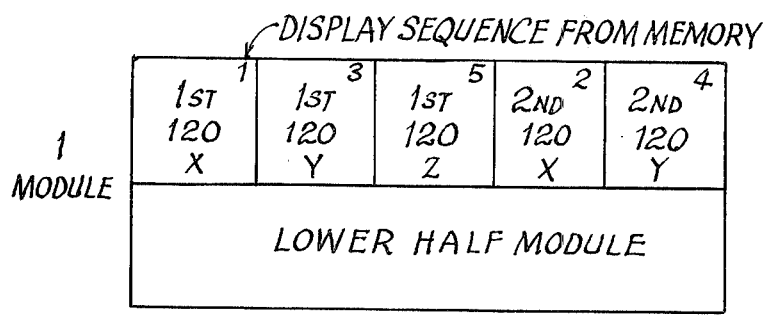
FIG. 20 is a schematic illustration of a module forming a part of the display board of FIG. 19.

FIG. 20 illustrates in somewhat greater detail the general arrangement of each module. Thus each module is constituted by an upper half and a lower half. Each half is further divided into five submodules each 12 lamps long and 10 lamps high for a total of 120 lamps. The B/W data to light a module is transmitted in "bursts" of 240 bits of B/W and 240 bits of GRY data. There are three 240 bit bursts transmitted in sequence and designated as the X, Y and Z bursts. To light any module the lamps designated to be associated with the X burst are transmitted first, then those associated with the Y and finally the Z. It should be noted in the arrangement shown there are only five submodules in a half module so while the Z burst in 240 clock pulses long the last 120 bits are not data bits. Each submodule is connected to be supplied by one of the three phases of the power supply and are distributed over the three phases so as to provide for a substantial balancing.

Figure 21:
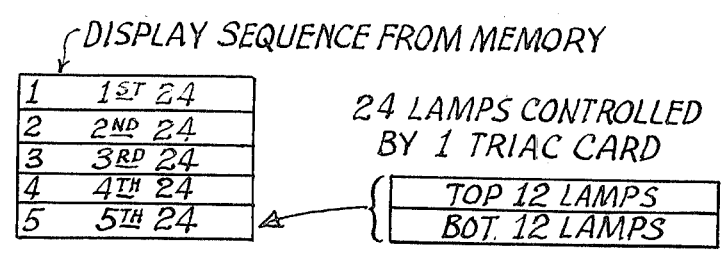
FIG. 21 is a schematic illustration of a submodule illustrated in FIG. 20.
Figure 22:
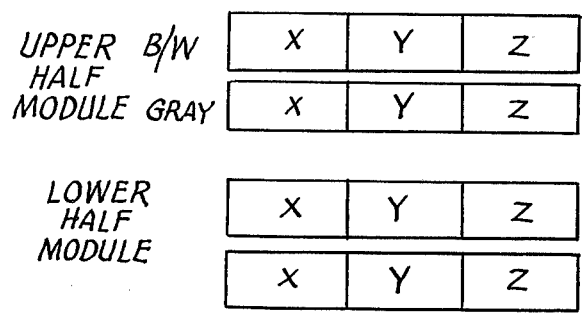
FIG. 22 is a schematic illustration of the arrangement of the serial memory elements of FIG. 23.

FIG. 21 illustrates diagrammatically the arrangement within any submodule wherein 24 lamps are connected to be controlled from a single Triac card, with one portion of the card controlling the top 12 lamps in any group of 24 and another portion of the card controlling the bottom 12 lamps in any group of 24. At this point it should be noted that the reference to Triac cards is to bring out that each lamp may be controlled by the use of a Triac or any other similar semiconductor switching device. As is well known, a Triac is a semiconductor switching device in which a control signal applied to a control electrode causes the device to conduct in a selected portion of a half cycle supplied to a load to thereby control the energization of the load. The load in this case may be an incandescent lamp and by determining the point in each half cycle of supplied voltage that the lamp goes on the brightness of the lamp is determined. Thus, as may be seen in FIG. 21, the lamps in any submodule are controlled so that the first 12 lamps are lit at one time, the second 12 lamps then lit and so on.

Figure 23:
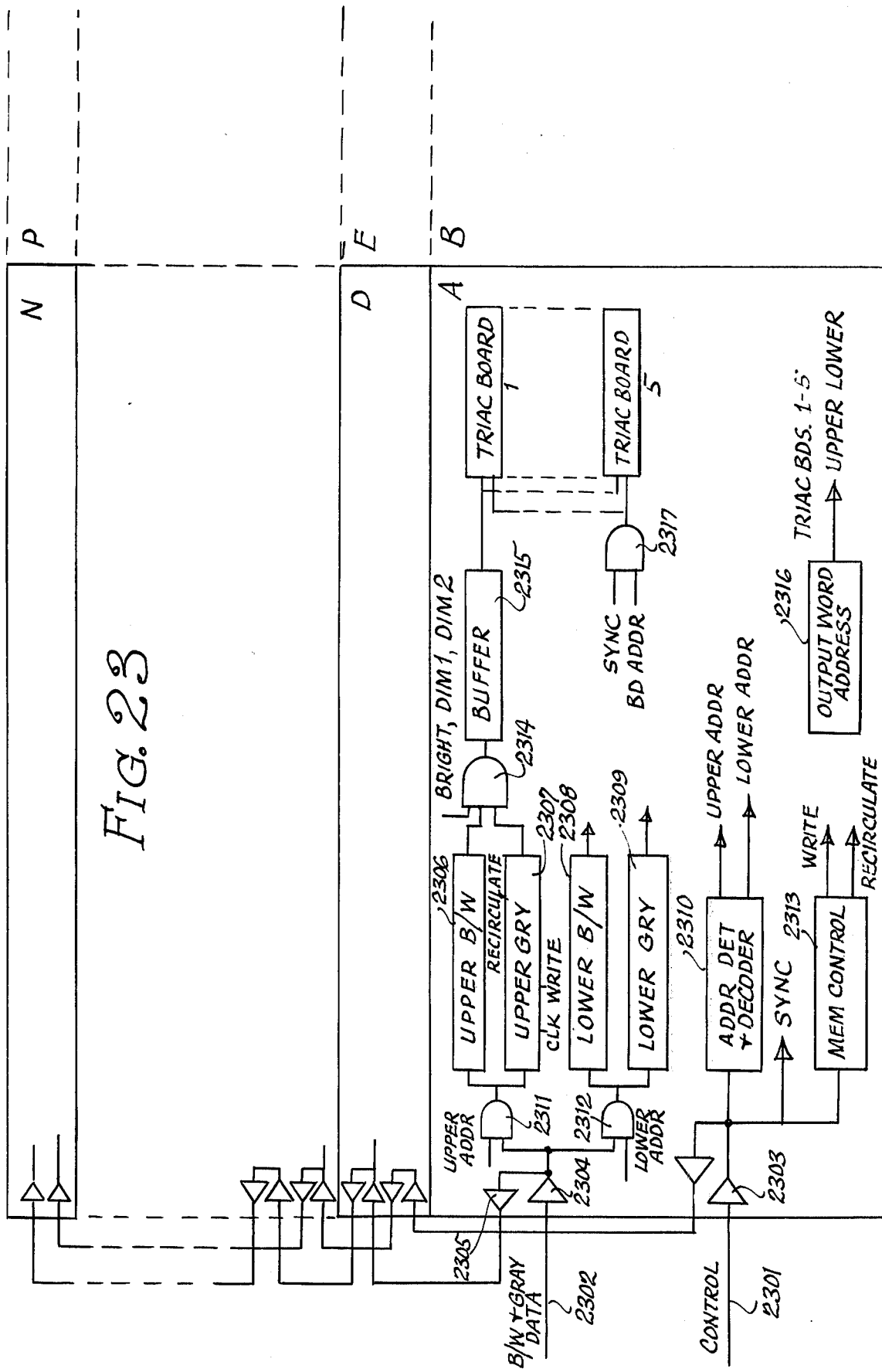
FIG. 23 illustrates in block diagram fashion the memory and control elements provided for each module on a display board.

FIG. 23 illustrates the basic inputs to each module which consists of the B/W and GRY data and the necessary control signals supplied from an interface connecting the display board with the data processor memory. The data and control signals are supplied via busses 2301 and 2302. Suitable amplifiers 2303 and 2304 are provided if necessary to ensure that the incoming signals have the proper parameters for processing by the components provided at each module. For convenience all of the data and control signals enter at module A and are transmitted in a chain to the other modules. Thus the B/W and GRY data is amplified if necessary at 2305 and transits to module D and so on. The first module actually receiving data is as explained module N which is at the top left-hand corner of the board. However, the circuit elements provided at each module are identical so that a description of those elements associated with Module A will be applicable to the description of the elements associated with each of the modules.

Included, therefore, at each module are four serial memories 2306, 2307, 2308 and 2309, each with a recirculating capability. Each of the serial memories has a capacity sufficient to accommodate the bursts of data for all of the rows of lamps in a module and store it in separate stages corresponding to X, Y and Z bursts. Further, they are of the type which when loaded enter a recirculation mode and thus hold the data while it continually recirculates through the memory and is monitored at specified times. The memories 2306 and 2307 are associated with the upper half of a module while the memories 2308 and 2309 are associated with the lower half of a module. These memories when loaded contain all the data necessary to determine when in its half cycle of supplied electricity any lamp will be lit so as to provide the shade of gray or intensity level desired.

It has been stated that the video to digital converter produces quantized video signals capable of providing eight shades of gray. The system as described herein is one for storing the data necessary for four shades of gray, and such is the case with the display board described as an exemplification. However, by appropriate modification of the system described all eight shades of gray may be used to provide sharper delineation of images and more faithfully reproduce light variations in the actual scene to the extent that an observer can hardly detect the difference between a displayed image and that appearing on a video screen.

Inasmuch as all the data received from the processor memory is transmitted to all of the modules it is necessary to provide means for indicating which module is to receive a particular burst of data. To this end each module is provided with an address detector and decoder 2310. In the means interfacing the data processor and the display board there is provided a module address generator which is effective to provide a module address preceding each group of data for the X, Y and Z data bursts. The module address detector and decoder, therefore, receives each module address, and if a particular module address corresponds to the address for that module the module address detector and decoder provides either upper address signals or lower address signals which are supplied to either of the gates 2311 or 2312 to enable those gates to transmit data to the appropriate serial memory so as to load that memory to its capacity. When a particular serial memory is to be loaded a Write Signal is generated by a memory control circuit 2313 to permit the data now being received to be shifted into that memory by clock pulses.

When a memory is loaded the memory control circuit generates a Recirculate Signal which then causes the data in the memory to be continuously recirculated. The memory stays in the Recirculate mode until a signal is received indicating that new data designated for that particular memory is being transmitted, at which time the memory again enters the Write mode.

Figure 24:
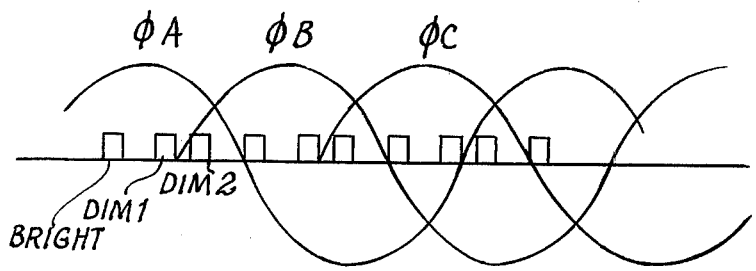
FIG. 24 illustrates the time relationship of certain control pulses to a 3-phase alternating current supply.

In order that the data stored in a serial memory may be used to fire a Triac and to ensure that the intensity levels of all lamps to be lit at a particular level of brightness are the same, it is desirable that the data be supplied to the Triac when the alternating voltage supplied to the Triac is at a specified level. To this end a circuit (not shown in this figure) generates a plurality of "windows" during which the data bits may be transmitted from the serial memory. These windows are illustrated in FIG. 24 wherein for each of the phases of a three-phase alternating current supply, phase A, phase B and phase C, three signals are generated and designated as Bright, Dim 1 and Dim 2, depending on whether the particular submodule is supplied by phase A, B or C. The Bright, Dim 1 and Dim 2 signals associated with that particular phase are supplied to enable a gate 2314 to permit data bits from either memory to enter a buffer 2315. Each buffer 2315 is capable of holding 12 bits of data, and when full is effective to fire associated Triacs on the proper Triac board to light a lamp.

It has earlier been explained how the B/W and GRY data may be combined in a four shades of gray system to produce four levels of lamp intensity — OFF, GRAY 2 (Dim 2), GRAY 1 (Dim 1) and BRIGHT. Appropriate encoders are provided to combine the B/W and GRY data bits to produce these signals at the display board.

In order that the data in a buffer 2315 may be directed to an appropriate Triac board 1 through 5 in any one of the submodules an output word address circuit 2316 is provided to generate a board address which is supplied to a gate 2317 to permit transmission of that address when an appropriate synchronizing pulse derived from the control signals 2301 enables that gate.

Thus, in order to operate each module requires an indication that the data being transmitted is intended for that module and it further requires an indication as to which submodule is to receive the data. Further, information as to which Triac board is to receive that data and whether the data is intended for the upper 12 or lower 12 lamps on the board is generated at the module. As stated previously, the board configuration and dimensions, the module dimensions, the number of lamps in a Triac board may all be varied in accordance with the choice of the designer. It should be borne in mind that the particular ultimate number of lamps indicated as being controlled here, namely, 12 lamps is chosen because the particular data processor used operates with 12 bit computer words. If a data processor operated with computer words of a different length, then obviously different numbers of lamps would be controlled and the particular parameters given would no longer apply.

It can be appreciated by those skilled in the art that the address detector and decoders 2310 may be constructed using a register to receive the module address and hard wiring connecting selected output stages of that register to a gate providing an output when the address stored in the register corresponds to the address that will enable the gate. Such gates are those indicated by 2311 and 2312, while the register with its hard wiring is the essential element of the address detector and decoder 2310. The memory controls 2313 and 2316, as will be appreciated by those skilled in the art, may be constituted by a clock with appropriate counters receiving clock signals or otherwise synchronized with the data transmission to provide the Write and Recirculate signals. The output word address circuits 2316 may be essentially similarly constructed.

Figure 25A:
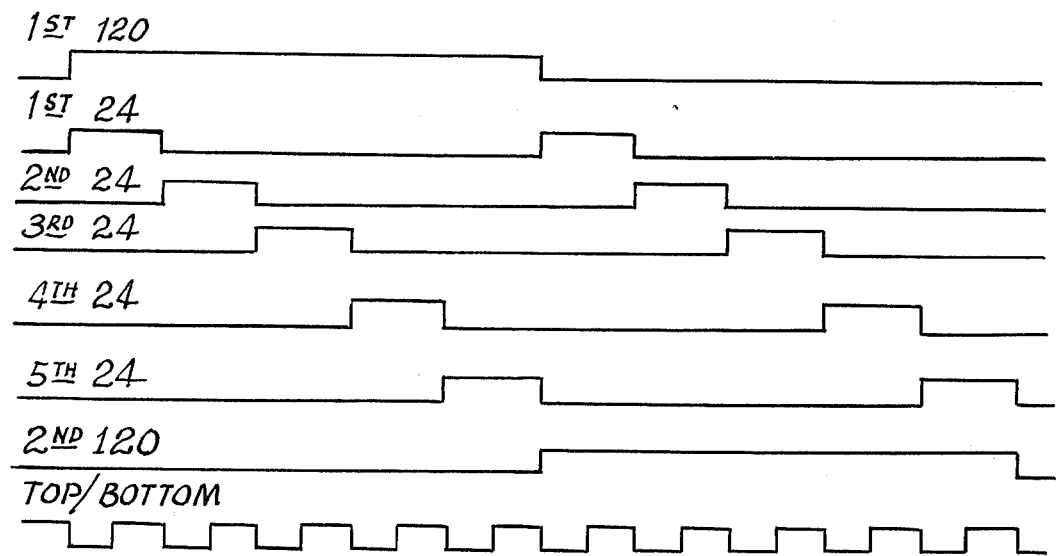
FIGS. 25a and 25b are timing diagrams illustrating how memory elements shown in FIG. 23 supply data to lamp firing circuits.
Figure 25B:
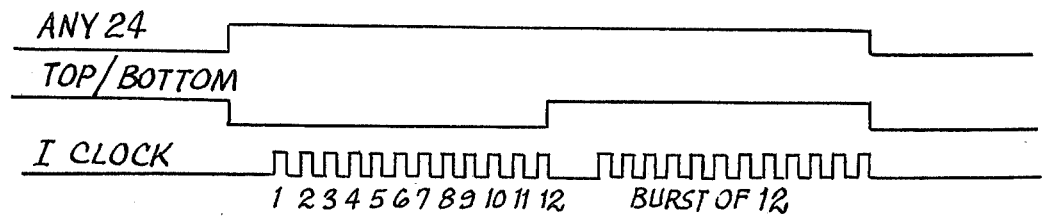

FIGS. 25a and 25b are timing diagrams which provide a further indication of how data recirculating in one of the serial memories is transmitted to a Triac to fire the same. Thus, whether there is B/W data or GRY data the 1st 120 bits are transmitted and within the time envelope of that number of bits there are 10 groups of 12 bits. After that transmission is complete there is a second transmission of another 120 bits and that too includes 10 transmissions of 12 bits each. In FIG. 24b it may be seen that each group of 240 bits is divided into two groups of 120 bits each, both groups being derived from the upper or lower memories.

Data Extraction From Memory and Transmission to the Display Board

It has been previously explained how the data processor, data break facility may be used to store the digitized video signals in the processor memory at specified memory locations in a memory field so as to provide an image of the display board. The same techniques are used to extract the stored data from the memory with the essential difference being that the data is not extracted from memory locations in the same sequence with which it was inserted. When the data was inserted the first word was stored at memory location 0000, a location corresponding to the first 12 lamps in the first row starting at the upper left-hand corner of the board. The next data word stored was that for the next 12 lamps in that first row with the process being continued until all of the words for the first row were stored and then the storage of the lamps for the next row commenced beginning at the left-hand side of that row.

As has been explained previously, the data for the lamps is not transmitted in that sequence. Therefore, it is necessary to extract the data from the processor memory in a sequence corresponding to that in which the lamp data is transmitted. However, the sequence of lighting the lamps does begin on the left side of the first horizontal row; therefore, data is first extracted from memory location 0000. The next data word is extracted from memory location 0001 which is the memory location for the data intended for the 12 lamps on the left-hand side of the second horizontal row. In order to do this the system includes a memory address generator which is effective to generate memory address signals in the desired sequence.

Figure 26:
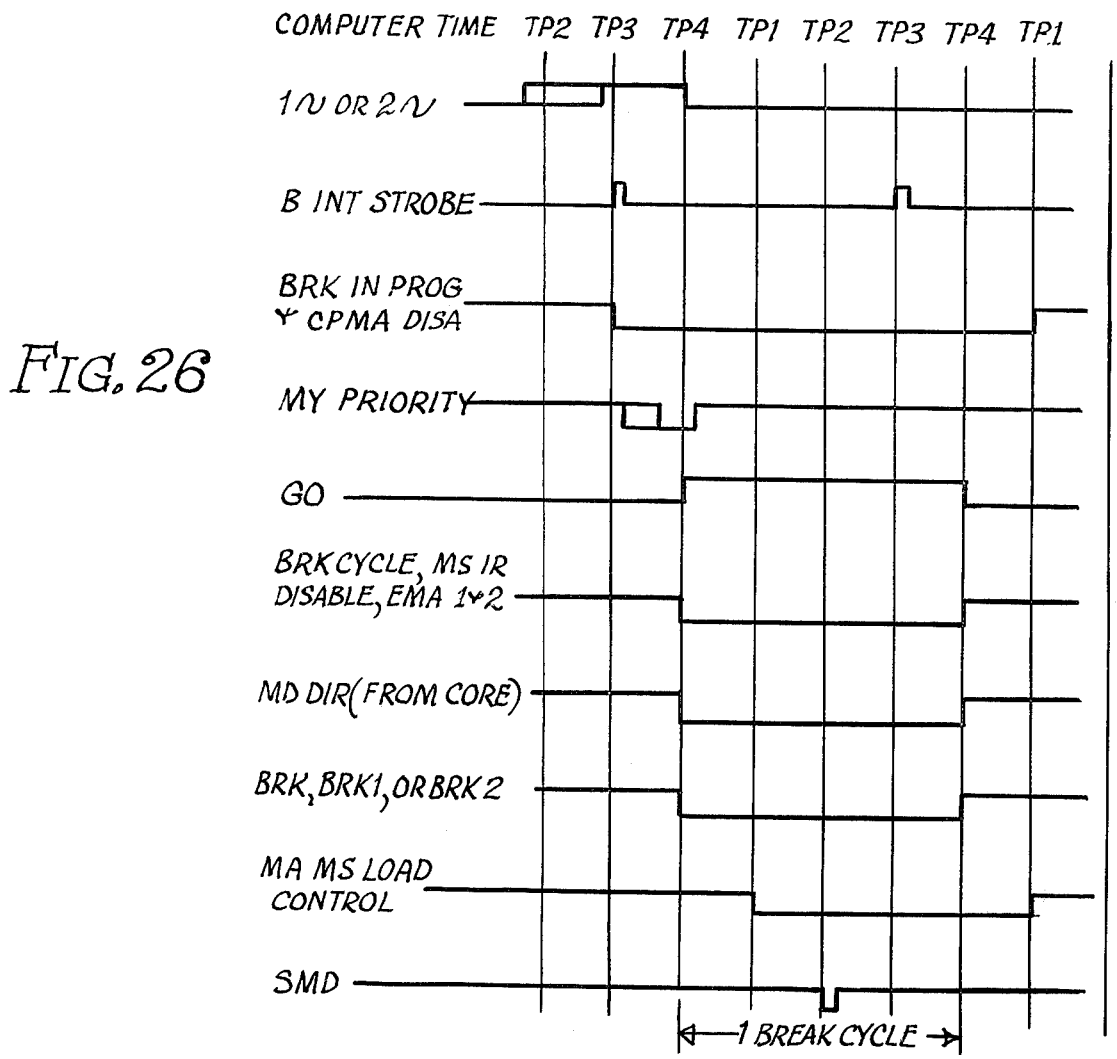
FIG. 26 is a timing diagram showing the relationship between a data processor timing cycle and data extraction from the processor memory.
Figure 27:
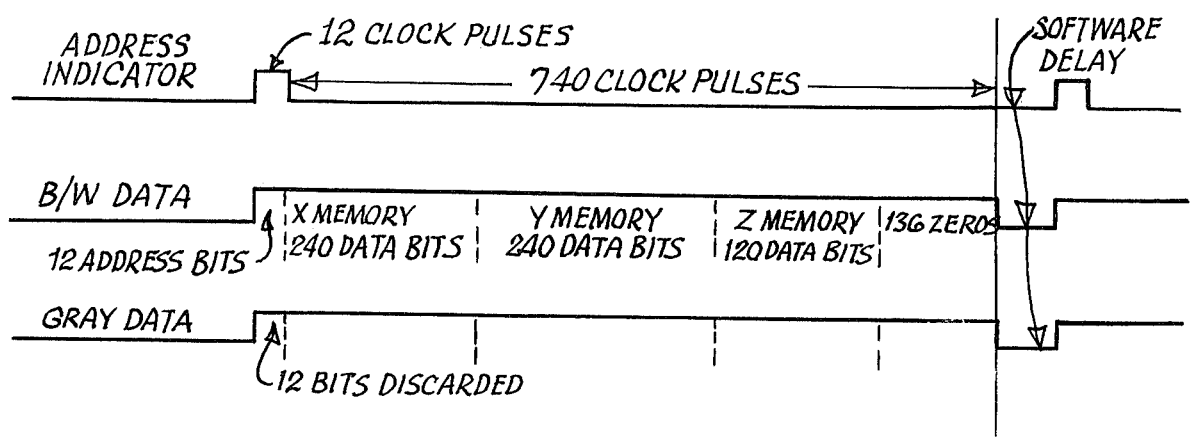
FIG. 27 is a timing diagram illustrating the sequence in which data is transmitted from the data processor to a display board.

Before explaining how the transmission memory address generator circuit operates it should be understood that data is extracted from the data processor memory using the processors data break capability as described previously. Thus on one break cycle BRK 1 is generated and B/W data extracted and on the next break cycle BRK 2 is generated and GRY data extracted. FIG. 26 is a timing diagram for a break cycle when it is desired to extract data from the memory to display on the board. Thus, at the points indicated in the computer time cycle the signals shown on the timing diagram are generated. Each word is obtained from memory during a signal cycle data break. BRK is first used to obtain the current address followed by a series of B/W data breaks (BRK 1) and GRY data breaks (BRK 2) until 10 black and 10 gray words have been obtained. Note that each BRK 1 is followed immediately by a BRK 2 and the two words obtained are then simultaneously transmitted to the display by one 12 bit burst of Write clock signals. This sequence is repeated until all of the data for two ½ modules have been transmitted. Therefore, the transmission to the display board is in accordance with the timing diagram shown in FIG. 27 which should be referenced to FIG. 20. In FIG. 20, as indicated, the data for the X submodules is transmitted first, then that for the Y and finally that for the Z. Because of the particular modular configuration described, it is noted that only 120 data bits are required for the Z submodule so that its memory burst consists of 120 data bits and 120 zeros. A complete transmission for ½ module requires 12 clock pulses during which a module address is transmitted, and 720 clock pulses during which the B/W data and GRY data are transmitted in parallel.

Figure 28:
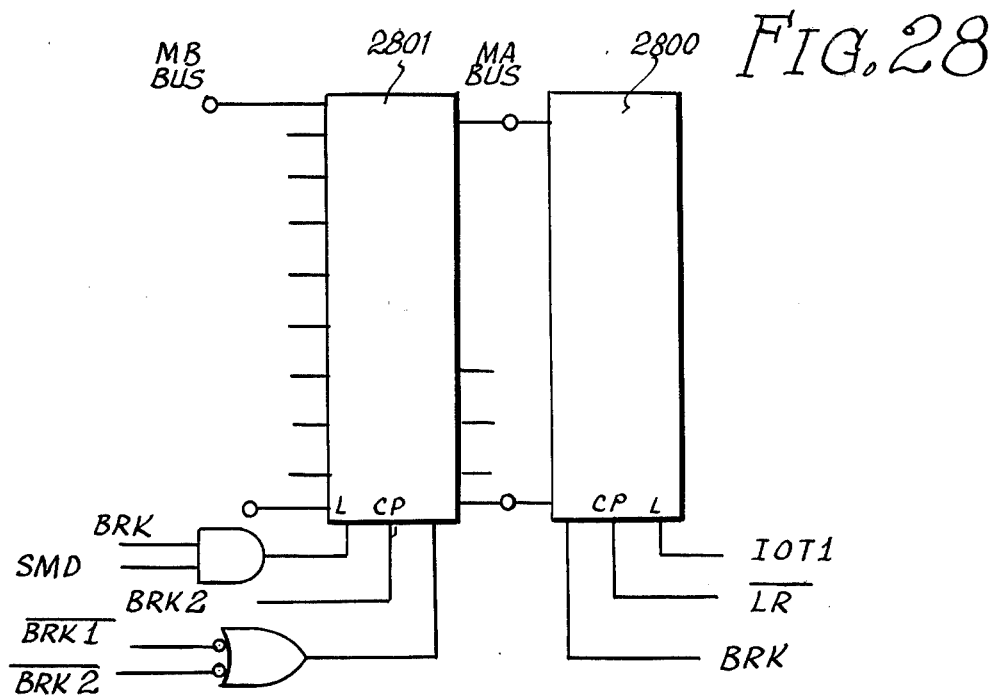
FIG. 28 illustrates a memory address generator used to generate the memory address of data to be transmitted to a display board.

The general arrangement of the transmission memory address generator is shown in FIG. 28. In this figure a current address register 2800 is provided with a series of output gates effective to strobe its contents on the memory address (MA) bus of the processor at BRK signal. Upon the generation of the IOT 1 signal by the program the register 2800 is loaded with core memory location where the program stores the address location of the first data word. When BRK is generated the contents of that register are strobed onto MA bus. The processor then places the data stored in that location on the memory data but (MD). The data stored in that location is the core location (data address) of the word to be transmitted. The B/W and GRY data stored in different memory fields use the same locations and are transmitted simultaneously to the display.

On the next break cycle BRK 1 the contents of the register 2800 are strobed to the MA bus and the B/W data word is placed on the MD bus. At TP 2 the processor cycle the B/W data is loaded into a parallel to serial register. At BRK 2 the same memory address from register 2800 is strobed onto the MA bus and the GRY word in the other field is placed on MD bus ready to be strobed into the parallel to serial register. At the next TP 2 the GRY data word is loaded into its register.

Also at BRK 2 the contents of a data address register 2801 was incremented by one.

The system now repeats the break cycles with the register 2801 being incremented by one at each BRK 2 signal until 10 pairs of words have been extracted from the processor. A counter (not shown) is effective at the count of 10 to generate a last row (LR) signal which is applied to the register 2800 to increment it by one inserted a new memory address where the processor can find the starting address of the next group of ten words. If the sequence is started with the X burst then the next address is the location of the next 10 words for the remainder of the X burst.

Figure 29:
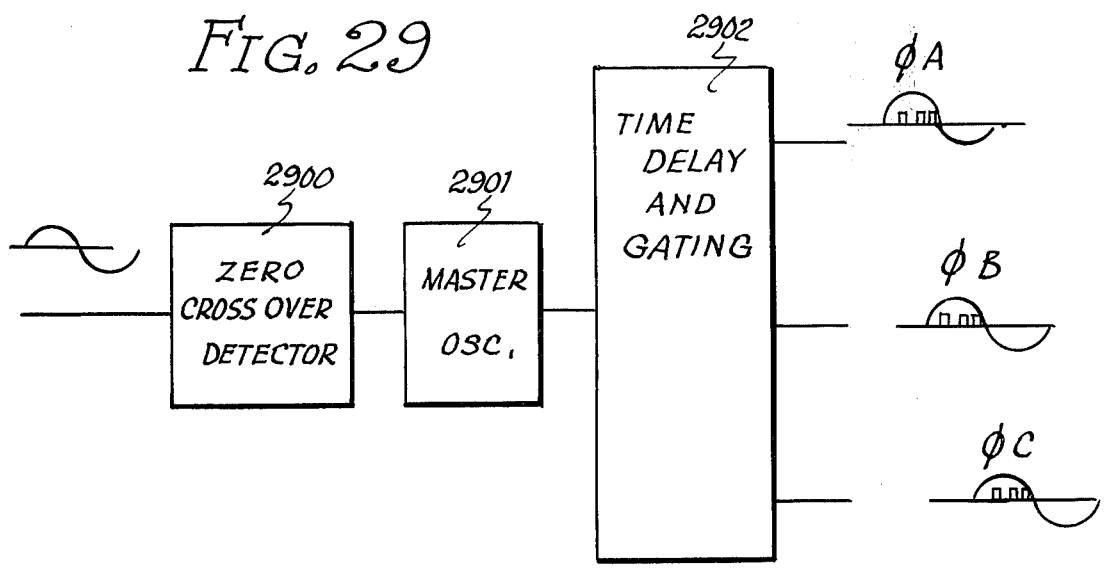
FIGS. 29 illustrates in block diagram fashion circuits which may be used to generate the signals shown in FIG. 24.

By reference to FIG. 24 explanation has been made of the BRIGHT, DIM 1, DIM 2 "windows" transmitted to the display board during which data pulses, if present, are effective to cause a lamp to be lit. FIG. 29 illustrates the means by which these signals are generated. One cycle of the three phase supply is provided as the input to zero crossover detector 2900 which produced an output signal each time the sine wave cross the zero line. This signal is supplied as an input to a master oscillator 2901 the output of which is in the input to a series of time and gating circuits 2902. Three outputs are derived from the circuits 2902, being the BRIGHT, DIM 1 and DIM 2 signals.

It has been described previously how data is transmitted to the display in bursts preceded by a Module Address. This address is generated by a circuit shown in FIG. 30. When a START is generated as the result of IOT 1 from the program a flip flop 3000 which has been previously cleared generated ADD, $\overline{ADD}$ and ADD'. The same signal also triggers a module sequencer shown in FIG. 31 and consisting essentially of a four bit binary counter 3100 and a pair of binary to decimal decoders 3101 and 3102. START supplied to OR gate 3103 causes the module sequence register to advance to the MS 1 state, the module address state. The output gate 3101 is one of the inputs to an OR gate 3104 so that START also triggers a monostable multivibrator 3105 to produce the STROBE pulse.

Figure 30:
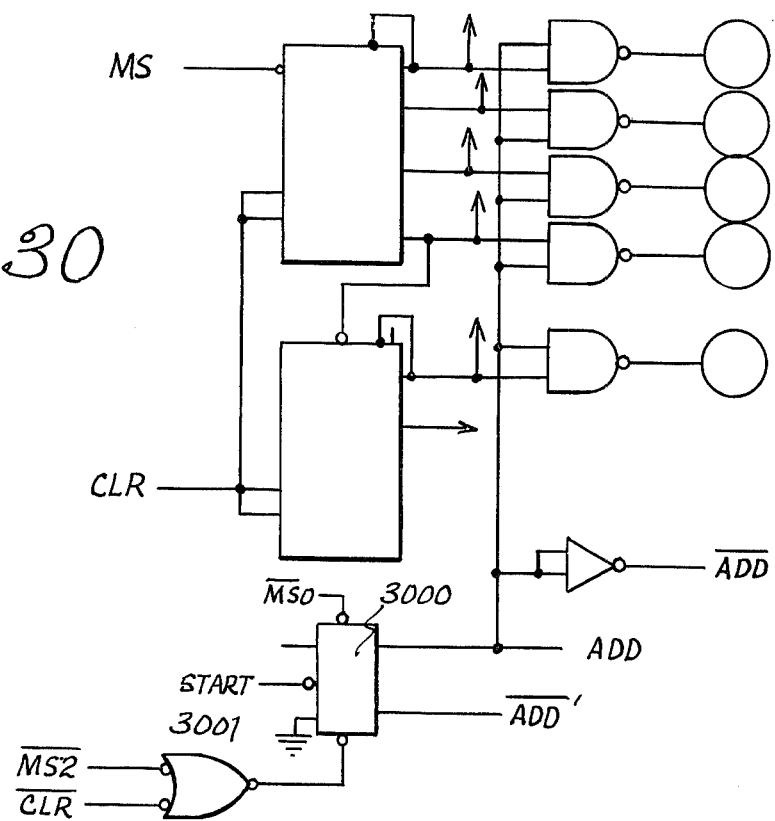
FIG. 30 illustrates in block diagram fashion a circuit for generating a modular address to be transmitted to the display board.
Figure 31:
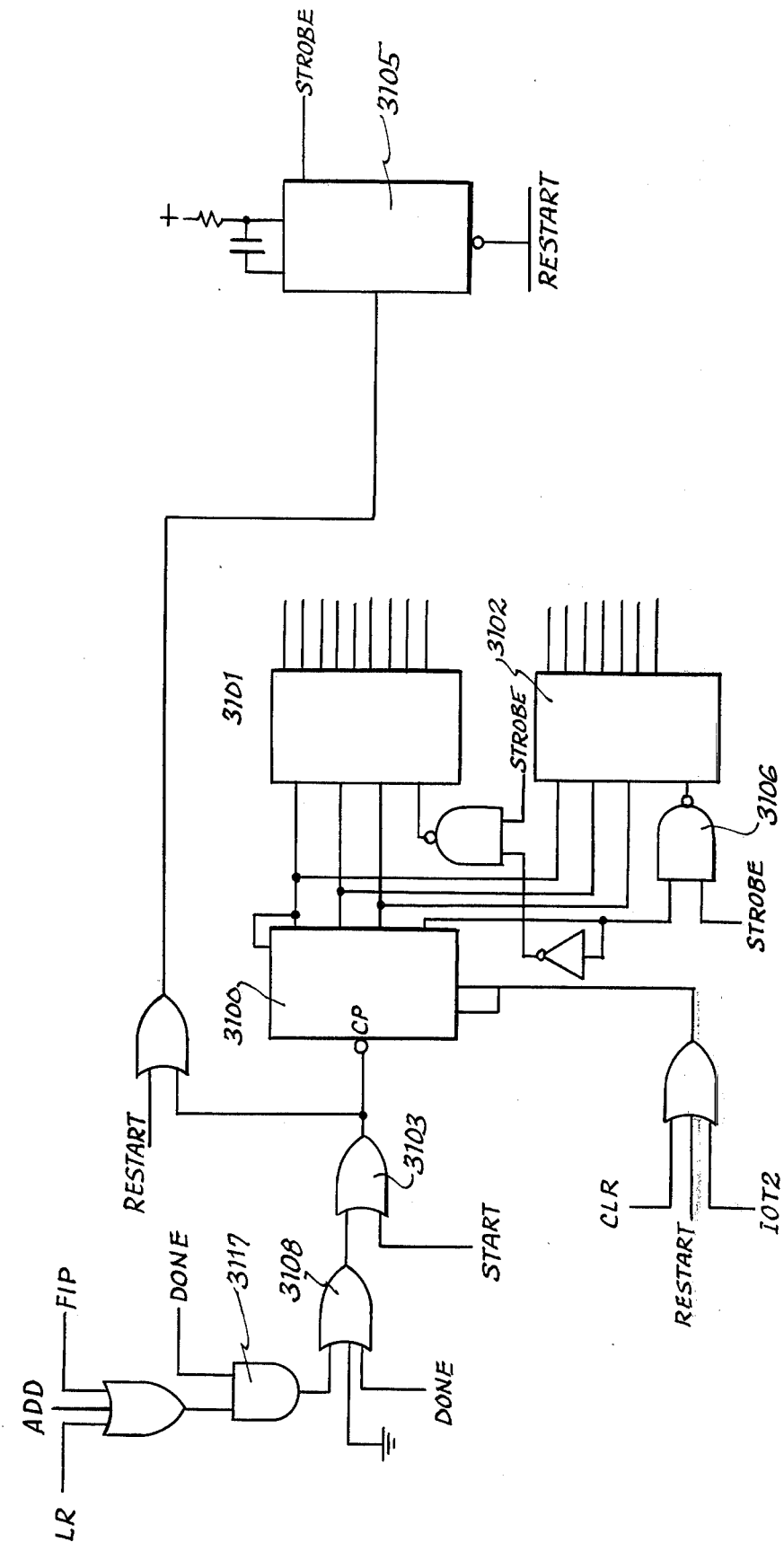
FIG. 31 illustrates a module sequence controller in the transmission interface.

ADD' from FIG. 30 is supplied as one input to an OR gate 3200 to disable a lamp row counter circuit shown in FIG. 3200. This circuit includes a divide by 12 counter 3201 and a pair of binary to decimal converters 3202 and 3203.

ADD when generated produces an ADDRESS ENVELOPE which is transmitted to the display board to indicate that data being transmitted at that time is a module address. This same signal also disables the MD bus to prevent the transfer of any B/W or GRY data from memory. This is to permit the insert of a Module Address ahead of a data burst.

Upon the generation of the STROBE signal it is supplied to a gate 3106 to strobe MS 1 from the converters 3101 and 3102. MS 1 at that time generate a B/W Data Strobe pulse. This pulse when generated loads the Module Address Bits from the serial memory address register of FIG. 30 into the B/W data parallel to serial converter and at this time the system is the Module address state. At this time 12 clock pulses are transmitted to the display board on the B/W data. After 12 clock pulses have been generated a DONE signal is generated. A DONE' is generated and supplied through gates 3107, 3108 and 3103 to advance the module sequences of FIG. 31 to the MS 2 state. When STROBE is generated MS 2 is applied via gate 3001 and terminates ADD. When ADD is terminated the MD bus is enabled and B/W and GRY data in a burst as described may now be transmitted. MS 2 also generates the first data break pulse.

When BRK 2 has been completed the Module Address has been generated and a B/W and a GRY data word have been loaded into their respective parallel to serial registers. At this time a signal is generated to shift the parallel to serial converters to their Serial Mode and a lamp column counter (a simple divide by 12 counter not shown) is enabled via an input gate. The same signal also enables a counter for counting 240, the number of data bits in a burst.

Figure 32:
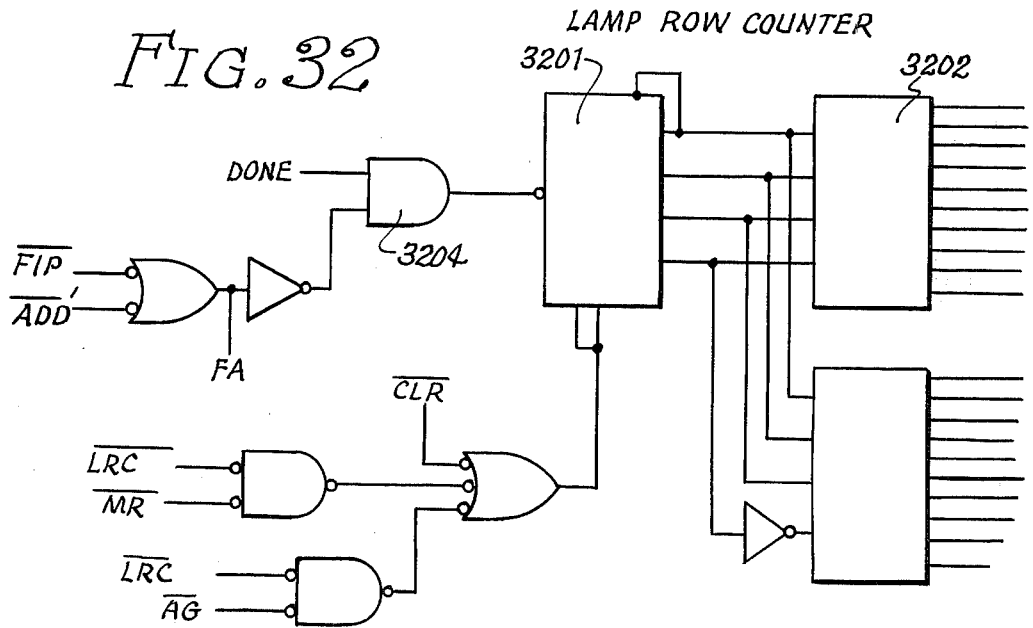
FIG. 32 illustrates in block diagram fashion a lamp row counter which may be used in the transmission interface.

Twelve clock pulses are then transmitted to the display board and are also counted to generate a DONE signal. DONE is supplied as input via gate 3204 to lamp row counter of FIG. 32 to advance that counter by one. The B/W and GRY words have now been transmitted to the board in parallel. A new break cycle is entered and repeated until 10 pairs of words have been extracted and transmitted.

DONE when generated after the ninth pair of words generates the last row (LR) signal and LR functions as described above.

A new sequence is started for the transmission of a new burst and the process continues until data has been transmitted for a complete ½ module address.

To recapitulate the control circuits at each display board module receive clock signals, a module address, bursts of B/W and GRY data. After all the data and control signals for one frame have been transmitted another frame may be transmitted.

It should be understood that the data for each frame may be derived from a video camera, the video signal converted to digital form, stored in a memory and then extracted. It is also contemplated that the data for each frame may be stored in an off line memory which itself is interfaced with the processor so that off line operation may be achieved.

The specific signal designations, the word size, the board size, the module configuration, the sequences by which data is stored in the processor and extracted therefrom, and the control and logic elements for those sequences may all be varied by a designer. Therefore, to the extent that this detailed description discloses various logic, counter, register, board, module configuration and the like they are by way of exemplification only for different processors and other variations will cause these to change.

It is intended by the claims appended hereto and forming a part of the specification to cover all variations, in the specifics of the system disclosed, which come within their scope.

What is claimed as new and desired to be secured by Letters Patent is:

1. A display system for displaying images comprising a matrix of display devices each capable of varying degrees of visual brightness, means for supplying a video signal for a complete video frame and representing an image, a converter receiving the video signal as its input and producing quantized signals representing more than two different amplitude levels in the video signal as its output, means for generating control synchronizing signals associated with the quantized signals to provide an indication with respect to each quantized signal as to what part of a video frame that quantized signal represents, means for encoding the quantized signals into digital signals having a fewer number of bits than the number of said amplitude levels, storage means capable of receiving and retaining encoded quantized signals for the entire matrix of display devices, means responsive to said control and synchronizing signals for storing the encoded quantized signals at specific locations in said storage means, means for extracting the encoded quantized signals from said storage means, means for directing the extractd encoded quantized signals to specific display devices corresponding to specific locations in said storage means, and means associated with each display device and responsive to the extracted encoded quantized signal received by it to control the degree of visual brightness of that display device so that the matrix in its totality presents the image represented by the original video signal.

2. The display system of claim 1 wherein said converter is provided with means for detecting more than two different amplitude levels of the video signals and means for encoding the output of said level detecting means into digital data.

3. The display system of claim 1 wherein said converter is provided with means to produce quantized signals representing at least three different levels of variation of the amplitude of the video signal.

4. The display system of claim 3 including means for encoding the quantized signals to produce a multibit digital code capable of uniquely representing each different level of variation of the amplitude of the video signal.

5. The display system of claim 1 wherein said means for generating control and synchronizing signals including means responsive to the horizontal sync signals in a video signal for producing signals indicating the starting point in a video line to be converted, and signals for establishing the frequency at which the video signal is sampled to be quantized.

6. The display system of claim 3 wherein said means for producing quantized signals comprises a plurality of amplifiers biased at different levels.

7. The display system of claim 1 wherein said storing means includes a register for receiving the quantized signals in series and transmitting them in parallel.

8. The display system of claim 7 wherein said storing means includes a word counter for producing signals when specified number of quantized signals have been received and means interconnecting said word counter with said register to determine its mode of operation.

9. The display system of claim 8 wherein said storing means includes means for generating signals indicating the locations of groups of quantized signals in the storage means.

10. The display system of claim 1 wherein said matrix is divided into modules, each module consisting of a group of display devices arranged in vertical columns and horizontal rows.

11. The display system in claim 10 wherein each module has associated therewith a memory connected to said extracting means for receiving the quantized signals intended to control the display devices in that module.

12. The display system of claim 11 wherein each memory is constituted by a serial memory capable of operating in write mode and recirculating mode.

13. The display system of claim 12 wherein each memory is divided into sections and each section has a capacity for holding quantized signals for a plurality of display devices in a module.

14. The display system of claim 13 including a plurality of buffers connected to an output of each memory, memory control means for transmitting a portion of the contents of each memory to said buffers when said memory is operating in the recirculate mode.

15. The display system of claim 14 wherein said directing means includes means for generating control signals for enabling the operation of each display at discrete times by the quantized signals and means for transmitting the control signals so generated to said display devices.

16. A display system for displaying images comprising a matrix of display devices each capable of varying degrees of visual brightness, means for supplying a video signal for a complete video frame and representing an image, a converter receiving the video signal as its input and producing quantized signals representing more than two different amplitude levels in the video signal as its output, means for generating control synchronizing signals associated with the quantized signals to provide an indication with respect to each quantized signal as to what part of a video frame that quantized signal represents, means for encoding the quantized signals into digital signals, storage means capable of receiving and retaining encoded quantized signals for the entire matrix of display devices, means responsive to said control and synchronizing signals for storing the encoded quantized signals at specific locations in said storage means, means for extracting the encoded quantized signals from said storage means, means for directing the extracted encoded quantized signals to specific display devices corresponding to specific locations in said storage means, and means associated with each display device and responsive to the extracted encoded quantized signal received by it to control the degree of visual brightness of that display device so that the matrix in its totality presents the image represented by the original video signal.

17. A display system comprising a matrix of display devices arranged in horizontal rows and vertical columns, and capable of varying degrees of visual brightness, means for providing a video signal representative of an image to be displayed by the matrix, means for converting the video signal into quantized signals representing more than two different amplitude levels in the video signal, means for encoding the quantized signals into digital signals, means for producing synchronizing signals representing the beginning of a video frame, the beginning and end of each horizontal trace in that frame and the end of that frame, means for transmitting the encoded quantized signals and the synchronizing signals for a number of video frames less than the number of such frames available, means for controlling the energization of each display device in said matrix to determine its level of its visual brightness and means responsive to the synchronizing signals supplying the encoded quantized signals to said energization controlling means to energize said display device in a sequence and at different levels of brightness to cause the image to be displayed by the matrix.

18. A display system comprising a matrix of display devices arranged in horizontal rows and vertical columns, and capable of varying degrees of visual brightness, means for providing a video signal representative of an image to be displayed by the matrix, means for converting the video signal into quantized signals representing more than two different amplitude levels in the video signal, means for encoding the quantized signals into digital signals having a fewer number of bits than the number of said amplitude levels, means for producing synchronizing signals representing the beginning of a video frame, the beginning and end of each horizontal trace in that frame and the end of that frame, means for transmitting the encoded quantized signals and the synchronizing signals for a number of video frames less than the number of such frames available, means for controlling the energization of each display device in said matrix to determine its level of its visual brightness and means responsive to the synchronizing signals supplying the encoded quantized signals to said energization controlling means to energize said display device in a sequence and at different levels of brightness to cause the image to be displayed by the matrix.

19. A display system as set forth in claim 18, including memory means for storing binary coded signals.

20. A display system as set forth in claim 19, wherein said memory means includes a first storage area for storing the binary coded signals representative of one amplitude level of the video signal and a second storage area for storing the binary coded signals representative of another amplitude level of the video signal.

21. A display system as set forth in claim 20, said memory means includes control means responsive to the synchronizing signals to direct a binary coded signal to a specific memory location corresponding to the position in the image of the portion of the image represented by that binary coded signal.

22. A display system as set forth in claim 21, wherein said control means includes transfer means for receiving the binary coded signals in serial and transmitting them in parallel to a specific memory location after a predetermined number of such signals have been received.

23. A display system as set forth in claim 22, wherein said transfer means comprises a pair of serial to parallel registers and logic means interconnecting said registers and responsive to the synchronizing signals to enable one register to receive the binary coded signals serially while the other register is transmitting previously received binary coded signals in parallel to a specific memory location.

24. A display system as set forth in claim 23, wherein said transfer means includes means for generating the address of each predetermined number of binary coded signals received in a serial to parallel register in said transfer means.

25. A display system as set forth in claim 24, wherein said memory address generating means includes means for adding a predetermined number to a given address of a specific memory location in response to the receipt of synchronizing signals.

26. A display system as set forth in claim 22, wherein said transfer means comprises a plurality of pairs of serial to parallel registers, logic means interconnecting each pair of registers and responsive to the synchronizing signals to enable one register in a pair to receive the binary coded signals serially while the other register in a pair is transmitting previously received binary coded signals in parallel to a specific memory location.

27. A display system as set forth in claim 21, wherein said display devices in said matrix are electrically connected into modules, each module including a predetermined number of display devices in a horizontal row and a predetermined number of display devices in vertical columns.

28. A display system as set forth in claim 27, wherein separate energization controlling means are provided for each display device module.

29. A display system as set forth in claim 28, wherein each energization controlling means includes a register connected to said memory means for receiving binary coded signals therefrom.

30. A display system as set forth in claim 29, wherein each energization controlling means is constituted by semiconductor controlled switching devices, and means are provided interconnecting said switching devices with said means for receiving binary coded signals from said memory storage means whereby the conduction of said semiconductor controlled switching devices may be controlled.

* * * * *